(12) United States Patent
Nakao et al.

(10) Patent No.: US 7,526,258 B2
(45) Date of Patent: Apr. 28, 2009

(54) METHOD AND APPARATUS FOR TRANSMITTING SIGNALS, METHOD AND APPARATUS FOR RECEIVING THE SIGNALS, AND COMMUNICATION SYSTEM UTILIZING THE SAME

(75) Inventors: Seigo Nakao, Gifu (JP); Yasuhiro Tanaka, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 378 days.

(21) Appl. No.: 11/044,014

(22) Filed: Jan. 28, 2005

(65) Prior Publication Data

US 2005/0164655 A1 Jul. 28, 2005

(30) Foreign Application Priority Data

| Jan. 28, 2004 | (JP) | ............................. 2004-019807 |
| Mar. 10, 2004 | (JP) | ............................. 2004-068223 |
| Jul. 23, 2004 | (JP) | ............................. 2004-216186 |
| Jan. 24, 2005 | (JP) | ............................. 2005-015813 |

(51) Int. Cl.
*H04B 7/02* (2006.01)

(52) U.S. Cl. ...................... 455/101; 455/277.1; 375/267

(58) Field of Classification Search ................. 455/562, 455/562.2, 101, 277.1, 277.2, 278.1, 296.1; 375/267, 347

See application file for complete search history.

(56) References Cited

U.S. PATENT DOCUMENTS

| 5,097,484 A | * | 3/1992 | Akaiwa ........................ 375/267 |
| 5,493,695 A | * | 2/1996 | Aitkenhead et al. .......... 455/509 |
| 6,771,706 B2 | | 8/2004 | Ling et al. |
| 2003/0112745 A1 | | 6/2003 | Zhuang et al. |
| 2003/0123582 A1 | | 7/2003 | Kim et al. |
| 2003/0202460 A1 | | 10/2003 | Jung et al. |
| 2004/0125880 A1 | | 7/2004 | Emami et al. |

(Continued)

FOREIGN PATENT DOCUMENTS

EP 0 975 101 A2 1/2000

(Continued)

OTHER PUBLICATIONS

Japanese Office Action issued in Japanese Patent Application No. 2005-015813, dated Oct. 2, 2007.*

(Continued)

*Primary Examiner*—Thanh C Le
(74) *Attorney, Agent, or Firm*—McDermott Will & Emery LLP

(57) ABSTRACT

A data separating unit separates data to be transmitted into the number of data equal to that of antennas. An error correcting unit performs a coding for error correction on data. An interleave unit interleaves data after the convolutional coding. A preamble adding unit adds an STS to the head of a burst signal. The preamble adding unit, corresponding respectively to a plurality of transmitting antennas, is to store respectively a plurality of STSs to be transmitted in a predetermined period. An IFFT unit performs Inverse Fast Fourier Transform. A GI unit adds a guard interval to data in time domain. A quadrature modulation unit carries out quadrature modulation. A frequency conversion unit performs a frequency conversion. An amplification unit is a power amplifier for amplifying radio-frequency signals. Finally, signals are transmitted from the plurality of transmitting antennas.

17 Claims, 28 Drawing Sheets

U.S. PATENT DOCUMENTS

| | | |
|---|---|---|
| 2005/0195763 A1 | 9/2005 | Kadous et al. |
| 2006/0057969 A1 | 3/2006 | Van Houtum |
| 2006/0067419 A1 | 3/2006 | Sandhu |
| 2006/0120469 A1 | 6/2006 | Maltsev et al. |
| 2006/0126489 A1 | 6/2006 | Quyang et al. |
| 2006/0159195 A1 | 7/2006 | Ionescu et al. |

FOREIGN PATENT DOCUMENTS

| | | |
|---|---|---|
| EP | 1 182 817 A1 | 2/2002 |
| EP | 1 531 594 A1 | 5/2005 |
| JP | 10-210099 | 8/1998 |
| JP | 2002-314501 | 10/2002 |
| JP | 2003-530010 | 10/2003 |
| WO | WO 01/76110 A2 | 10/2001 |

OTHER PUBLICATIONS

Japanese Office Action issued in Japanese Patent Application No. 2006-087318, dated Oct. 2, 2007.*

Japanese Office Action issued in Japanese Patent Application No. 2006-087319, dated Oct. 2, 2007.*

Japanese Office Action issued in Japanese Patent Application No. 2006-087220, dated Oct. 2, 2007.*

Document regarding the interview with Japanese examiner issued in Japanese Patent Application No. 2005-015813, dated Oct. 29, 3007.*

Nakao, S., et al., "Considerations for STS for MIMO-OFDM," IEEE 802.11-04/002r2, Jan. 2004, Slides 1-26, Sanyo Electric Co., Ltd., Japan.

Aoki, T., "New preamble structure for AGC in a MIMO-OFDM system," IEEE 802.11-04/046r1, Jan. 2004, Slides 1-13, Toshiba Corporation, Japan.

Syed, M. J., et al., "LDPC-based space—time coded OFDM systems with channel estimation," IEE Proceedings-Commun., Dec. 2004, pp. 567-573, vol. 151, No. 6, IEE.

Stamoulis, A., et al., "Space-Time Block-Coded OFDMA With Linear Precoding for Multirate Services," IEEE Transactions on Signal Processing, Jan. 2002, pp. 119-129, vol. 50, No. 1, IEEE.

You, Y.-H., et al., "Effects of parameter imbalances and PAR in multiple antenna OFDM-CDMA systems," IEE Proceedings-Commun., Apr. 2004, pp. 123-131, vol. 151, No. 2, IEE.

Ogawa, Y., et al., "Channel and frequency offset estimation for a MIMO-OFDM system," Vehicular Technology Conference, Sep. 2004, pp. 1523-1527, vol. 2, IEEE.

Gidlund, M., "Precoded closed-loop MIMO-OFDM system using predefined set of rotation matrices," Electronic Letters, Mar. 3, 2005, 2 pages, vol. 41, No. 5, IEE.

Zhang, X., et al., "Qos-driven asynchronous uplink subchannel allocation algorithms for space-time OFDM-CDMA systems in wireless networks," Quality of Services in Heterogeneous Wired/Wireless Networks, Oct. 2004, pp. 1-8, IEEE.

Kim, K. S., et al., "Efficient adaptive transmission technique for LDPC coded OFDM cellular systems using multiple antennas," Electronics Letters, Mar. 18, 2004, 2 pages, vol. 40, No. 6, IEE.

You, Y.-H., et al., "PAPR analysis for multi-band OFDM signals," Electronic Letters, Mar. 3, 2005, 2 pages, vol. 41, No. 5, IEE.

Beaulieu, N. C., et al., "Effect of transmitter Nyquist shaping on ICI reduction in OFDM systems with carrier frequency offset," Electronic Letters, Jun. 23, 2005, 2 pages, vol. 41, No. 13, IEE.

Wong, K.-K., et al., "Adaptive Antennas at the Mobile and Base Stations in an OFDM/TDMA System," IEEE Transactions on Communications, Jan. 2001, pp. 195-206, vol. 49, No. 1, IEEE.

Chinese Office Action, with English Translation, issued in Chinese Patent Application No. CN 2005-10007003.9 dated on Sep. 5, 2008.

* cited by examiner

FIG.8A

| FIRST STS | FIRST LTS | FIRST SIGNAL | FIRST DATA |
| SECOND STS | SECOND LTS | SECOND SIGNAL | SECOND DATA |

FIG.8B

| FIRST STS | FIRST LTS | FIRST SIGNAL | | |
| | SECOND STS | SECOND LTS | SECOND SIGNAL | FIRST DATA |
| | | | | SECOND DATA |

FIG.8C

| STS | FIRST LTS | FIRST SIGNAL | | |
| | SECOND LTS | SECOND SIGNAL | FIRST DATA |
| | | | SECOND DATA |

FIG.18

|  | FIRST TRANSMITTING ANTENNA 14a | SECOND TRANSMITTING ANTENNA 14b | THIRD TRANSMITTING ANTENNA 14c |
|---|---|---|---|
| 1 ANTENNA | IEEE802.11a STS | — | — |
| 2 ANTENNAS | STS 1 | STS a | — |
| 3 ANTENNAS | STS 1 | STS 2 | STS b |

FIG.24

|  | FIRST TRANSMITTING ANTENNA 14a | SECOND TRANSMITTING ANTENNA 14b | THIRD TRANSMITTING ANTENNA 14c |
|---|---|---|---|
| 1 ANTENNA | IEEE802.11a STS | — | — |
| 2 ANTENNAS | STS 1 | STS a | — |
| 3 ANTENNAS | STS 1 | STS 2 | STS b' |

METHOD AND APPARATUS FOR TRANSMITTING SIGNALS, METHOD AND APPARATUS FOR RECEIVING THE SIGNALS, AND COMMUNICATION SYSTEM UTILIZING THE SAME

BACKGROUND OF THE INVENTION

1. Field of the Invention

The present invention relates to transmission and receiving technologies, and it particularly relates to method and apparatus for transmitting signals from a plurality of antennas, method and apparatus for receiving the signals and a communication system utilizing said methods and apparatuses.

2. Description of the Related Art

In wireless communication, it is generally desired that the limited frequency resources be used effectively. Adaptive array antenna technology is one of the technologies that realize the effective utilization of frequency resources. In adaptive array antenna technology, the amplitude and phase of signals transmitted from and received by a plurality of antennas, respectively, are so controlled as to form a directional pattern of the antenna. In other words, the apparatuses provided with adaptive array antennas change respectively the amplitudes and phases of signals received by a plurality of antennas, add up the thus changed received signals, and receive signals equivalent to the signals received by the antenna having the directional pattern corresponding to the variation in said amplitude and phase (hereinafter referred to as "weight"). And the signals are transmitted in a directional pattern of the antenna corresponding to the weight.

One example of processings to compute the weights in adaptive array antenna technology is a processing based on the MMSE (Minimum Mean Square Error) method. In the MMSE method, the Wiener solution is known to be the condition for an optimum weight value. Also known is a recurrence formula whose amount of calculation is smaller than that required to directly solve the Wiener solution. For such recurrence formula, adaptive algorithms, such as RLS (Recursive Least Squares) algorithm and LMS (Least Mean Squares) algorithm, are used. On the other hand, for the purpose of realizing a higher data transmission rate and improving the transmission quality, there is a case where data are subjected to multi-carrier modulation and the multi-carrier signals are transmitted (See reference (1) in the following Related Art List, for instance).

Related Art List (1) Japanese Patent Application Laid-Open No. Hei10-210099.

There is a MIMO (Multiple Input Multiple Output) system as one of technologies by which to raise the transmission rate of data using the adaptive array antenna technology. A transmitting apparatus and a receiving apparatus in the MIMO system are each equipped with a plurality of antennas, and a channel suitable for each of the antennas is set. That is, the channel of up to the maximum number of antennas is set for the communication between the transmitting apparatus and the receiving apparatus, so as to improve the data transmission rate. Moreover, combining the MIMO system with a technique of transmitting multi-carrier signals results in a higher data transmission rate. On the other hand, the transmitted signals generally contain preambles that are known signals in order for the signals transmitted from the transmitting apparatus to be accurately received. There are some cases, however, where the weights necessary for adaptive array signal processing have not been derived at the period the MIMO system receives the preambles. In such a case, interference is caused among the preambles respectively outputted from a plurality of antennas, so that the signals received by the receiving apparatus are apt to be erroneous. Since in particular the setting of AGC based on the received preambles is done at the initial stage of receiving processing, it is susceptible to the interference caused by preambles transmitted from an undesired antenna.

SUMMARY OF THE INVENTION

The present invention has been made in view of the foregoing circumstances and an object thereof is to provide method and apparatus for reducing the interference among known signals at a receiving side when the known signals of multi-carrier are transmitted respectively from a plurality of antennas as well as a communication system utilizing said method and apparatus.

A preferred embodiment according to the present invention relates to a transmitting apparatus. This apparatus comprises: a plurality of antennas; a transmitter which transmits signals using a plurality of carriers via the plurality of antennas; and a storage unit which stores respectively a plurality of known signals that correspond respectively to the plurality of antennas and are to be transmitted from the transmitter in a predetermined period. In this apparatus, among the plurality of known signals stored by the storage unit a known signal corresponding to one of the plurality of antennas uses carriers which differ at least partially from carriers used for a known signal corresponding to another antenna among the plurality of antennas.

By employing the above structure, at least part of a plurality of known signals are transmitted by different carriers. As a result, cross-correlation among a plurality of known signals becomes small, so that a plurality of known signals transmitted can be accurately and properly received by a receiving apparatus.

Another preferred embodiment according to the present invention relates to a transmitting method. This method is such that when a signal using a plurality of carriers is transmitted from a plurality of antennas, a plurality of known signals that correspond respectively to the plurality of antennas are transmitted over a predetermined period, and a known signal transmitted from one of the plurality of antennas uses carriers which differ at least partially from carriers used for a known signal corresponding to another antenna among the plurality of antennas.

Still another preferred embodiment according to the present invention relates also to a transmitting method. This method comprises: transmitting signals that use a plurality of carriers, from a plurality of antennas; storing a plurality of known signals that correspond respectively to the plurality of antennas; and transmitting, over a predetermined period, a plurality of stored known signals from the plurality of antennas. In this method, the storing may be such that among the plurality of known signals stored in a memory a known signal corresponding to one of the plurality of antennas uses carriers which differ at least partially from carriers used for a known signal corresponding to another antenna among the plurality of antennas.

The storing may be such that among the plurality of known signals an autocorrelation characteristic of a known signal corresponding to one of the plurality of antennas may be defined in such a manner as to be higher than that of a known signal corresponding to another antenna among the plurality of antennas. The number of the plurality of antennas may be three or more and the storing may be such that, among the plurality of known signals, cross-correlation characteristics between a known signal corresponding to one of the plurality of antennas and the remaining respective known signals corresponding to other antennas among the plurality of antennas may be defined in such a manner as to be lower than those among the remaining respective known signals corresponding to the other antennas.

The plurality of known signals in the storing may be defined in a manner such that if, among a plurality of carries to be transmitted in the transmitting, the number of carriers to be used only for a known signal corresponding to one of the plurality of antennas is a first value and the number of carriers to be used only for a known signal corresponding to another antenna among the plurality of antennas is a second value, then the first value is greater than the second value. The number of the plurality of antennas may be three or more and, for the plurality of known signal in the storing, the second value may be the number of carriers that have been used only for the known signal corresponding to one of the other antennas. For the plurality of known signals in the storing the second value may be zero.

The plurality of known signals in the storing may respectively use mutually different carriers. The plurality of known signals in the storing may respectively use a predetermined number of carriers that have been discretely selected from among a plurality of carriers. The plurality of known signals in the storing may be respectively defined in such a manner that a difference in frequency between a carrier having the highest frequency and a carrier having the lowest frequency is mutually equal among the predetermined number of discretely selected carriers. The plurality of known signals in the storing may respectively use mutually different carriers. The plurality of known signals in the storing may be respectively defined in such a manner that the equal number of carriers is used for the respective known signals. The storing may be such that among the plurality of known signals the number of carriers to be used for a known signal corresponding to one of the plurality of antennas is greater than the number of carriers to be used for a known signal corresponding to another antenna of the plurality of antennas. A plurality of carriers, used for the plurality of known signals, in the storing may be defined beforehand in part among the plurality of carriers to be transmitted in the transmitting and the plurality of known signals in the storing may use at least one of carriers selected from among the plurality of carriers defined beforehand. The plurality of known signals in the storing may be defined in a manner such that a value of in-phase component in a waveform of known signal corresponding to one of the plurality of antennas is equal to a value of quadrature component in a waveform of known signal corresponding to another of the plurality of antennas and a value of quadrature component in a waveform of known signal corresponding to one of the plurality of antennas is equal to a value of in-phase component in a waveform of known signal corresponding to another of plurality of antennas.

The method may further comprise determining the number of antennas, that are to transmit signals, among the plurality of antennas, wherein the transmitting may transmit the signals via antennas whose number has been determined by the determining and wherein, if one of antennas that are to transmit the signals is called a main antenna and the remaining antennas are called sub-antennas, then the storing may define the plurality of stored known signals in a manner such that the number of carriers used only for a known signal corresponding to the main antenna becomes equal to or greater than the number of carriers used only for a known signal corresponding to one of the sub-antennas, and the known signal corresponding to the main antenna may be such that the number of carriers to be used is the same irrespective of the determined number of antennas and the known signal corresponding to the main antenna may be defined by a different value of known signal according to the determined number of antennas.

Among the plurality of known signals in the storing, the known signal corresponding to the main antenna and the known signal corresponding to the sub-antennas may use mutually different carriers. If the number of antennas that are to transmit signals differs, a known signal corresponding to the main antenna among the known signals in the storing may be defined by a value that diminishes cross-correlation characteristics among the known signals corresponding to the main antenna. Among the known signals in the storing a known signal corresponding to the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain.

Among the plurality of known signals in the storing a known signal corresponding to the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted. Among the plurality of known signals in the storing, known signals corresponding to the sub-antennas may be defined by values that mutually diminish cross-correlation characteristics. Among the plurality of known signals in the storing a plurality of carriers to be used respectively by a known signal corresponding to the main antenna and known signals corresponding to the sub-antennas may be defined in such a manner as to associate with any of a plurality of carriers used when a known signal is transmitted from an antenna.

Among the plurality of known signals in the storing a known signal may be defined in a manner such that an absolute value of in-phase component in a waveform of known signal corresponding to one of the plurality of antennas is equal to an absolute value of quadrature component in a waveform of known signal corresponding to another of the plurality of antennas and the sign thereof is inverted whereas an absolute value of quadrature component in a waveform of known signal corresponding to one of the plurality of antennas is equal to an absolute value of in-phase component in a waveform of known signal corresponding to another of the plurality of antennas and the sign thereof.

Still another preferred embodiment according to the present invention relates to a program. This program includes the functions of: transmitting signals that use a plurality of carriers, from a plurality of antennas; storing in a memory a plurality of known signals that correspond respectively to the plurality of antennas; and transmitting, over a predetermined period, a plurality of known signals stored in the memory from the plurality of antennas to a wireless network. In this program, the storing in a memory may be such that among the plurality of known signals stored in the memory a known signal corresponding to one of the plurality of antennas uses carriers which differ at least partially from carriers used for a known signal corresponding to another antenna among the plurality of antennas.

The storing in a memory may be such that among the plurality of known signals an autocorrelation characteristic of a known signal corresponding to one of the plurality of antennas is defined in such a manner that the autocorrelation characteristic thereof is higher than that of a known signal corresponding to another antenna among the plurality of antennas. The number of the plurality of antennas may be three or more and the storing in a memory may be such that, among the plurality of known signals, autocorrelation characteristics between a known signal corresponding to one of the plurality of antennas and the remaining respective known signals corresponding to other antennas among the plurality of antennas are defined in such a manner that the autocorrelation characteristics thereof are lower than those among the remaining respective known signals corresponding to the other antennas.

The plurality of known signals in the storing in a memory may be defined in a manner such that if among a plurality of carries to be transmitted in the transmitting the number of carriers to be used only for a known signal corresponding to one of the plurality of antennas is a first value and the number of carriers to be used only for a known signal corresponding to another antenna among the plurality of antennas is a second value, then the first value is greater than the second value. The number of the plurality of antennas may be three or more, and for the plurality of known signal in the storing in a memory the second value may be the number of carriers that have been used only for the known signal corresponding to one of the other antennas. For the plurality of known signals in the storing in a memory the second value may be zero.

The plurality of known signals in the storing in a memory may respectively use mutually different carriers. The plurality of known signals in the storing in a memory may respectively use a predetermined number of carriers that have been discretely selected from among a plurality of carriers. The plurality of known signals in the storing in a memory may be respectively defined in such a manner that a difference in frequency between a carrier having the highest frequency and a carrier having the lowest frequency is mutually equal among the predetermined number of discretely selected carriers. The plurality of known signals in the storing in a memory may respectively use mutually different carriers. The plurality of known signals in the storing in a memory may be respectively defined in such a manner that the equal number of carriers is used for the respective known signals. The storing in a memory may be such that among the plurality of known signals the number of carriers to be used for a known signal corresponding to one of the plurality of antennas is greater than the number of carriers to be used for a known signal corresponding to another antenna of the plurality of antennas. A plurality of carriers, used for the plurality of known signals, in the storing in a memory may be defined beforehand in part among the plurality of carriers to be transmitted in the transmitting and the plurality of known signals in the storing a memory may use at least one of carriers selected from among the plurality of carriers defined beforehand. The plurality of known signals in the storing in a memory may be defined in a manner such that a value of in-phase component in a waveform of known signal corresponding to one of the plurality of antennas is equal to a value of quadrature component in a waveform of known signal corresponding to another of the plurality of antennas and a value of quadrature component in a waveform of known signal corresponding to one of the plurality of antennas is equal to a value of in-phase component in a waveform of known signal corresponding to another of plurality of antennas.

The program may further comprise the function of determining the number of antennas, that are to transmit signals, among the plurality of antennas, wherein the transmitting may transmit the signals via antennas whose number has been determined by the determining and wherein, if one of antennas that are to transmit the signals is called a main antenna and the remaining antennas are called sub-antennas, then the storing in a memory may define the plurality of stored known signals in a manner such that the number of carriers used only for a known signal corresponding to the main antenna becomes equal to or greater than the number of carriers used only for a known signal corresponding to one of the sub-antennas, and the known signal corresponding to the main antenna may be such that the number of carriers to be used is the same irrespective of the determined number of antennas and the known signal corresponding to the main antenna may be defined by a different value of known signal according to the determined number of antennas.

Among the plurality of known signals in the storing in a memory the known signal corresponding to the main antenna and the known signal corresponding to the sub-antennas may use mutually different carriers. If the number of antennas that are to transmit signals differs, a known signal, corresponding to the main antenna, among the known signals in the storing a memory may be defined by a value that diminishes cross-correlation characteristics among the known signals corresponding to the main antenna. Among the known signals in the storing in a memory a known signal corresponding to the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain.

Among the plurality of known signals in the storing in a memory a known signal corresponding to the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted. Among the plurality of known signals in the storing in a memory, known signals corresponding to the sub-antennas may be defined by values that mutually diminish cross-correlation characteristics. Among the plurality of known signals in the storing in a memory a plurality of carriers to be used respectively by a known signal corresponding to the main antenna and known signals corresponding to the sub-antennas may be defined in such a manner as to associate with any of a plurality of carriers used when a known signal is transmitted from an antenna.

Among the plurality of known signals in the storing in a memory a known signal may be defined in a manner such that an absolute value of in-phase component in a waveform of known signal corresponding to one of the plurality of antennas is equal to an absolute value of quadrature component in a waveform of known signal corresponding to another of the plurality of antennas and the sign thereof is inverted whereas an absolute value of quadrature component in a waveform of known signal corresponding to one of the plurality of antennas is equal to an absolute value of in-phase component in a waveform of known signal corresponding to another of the plurality of antennas and the sign thereof.

Still another preferred embodiment according to the present invention relates to a receiving apparatus. This apparatus comprises: a receiver which receives a plurality of signals transmitted respectively from a plurality of transmitting antennas where one of the plurality of transmitting antennas is called a main antenna and the remaining antennas are called sub-antennas; a detector which detects from the received signals a known signal contained in signals transmitted from the main antenna; an estimation unit which estimates, in accordance with a value of the detected known signal, the number of antennas that transmit signals among the plurality of transmitting antennas including the main antenna and sub-antennas; and a processing unit which processes the received signals in accordance with the estimated number of antennas. In this receiving apparatus, among the plurality of signals which have been transmitted respectively from the plurality of transmitting antennas and are to be received by the receiver, the known signal contained in signals transmitted from the main antenna may be defined by a value that differs according to the number of antennas transmitting signals, and the estimation unit may store beforehand a relationship between a value of known signal contained in signals transmitted from the main antenna and the number of antennas transmitting signals and may estimate the number of antennas transmitting the signals by associating a value of the detected known signal to the relationship.

By employing the above apparatus, the number of antennas transmitting data from a transmitting side can be specified or estimated in accordance with the received known signal, so that there is no need of sending notification from the transmitting apparatus to the receiving apparatus about the number of antennas transmitting the data.

A plurality of signals, which have been transmitted respectively from a plurality of transmitting antennas and are to be received by the receiver, may use respectively a plurality of carriers. And the number of carriers to be used only for a known signal transmitted from the main antenna may be greater than or equal to the number of carriers to be used only for the sub-antenna and the known signal transmitted from the main antenna may be such that the number of carriers to be used is the same, irrespective of the number of antennas transmitting the signals. Among a plurality of signals which have been transmitted respectively from a plurality of transmitting antennas and are to be received by the receiver, a known signal to be transmitted from the main antenna and a known signal to be transmitted from the sub-antenna may use mutually different carriers.

Among a plurality of signals which have been transmitted respectively from a plurality of transmitting antennas and are to be received by the receiver, if the number of antennas transmitting signals differs, a known signal to be transmitted from the main antenna may be defined by a value that diminishes cross-correlation characteristics among known signals to be transmitted from the main antenna. Among a plurality of signals which have been transmitted respectively from a plurality of transmitting antennas and are to be received by the receiver, a known signal to be transmitted from the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain.

Among a plurality of signals which have been transmitted respectively from a plurality of transmitting antennas and are to be received by the receiver, a known signal to be transmitted from the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted.

Among a plurality of signals which have been transmitted respectively from a plurality of transmitting antennas and are to be received by the receiver, known signals to be transmitted from the sub-antennas may be defined by values that mutually diminish cross-correlation characteristics. Among a plurality of signals which have been transmitted respectively from a plurality of transmitting antennas and are to be received by the receiver, a plurality of carriers to be used respectively by a known signal to be transmitted from the main antenna and known signals to be transmitted from the sub-antennas may be defined in such a manner as to associate with any of a plurality of carriers used when a known signal is transmitted from an antenna.

Still another preferred embodiment according to the present invention relates to a receiving method. This method is characterized in that, if one of a plurality of transmitting antennas is called a main antenna and the remaining antennas are called sub-antennas and if a known signal contained in signals transmitted from the main antenna is defined by different values according to the number of antenna transmitting signals, then a plurality of signals transmitted respectively from the plurality of transmitting antennas are received, the known signal contained in signals transmitted from the main antenna is detected from the received signals and, in accordance with a value of the detected known signal, the number of antennas that transmit signals among the plurality of transmitting antennas including the main antenna and sub-antennas is estimated.

Still another preferred embodiment according to the present invention relates also to a receiving method. This method includes: receiving a plurality of signals transmitted respectively from a plurality of transmitting antennas where one of the plurality of transmitting antennas is called a main antenna and the remaining antennas are called sub-antennas; detecting from the received signals a known signal contained in signals transmitted from the main antenna; estimating, in accordance with a value of the detected known signal, the number of antennas that transmit signals among the plurality of transmitting antennas including the main antenna and sub-antennas; and processing the received signals in accordance with the estimated number of antennas. In this receiving method, among the plurality of signals which have been transmitted respectively from the plurality of transmitting antennas and are to be received by the receiving, the known signal contained in signals transmitted from the main antenna may be defined by a value that differs according to the number of antennas transmitting signals, and the estimating may be such that a relationship between a value of known signal contained in signals transmitted from the main antenna and the number of antennas transmitting signals is stored in advance and the number of antennas transmitting the signals is estimated by associating a value of the detected known signal to the relationship.

A plurality of signals, which have been transmitted respectively from a plurality of transmitting antennas and are to be received by the receiving, may use respectively a plurality of carriers. And the number of carriers to be used only for a known signal transmitted from the main antenna may be greater than or equal to the number of carriers to be used only for the sub-antenna and the known signal transmitted from the main antenna may be such that the number of carriers to be used is the same, irrespective of the number of antennas transmitting the signals. Among a plurality of signals which have been transmitted respectively from a plurality of transmitting antennas and are to be received by the receiving a known signal to be transmitted from the main antenna and a known signal to be transmitted from the sub-antenna may use mutually different carriers.

Among a plurality of signals which have been transmitted respectively from a plurality of transmitting antennas and are to be received by the receiving, if the number of antennas transmitting signals differs, a known signal to be transmitted from the main antenna may be defined by a value that diminishes cross-correlation characteristics among known signals to be transmitted from the main antenna. Among a plurality of signals which have been transmitted respectively from a plurality of transmitting antennas and are to be received by the receiving, a known signal to be transmitted from the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain.

Among a plurality of signals which have been transmitted respectively from a plurality of transmitting antennas and are to be received by the receiving, a known signal to be transmitted from the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted.

Among a plurality of signals which have been transmitted respectively from a plurality of transmitting antennas and are to be received by the receiving, known signals to be transmitted from the sub-antennas may be defined by values that mutually diminish cross-correlation characteristics. Among a plurality of signals which have been transmitted respectively from a plurality of transmitting antennas and are to be received by the receiving, a plurality of carriers to be used respectively by a known signal to be transmitted from the main antenna and known signals to be transmitted from the sub-antennas may be defined in such a manner as to associate with any of a plurality of carriers used when a known signal is transmitted from an antenna.

Still another preferred embodiment according to the present invention relates to a program. This program includes the functions of: receiving via a wireless network a plurality of signals transmitted respectively from a plurality of transmitting antennas where one of the plurality of transmitting antennas is called a main antenna and the remaining antennas are called sub-antennas; detecting from the received signals a known signal contained in signals transmitted from the main antenna and storing the detected known signal in a memory; estimating, in accordance with a value of the known signal stored in the memory, the number of antennas that transmit signals among the plurality of transmitting antennas including the main antenna and sub-antennas; and processing the received signals in accordance with the estimated number of antennas. In this program, among the plurality of signals which have been transmitted respectively from the plurality of transmitting antennas and are to be received by the receiving, the known signal contained in signals transmitted from the main antenna may be defined by a value that differs according to the number of antennas transmitting signals, and the estimating may be such that a relationship between a value of known signal contained in signals transmitted from the main antenna and the number of antennas transmitting signals is stored in advance by the memory and the number of antennas transmitting the signals is estimated by associating a value of the stored known signal to the relationship stored in the memory.

A plurality of signals, which have been transmitted respectively from a plurality of transmitting antennas and are to be received by the receiving, may use respectively a plurality of carriers. And the number of carriers to be used only for a known signal transmitted from the main antenna may be greater than or equal to the number of carriers to be used only for the sub-antenna and the known signal transmitted from the main antenna may be such that the number of carriers to be used is the same, irrespective of the number of antennas transmitting the signals. Among a plurality of signals which have been transmitted respectively from a plurality of transmitting antennas and are to be received by the receiving a known signal to be transmitted from the main antenna and a known signal to be transmitted from the sub-antenna may use mutually different carriers. Among a plurality of signals which have been transmitted respectively from a plurality of transmitting antennas and are to be received by the receiving, if the number of antennas transmitting signals differs, a known signal to be transmitted from the main antenna may be defined by a value that diminishes cross-correlation characteristics among known signals to be transmitted from the main antenna.

Among a plurality of signals which have been transmitted respectively from a plurality of transmitting antennas and are to be received by the receiving a known signal to be transmitted from the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain. Among a plurality of signals which have been transmitted respectively from a plurality of transmitting antennas and are to be received by the receiving a known signal to be transmitted from the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted.

Among a plurality of signals which have been transmitted respectively from a plurality of transmitting antennas and are to be received by the receiving, known signals to be transmitted from the sub-antennas may be defined by values that mutually diminish cross-correlation characteristics. Among a plurality of signals which have been transmitted respectively from a plurality of transmitting antennas and are to be received by the receiving, a plurality of carriers to be used respectively by a known signal to be transmitted from the main antenna and known signals to be transmitted from the sub-antennas may be defined in such a manner as to associate with any of a plurality of carriers used in a case when a known signal is transmitted from an antenna.

Still another preferred embodiment according to the present invention relates to a communication system. This system comprises: a transmitting apparatus having a plurality of antennas; and a receiving apparatus which receives, by a plurality of antennas, signals transmitted from the transmitting apparatus. In this system, the transmitting apparatus includes: a transmitter which transmits signals using a plurality of carriers via the plurality of antennas; and a storage unit which stores respectively a plurality of known signals that correspond respectively to the plurality of antennas and are to be transmitted from the transmitter in a predetermined period, wherein among the plurality of known signals stored by the storage unit a known signal corresponding to one of the plurality of antennas uses carriers which differ at least partially from carriers used for a known signal corresponding to another antenna among the plurality of antennas.

Among the plurality of known signals stored by the storage unit, an autocorrelation characteristic of a known signal corresponding to one of the plurality of antennas may be defined in such a manner as to be higher than that of a known signal corresponding to another antenna among the plurality of antennas. The number of the plurality of antennas may be three or more and, among the plurality of known signals stored by the storage unit, cross-correlation characteristics between a known signal corresponding to one of the plurality of antennas and the remaining respective known signals corresponding to other antennas among the plurality of antennas may be defined in such a manner as to be lower than those among the remaining respective known signals corresponding to the other antennas.

If among a plurality of carries to be transmitted from the transmitter the number of carriers to be used only for a known signal corresponding to one of the plurality of antennas is a first value and the number of carriers to be used only for a known signal corresponding to another antenna among the plurality of antennas is a second value, then the plurality of known signals stored by the storage unit may be defined in a manner such that the first value is greater than the second value. The number of the plurality of antennas may be three or more and, for the plurality of known signal stored by the storage unit, the second value may be the number of carriers that have been used only for the known signal corresponding to one of the other antennas. For the plurality of known signals stored by the storage unit the second value may be zero.

The plurality of known signals stored by the storage unit may respectively use mutually different carriers. The plurality of known signals stored by the storage unit may respectively use carriers a predetermined number that have been discretely selected from among a plurality of carriers. The plurality of known signals stored by the storage unit are respectively defined in such a manner that a difference in frequency between a carrier having the highest frequency and a carrier having the lowest frequency is mutually equal among the predetermined number of discretely selected carriers. The plurality of known signals stored by the storage unit may respectively use mutually different carriers. The plurality of known signals stored by the storage unit may be respectively defined in such a manner that the equal number of carriers is used for the respective known signals. Among the plurality of known signals stored by the storage unit, the number of carriers to be used for a known signal corresponding to one of the plurality of antennas may be greater than the number of carriers to be used for a known signal corresponding to another antenna of the plurality of antennas. A plurality of carriers used for the plurality of known signals stored by the storage unit may be defined beforehand in part among the plurality of carriers to be transmitted from the transmitter, and the plurality of known signals stored by the storage unit may use at least one of carriers selected from among the plurality of carriers defined beforehand. The plurality of known signals stored by the storage unit may be defined in a manner such that a value of in-phase component in a waveform of known signal corresponding to one of the plurality of antennas is equal to a value of quadrature component in a waveform of known signal corresponding to another of the plurality of antennas and a value of quadrature component in a waveform of known signal corresponding to one of plurality of antennas is equal to a value of in-phase component in a waveform of known signal corresponding to another of plurality of antennas.

The transmitting apparatus in this system may further comprise a determination unit which determines the number of antennas, that are to transmit signals, among the plurality of antennas, wherein the transmitting apparatus may transmit the signals via antennas whose number has been determined by the determination unit, and wherein, if one of antennas that are to transmit the signals is called a main antenna and the remaining antennas are called sub-antennas, then the storage unit may define the plurality of stored known signals in a manner such that the number of carriers used only for a known signal corresponding to the main antenna becomes equal to or greater than the number of carriers used only for a known signal corresponding to one of the sub-antennas, and the known signal corresponding to the main antenna may be such that the number of carriers to be used is the same irrespective of the determined number of antennas and the known signal corresponding to the main antenna is defined by a different value of known signal according to the determined number of antennas.

Among the plurality of known signals stored by the storage unit the known signal corresponding to the main antenna and the known signal corresponding to the sub-antennas may use mutually different carriers. If the number of antennas that are to transmit signals differs, a known signal corresponding to the main antenna among the plurality of known signals stored by the storage unit may be defined by a value that diminishes cross-correlation characteristics among the known signals corresponding to the main antenna. Among the plurality of known signals stored by the storage unit a known signal corresponding to the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain.

Among the plurality of known signals stored by the storage unit a known signal corresponding to the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted. Among the plurality of known signals stored by the storage unit, known signals corresponding to the sub-antennas may be defined by values that mutually diminish cross-correlation characteristics. Among the plurality of known signals stored by the storage unit a plurality of carriers to be used respectively by a known signal corresponding to the main antenna and known signals corresponding to the sub-antennas may be defined in such a manner as to associate with any of a plurality of carriers used when a known signal is transmitted from an antenna.

A receiving apparatus comprises: a receiver which receives a plurality of signals transmitted respectively from a plurality of transmitting antennas where one of the plurality of transmitting antennas is called a main antenna and the remaining antennas are called sub-antennas; a detector which detects from the received signals a known signal contained in signals transmitted from the main antenna; an estimation unit which estimates, in accordance with a value of the detected known signal, the number of antennas that transmit signals among the plurality of transmitting antennas including the main antenna and sub-antennas; and a processing unit which processes the received signals in accordance with the estimated number of antennas, wherein among the plurality of signals which have been transmitted respectively from the plurality of transmitting antennas and are to be received by the receiver the known signal contained in signals transmitted from the main antenna may be defined by a value that differs according to the number of antennas transmitting signals, and wherein the estimation unit may store beforehand a relationship between a value of known signal contained in signals transmitted from the main antenna and the number of antennas transmitting signals and may estimate the number of antennas transmitting the signals by associating a value of the detected known signal to the relationship.

Among the plurality of signals which have been transmitted respectively from the plurality of transmitting antennas and are to be received by the receiver, a plurality of carriers to be used respectively for a known signal to be transmitted from the main antenna and known signals to be transmitted from the sub-antennas may be defined in a manner such that the plurality of carriers are associated with any of a plurality of carriers used when a known signal is transmitted from a single antenna, and the known signal to be transmitted from the main antenna is such that the number of carriers to be used is the same irrespective of the number of antennas that transmit signals, and the detector, which intends to cover a plurality of carriers used for known signals transmitted from the main antenna, may detect a known signal contained in the main antenna or a known signal in a case when signals are transmitted from a single antenna.

A plurality of signals, which have been transmitted respectively from a plurality of transmitting antennas and are to be received by the receiver, may use respectively a plurality of carriers. And the number of carriers to be used only for a known signal transmitted from the main antenna may be greater than or equal to the number of carriers to be used only for the sub-antenna and the known signal transmitted from the main antenna may be such that the number of carriers to be used is the same, irrespective of the number of antennas transmitting the signals. Among a plurality of signals which have been transmitted respectively from a plurality of transmitting antennas and are to be received by the receiver a known signal to be transmitted from the main antenna and a known signal to be transmitted from the sub-antenna may use mutually different carriers.

Among a plurality of signals which have been transmitted respectively from a plurality of transmitting antennas and are to be received by the receiver, if the number of antennas transmitting signals differs, a known signal to be transmitted from the main antenna may be defined by a value that diminishes cross-correlation characteristics among known signals to be transmitted from the main antenna. Among a plurality of signals which have been transmitted respectively from a plurality of transmitting antennas and are to be received by the receiver a known signal to be transmitted from the main antenna has an in-phase component and a quadrature component in time domain and may be defined, for two types of the numbers of antennas that are to transmit the signals, in a manner such that a value of in-phase component of a first-type known signal in time domain is equal to a value of quadrature component of a second-type known signal in time domain and a value of quadrature component of the first-type known signal in time domain is equal to a value of in-phase component of the second-type known signal in time domain.

Among a plurality of signals which have been transmitted respectively from a plurality of transmitting antennas and are to be received by the receiver a known signal to be transmitted from the main antenna has an in-phase component and a quadrature component in time domain and may be defined, for two types of the numbers of antennas that are to transmit the signals, in a manner such that an absolute value of in-phase component of a first-type known signal in time domain is equal to an absolute value of quadrature component of a second-type known signal in time domain and the sign thereof is inverted and an absolute value of quadrature component of the first-type known signal in time domain is equal to an absolute value of in-phase component of the second-type known signal in time domain and the sign thereof is inverted. Among a plurality of signals which have been transmitted respectively from a plurality of transmitting antennas and are to be received by the receiver, known signals to be transmitted from the sub-antennas may be defined by values that mutually diminish cross-correlation characteristics. Among a plurality of signals which have been transmitted respectively from a plurality of transmitting antennas and are to be received by the receiver, a plurality of carriers to be used respectively by a known signal to be transmitted from the main antenna and known signals to be transmitted from the sub-antennas may be defined in such a manner as to associate with any of a plurality of carriers used when a known signal is transmitted from an antenna.

Still another preferred embodiment according to the present invention relates also to a transmitting apparatus. This apparatus comprises: an output unit which outputs a plurality of series signals; and a storage unit which stores respectively a plurality of known signals that are contained in a predetermined period among a plurality of known signals that correspond respectively to the plurality of series signals. Each of the plurality of series signals outputted from the output unit may use a plurality of carriers, and among the plurality of known signals stored by the storage unit a known signal corresponding to one of the plurality of series signals may use carriers which differ at least partially from carriers used for a known signal corresponding to another series signal among the plurality of series signals.

By employing the above apparatus, a plurality of known signals are outputted by using carriers which differ at least partially, so that the cross-correlation among the plurality of known signals becomes small and a plurality of known signals outputted can be accurately received by a receiving apparatus.

Still another preferred embodiment according to the present invention relates also to a transmitting method. This method includes acquiring a plurality of known signals from a memory which stores a plurality of known signals corresponding respectively to a plurality of series signals and outputting a plurality of series signals while the plurality of acquired known signals are being contained in a predetermined period, wherein each of the plurality of series signals outputted uses a plurality of carriers and wherein among the plurality of known signals stored a known signal corresponding to one of the plurality of series signals uses carriers which differ at least partially from carriers used for a known signal corresponding to another series signal among the plurality of series signals.

Still another preferred embodiment according to the present invention relates also to a transmitting method. This method includes: acquiring a plurality of known signals from a memory which stores respectively a plurality of known signals corresponding respectively to a plurality of series signals; and outputting a plurality of series signals while the plurality of known signals acquired by the acquiring are being contained in a predetermined period. Each of the plurality of series signals outputted in the outputting uses a plurality of carriers, and among the plurality of known signals stored in the memory in the acquiring a known signal corresponding to one of the plurality of series signals uses carriers which differ at least partially from carriers used for a known signal corresponding to another series signal among the plurality of series signals.

Among the plurality of known signals stored in the memory in the acquiring, an autocorrelation characteristic of a known signal corresponding to one of the plurality of series signals may be defined in such a manner as to be higher than that of a known signal corresponding to another series signal among the plurality of series signals. The plurality of known signals stored in the memory in the acquiring may respectively use mutually different carriers. The plurality of known signals stored in the memory in the acquiring may respectively use a predetermined number of carriers that have been discretely selected from among a plurality of carriers. The plurality of known signals stored in the memory in the acquiring may be respectively defined in such a manner that a difference in frequency between a carrier having the highest frequency and a carrier having the lowest frequency is mutually equal among the predetermined number of discretely selected carriers. The plurality of known signals stored in the memory in the acquiring may respectively use mutually different carriers. The plurality of known signals stored in the memory in the acquiring may be defined in such a manner that the equal number of carriers is used for the respective known signals.

Among the plurality of known signals stored in the memory in the acquiring, the number of carriers to be used for a known signal corresponding to one of the plurality of series signals may be greater than the number of carriers to be used for a known signal corresponding to another series signal of the plurality of series signal. A plurality of carriers used for the plurality of known signals stored in the memory in the acquiring may be defined beforehand in part among the plurality of carriers to be transmitted from a transmitter and the plurality of known signals stored in the memory in the acquiring use at least one of carriers selected from among the plurality of carriers defined beforehand.

The plurality of known signals stored in the memory in the acquiring may be defined in a manner such that a value of in-phase component in a waveform of known signal corresponding to one of the plurality of series signals is equal to a value of quadrature component in a waveform of known signal corresponding to another of the plurality of series signals and a value of quadrature component in a waveform of known signal corresponding to one of plurality of series signals is equal to a value of in-phase component in a waveform of known signal corresponding to another of the plurality of series signals.

The plurality of known signals stored in the memory in the acquiring may be defined in a manner such that an absolute value of in-phase component in a waveform of known signal corresponding to one of the plurality of series signals is equal to an absolute value of quadrature component in a waveform of known signal corresponding to another of the plurality of series signals and the sign thereof is inverted whereas an absolute value of quadrature component in a waveform of known signal corresponding to one of plurality of series signals is equal to an absolute value of in-phase component in a waveform of known signal corresponding to another of the plurality of series signals and the sign thereof is inverted.

Still another preferred embodiment according to the present invention relates also to a program executable by a computer. This program includes the functions of: acquiring respectively a plurality of known signals from a memory which stores respectively a plurality of known signals corresponding respectively to a plurality of series signals; and outputting a plurality of series signals while the plurality of known signals acquired by the acquiring are being contained in a predetermined period. In this program each of the plurality of series signals outputted in the outputting uses a plurality of carriers, and among the plurality of known signals stored in the memory in the acquiring a known signal corresponding to one of the plurality of series signals uses carriers which differ at least partially from carriers used for a known signal corresponding to another series signal among the plurality of series signals.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 8A to 8C show structures of burst formats according to a first embodiment of the present invention.

FIG. 18 shows a relationship between the number of transmitting antennas for transmitting data and the patterns of STSs transmitted from transmitting antennas, according to a sixth embodiment of the present invention.

FIG. 24 shows a relationship between the number of transmitting antennas for transmitting data and the patterns of STSs transmitted from the transmitting antennas, according to a seventh embodiment of the present invention.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

First Embodiment

Before describing the present invention in detail, an outline of the present invention will be described first. A first embodiment of the present invention relates to a MIMO system which comprises a transmitting apparatus equipped with a plurality of antennas and a receiving apparatus equipped with a plurality of antennas. The MIMO system according to the present embodiment transmits signals by multi-carriers, or more specifically OFDM (Orthogonal Frequency Division Multiplexing) modulation scheme, and the transmitted signals form burst signals. A preamble signal is placed at the head of a burst signal. And a receiving apparatus, which has received a signal, carries out the setting of AGC, the synchronization of timing, the recovery of carriers and the like, based on the preamble signal. In a MIMO system, independent signals are transmitted from a plurality of antennas of a transmitting apparatus and a receiving apparatus demodulates desired signals by separating received signals by adaptive array signal processing. During the period of a preamble signal, however, the weighting for an adaptive array signal processing is not complete, so that the signals cannot be fully separated by an adaptive array signal processing. A transmitting apparatus according to the present embodiment defines a plurality of preamble signals in such a way as to cause a smaller correlation between a plurality of preamble signals transmitted respectively by a plurality of antennas. As a result, even when the separation of signals by an adaptive array signal processing is not adequate, there is little interference among the preamble signals.

Figure 1:
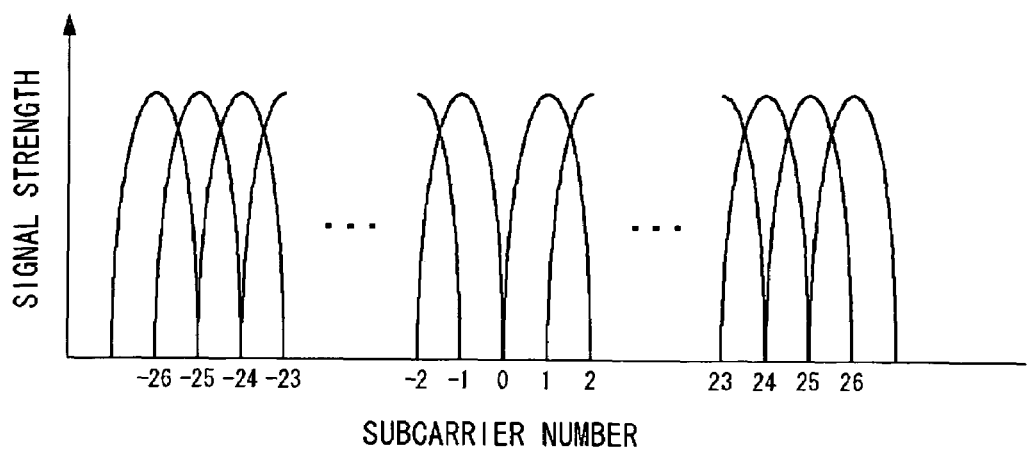
FIG. 1 illustrates a spectrum of a multi-carrier signal according to a first embodiment of the present invention.

FIG. 1 illustrates a spectrum of a multi-carrier signal according to the first embodiment. FIG. 1 shows a spectrum of a signal in a wireless LAN (Local Area Network) conforming to the IEEE802.11a standard as a wireless system employing an OFDM modulation scheme. One of a plurality of carriers in an OFDM scheme is generally called a subcarrier. Herein, however, each of the subcarriers is designated by a "subcarrier number". As illustrated in FIG. 1, the IEEE802.11a standard defines 53 subcarriers, namely, subcarrier numbers "−26" to "26". It is to be noted that the subcarrier number "0" is set to null so as to reduce the effect of a direct current component in a baseband signal. Also, the respective subcarriers are modulated by BPSK, QSPK, 16 QAM and 64 QAM.

Figure 2:
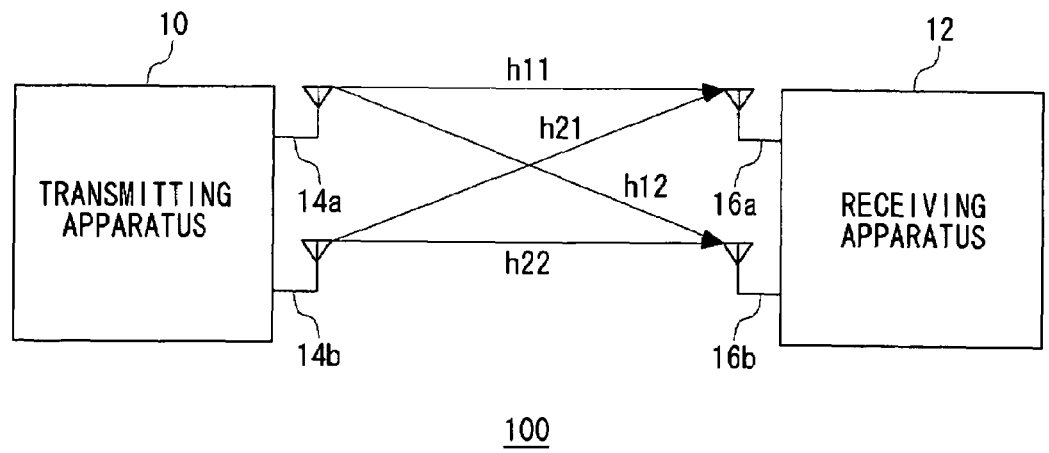
FIG. 2 illustrates a concept of a communication system according to a first embodiment of the present invention.

FIG. 2 illustrates a concept of a communication system 100 according to the first embodiment. The communication system 100 includes a transmitting apparatus 10 and a receiving apparatus 12. The transmitting apparatus 10 includes a first transmitting antenna 14a and a second transmitting antenna 14b, which are generically called transmitting antennas 14, and the receiving apparatus 12 includes a first receiving antenna 16a and a second receiving antenna 16b, which are generically called receiving antennas 16.

The transmitting apparatus 10 transmits signals, whereas the first transmitting antenna 14a and the second transmitting antenna 14b transmit different signals. The receiving apparatus 12 receives the signals transmitted from the first transmitting antenna 14a and the second transmitting antenna 14b by the first receiving antenna 16a and the second receiving antenna 16b. The receiving apparatus 12 separates received signals by adaptive array signal processing and demodulates the signals transmitted from the first transmitting antenna 14a and the second transmitting antenna 14b independently. Here, if channel characteristic between the first transmitting antenna 14a and the first receiving antenna 16a is denoted by $h_{11}$, that between the first transmitting antenna 14a and the second receiving antenna 16b by $h_{12}$, that between the second transmitting antenna 14b and the first receiving antenna 16a by $h_{21}$, and that between the second transmitting antenna 14b and the second receiving antenna 16b by $h_{22}$, then the receiving apparatus 12 operates in such a manner as to activate $h_{11}$ and $h_{22}$ only by an adaptive array signal processing and demodulate the signals transmitted from the first transmitting antenna 14a and the second transmitting antenna 14b independently.

Figure 3:
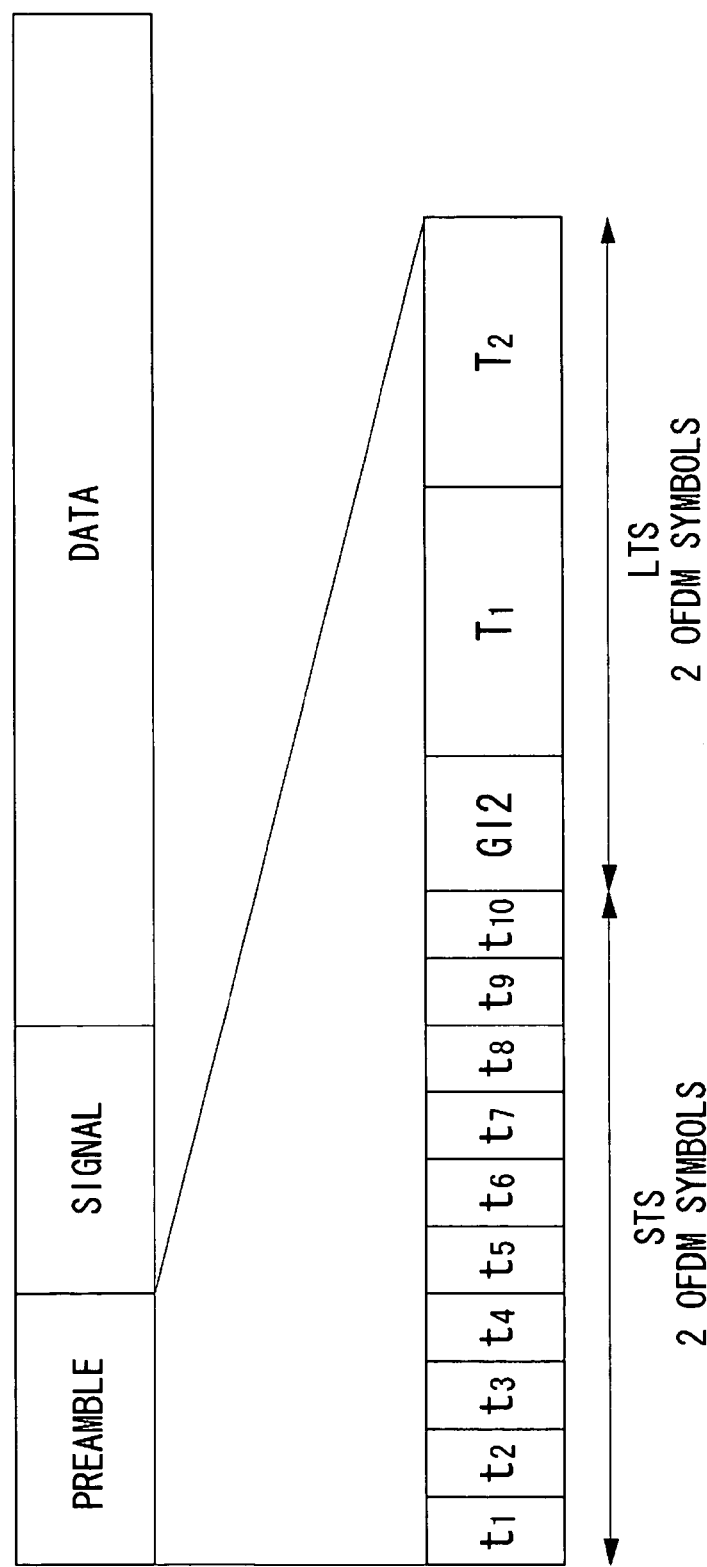
FIG. 3 shows a structure of a burst format according to a first embodiment of the present invention.

FIG. 3 shows a structure of a burst format according to the first embodiment. However, this does not correspond to a MIMO system. Instead, this burst format corresponds to a traffic channel of IEE802.11a standard. In the OFDM modulation scheme, the total sum of the size of Fourier transform and the number of symbols of a guard interval generally constitutes one unit. This "one unit" is called an OFDM symbol in the present embodiment. In the IEEE802.11 standard, the size of Fourier transform is 64 (hereinafter the points of one FFT (Fast Fourier Transform) will be called "FFT point") and the FFT point number of a guard interval is 16, so that the OFDM symbol corresponds to 80 FFT points.

As illustrated in FIG. 3, a "preamble" composed of "4 OFDM symbols" is placed in the leading portion of a burst signal. And a "signal" of "1 OFDM symbol" and "data" of arbitrary length in this order are placed subsequent to the "preamble". The "preamble" is a known signal used for the setting of AGC, timing synchronization and carrier recovery and the like in the receiving apparatus 12. The "signal" is a control signal whereas the "data" is information to be transmitted from the transmitting apparatus 10 to the receiving apparatus 12. As shown also in FIG. 3, the "preamble" composed of "4 OFDM symbols" are separated into "STS (Short Training Sequence)" composed of "2 OFDM symbols" and "LTS (Long Training Sequence)" composed of "2 OFDM symbols". STS is constituted by ten signal units "$t_1$" to "$t_{10}$" and each signal unit, such as "$t_1$", is equal to 16 FFT points. Though STS is 16 FFT points in time-domain unit as described above, it uses, in frequency domain, 12 subcarriers among 53 subcarriers as shown in FIG. 1. STS is used particularly for the setting of AGC and the timing synchronization. LTS, on the other hand, is constituted by two signal units "$T_1$" and "$T_2$" and a guard interval "GI2" which is twice as long as "$t_1$". And one signal unit such as "$T_1$" is 64 FFT points whereas "GI2" is 32 FFT points. LTS is used particularly for the carrier recovery.

A signal in the frequency domain as shown in FIG. 1 is expressed by $S_{-26, 26}$, where the subscript indicates the subcarrier number. Using this notation, STS of IEEE802.11a standard is expressed as in the following equation (1).

$$S_{-26,26} = sqrt(13/6)\{0,0,1+j,0,0,0,-1-j,0,0,0,1+j,0,0,$$
$$0,-1-j,0,0,0,-1-j,0,0,0,1+j,0,0,0,0,0,0,0,-1-j,0,$$
$$0,0,-1-j,0,0,0,1+j,0,0,0,1+j, 0,0,0,1+j,0,0,0,1+j,$$
$$0,0\} \quad (1)$$

where "1+j" denotes the signal point of STS after a QPSK modulation.

Now problems to be solved when STS of IEEE802.11a standard is transmitted from each of the first transmitting antenna 14a and the second transmitting antenna 14b shown in FIG. 2 will be explained. If the signal transmitted from the first transmitting antenna 14a is $S_1(t)$, the signal transmitted from the second transmitting antenna 14b is $S_2(t)$, and the noise contained in the signals is $n_1(t)$ and $n_2(t)$, then $X_1(t)$, or the signal received by the first receiving antenna 16a, and $X_2(t)$, or the signal received by the second receiving antenna 16b, will be expressed as:

$$X_1(t)=h_{11}S_1(t)+h_{21}S_2(t)+n_1(t) \quad X_2(t)=h_{12}S_1(t)+h_{22}S_2(t)+n_2(t) \quad (2)$$

The signal strength in 16 FFT of signals received by the first receiving antenna 16a is expressed as follows:

$$\sum |X_1(t)|^2 = \sum X_1(t)X_1^*(t) \quad (3)$$
$$= \sum \{h_{11}S_1(t) + h_{21}S_2(t) + n_1(t)\}\{h_{11}^*S_1^*(t) +$$
$$h_{21}^*S_2^*(t) + n_1^*(t)\}$$
$$= h_{11}h_{11}^* \sum S_1(t)S_1^*(t) + h_{21}h_{21}^* \sum S_2(t)S_2^*(t) +$$
$$h_{11}h_{21}^* \sum S_1(t)S_2^*(t) + h_{11}^*h_{21} \sum S_1^*(t)S_2(t) +$$
$$h_{11} \sum S_1(t)n_1^*(t) + h_{21} \sum S_2(t)n_1^*(t) + h_{11}^*$$
$$\sum S_1^*(t)n_1(t) + h_{21}^* \sum S_2^*(t)n_1(t) + \sum n_1(t)n_1^*(t)$$

Using the relations $\Sigma S_1^*(t)S_2(t)=Xc$, $\Sigma S_i^*(t)n_j(t)=0$ and $|n_j(t)|^2 \approx 0$, the strength is expressed by:

$$\sum |X_1(t)|^2 = |h_{11}|^2 + |h_{21}|^2 + h_{11}h_{21}^*Xc^* + h_{11}^*h_{21}Xc \quad (4)$$
$$= |h_{11}|^2 + |h_{21}|^2 + 2\text{Re}[h_{11}h_{21}^*Xc^*]$$

When the transmitted signal $S_1(t)$ and $S_2(t)$ are equal to each other and in addition $h_{11}=-h_{21}$, the strength of received signals is zero, so that the AGC of the receiving apparatus 12 does not function accurately. Furthermore, since Xc in the data interval becomes generally so small as can be regarded as zero, the received power in the data interval becomes $|h_{11}|^2 + |h_{22}|^2$. Hence, the difference in received power between the data interval and the STS interval is $2 \text{Re}[h_{11}h_{21}^*Xc^*]$ as expressed by the third term on the right-hand side of Equation 4. This indicates that even when $S_1(t)$ and $S_2(t)$ are different from each other, the AGC does not function normally if the Xc in the STS interval is large and consequently there is a large difference in power between the STS interval and the data interval. Therefore, an STS different from the STS of the IEEE802.11a standard is required for the MIMO system and the cross-correlation between them needs to be low.

Figure 4:
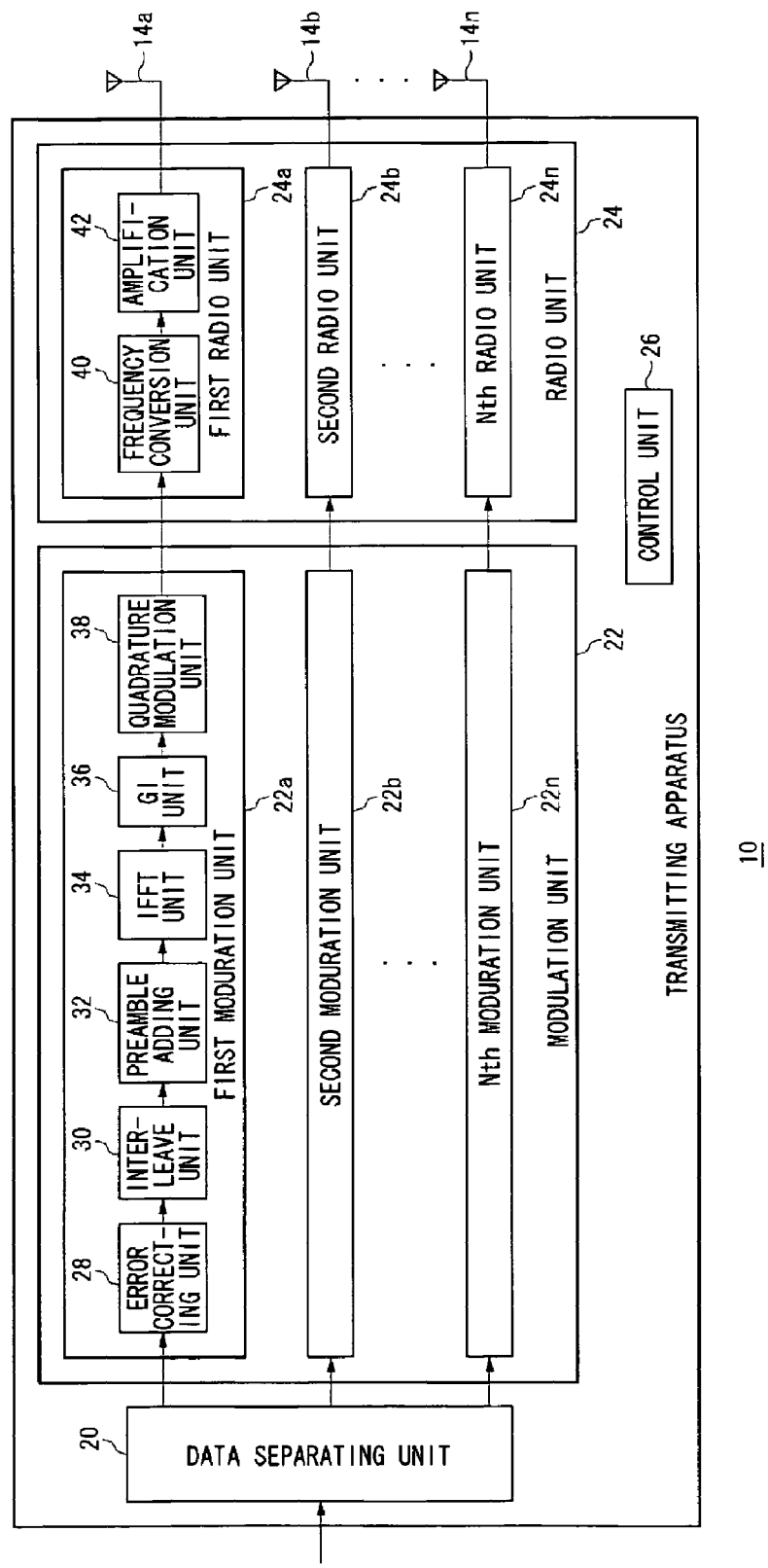
FIG. 4 illustrates a structure of the transmitting apparatus shown in FIG. 2.

FIG. 4 illustrates a structure of a transmitting apparatus 10. The transmitting apparatus 10 includes a data separating unit 20, a first modulation unit 22a, a second modulation unit 22b, . . . and an Nth modulation unit 22n, which are generically referred to as modulation units 22, a first radio unit 24a, a second radio unit 24b, . . . and an Nth radio unit 24n, which are generically referred to as radio units 24, a control unit 26, and a first transmitting antenna 14a, a second transmitting antenna 14b, . . . and an Nth transmitting antenna 14n, which are generically referred to as transmitting antennas 14 or may be simply called a plurality of antennas 14 or the like. The first modulation unit 22a includes an error correcting unit 28, an interleave unit 30, a preamble adding unit 32, an IFFT unit 34, a GI unit 36 and a quadrature modulation unit 38. The first radio unit 24a includes a frequency conversion unit 40 and an amplification unit 42.

The data separating unit 20 separates data to be transmitted into the number of data equal to that of antennas. The error correcting unit 28 performs a coding for error correction on data. The coding to be employed here is a convolutional coding, and the coding rate is to be selected from prescribed values. The interleave unit 30 interleaves data after the convolutional coding. The preamble adding unit 32 adds an STS to the head of a burst signal. Each of preamble adding units 32, which is provided for each of a plurality of transmitting antennas 14, is to store a plurality of STSs to be transmitted in a predetermined period. Although the details of the plurality of STSs will be described later, an STS corresponding to at least one of the plurality of transmitting antennas 14 must use subcarriers at least partially different from those for the STSs corresponding to the other transmitting antennas 14. In other words, it is assumed herein that each of the STSs use the same number of subcarriers, but the subcarriers used are mutually different from the others.

The IFFT unit 34 performs IFFT (Inverse Fast Fourier Transform) in units of FFT point, thereby converting a frequency-domain signal using a plurality of subcarriers into a signal in time domain. The GI unit 36 adds a guard interval to time-domain data. As illustrated in FIG. 3, the guard intervals to be added to the preamble and the data are different from each other. The quadrature modulation unit 38 carries out quadrature modulation. The frequency conversion unit 40 performs a frequency conversion trasnforming a quadrature-modulated signal into a radio-frequency signal. The amplification unit 42 is a power amplifier for amplifying radio-frequency signals. Finally, signals are transmitted from a plurality of transmitting antennas 14. The control unit 26 controls the timing and other functions of the transmitting apparatus 10. It is to be noted that in the present embodiment the transmitting antennas 14 are non-directional and the transmitting apparatus 10 does not perform adaptive array signal processing.

Figure 5:
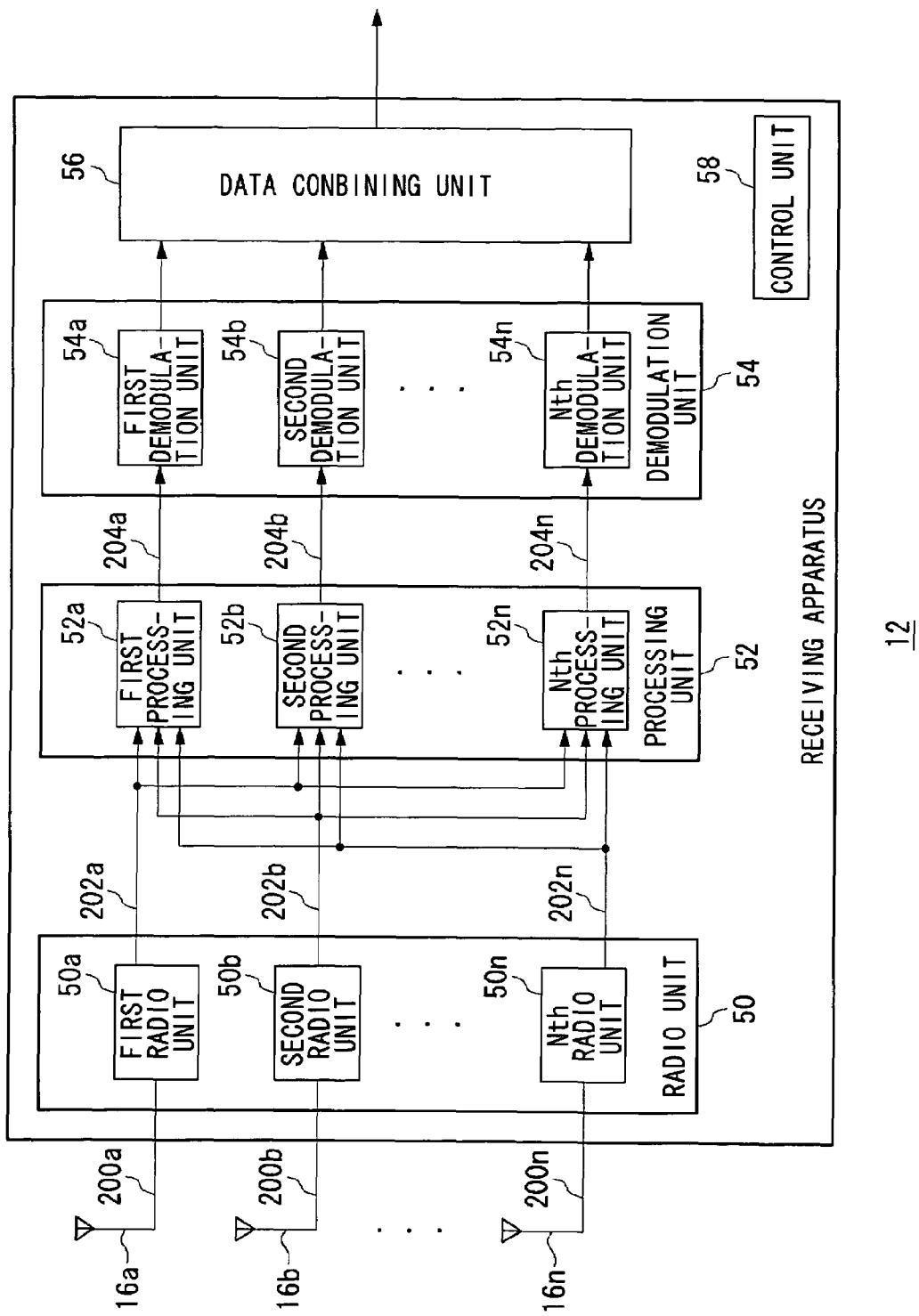
FIG. 5 illustrates a structure of a receiving apparatus 12 shown in FIG. 2.

FIG. 5 illustrates a structure of a receiving apparatus 12. The receiving apparatus 12 includes a first receiving antenna 16a, a second receiving antenna 16b, . . . and an Nth receiving antenna 16n, which are generically referred to as receiving antennas 16, a first radio unit 50a, a second radio unit 50b, . . . and an Nth radio unit 50n, which are generically referred to as radio units 50, a first processing unit 52a, a second processing unit 52b, . . . and an Nth processing unit 52n, which are generically referred to as processing units 52, a first demodulation unit 54a, a second demodulation unit 54b, . . . and an Nth demodulation unit 54n, which are generically referred to as demodulation units 54, a data combining unit 56, and a control unit 58. Signals used include a first radio received signal 200a, a second radio received signal 200b, . . . and an Nth radio received signal 200n, which are generically referred to as radio received signals 200, a first baseband received signal 202a, a second baseband received signal 202b, . . . and an Nth baseband received signal 202n, which are generically referred to as baseband received signals 202, and a first composite signal 204a, a second composite signal 204b, . . . and an Nth composite signal 204n, which are generically referred to as composite signals 204.

The radio units 50 carry out frequency conversion processing of radio received signals 200 of radio frequency into baseband received signals 202 of baseband, and the radio units 50 also carry out amplification processing, A-D conversion processing and the like. Since the communication system 100 assumed herein employs a wireless LAN conforming to the IEEE802.11a standard, the radio frequency of the radio received signals 200 is in the 5 GHz band. The radio units 50 further perform correlation processing for timing detection. The processing units 52 perform adaptive array signal processing on the baseband received signals 202 and output composite signals 204 corresponding to a plurality of transmitted signals. The demodulation units 54 demodulate the composite signals 204. The demodulation units 54 further perform the removal of guard interval, FFT, deinterleave and decoding. The data combining unit 56 combines the signals outputted respectively from the demodulation units 54 in correspondence to the data separating unit 20 as shown in FIG. 4. The control unit 58 controls the timing and other functions of the receiving apparatus 12.

Figure 6:
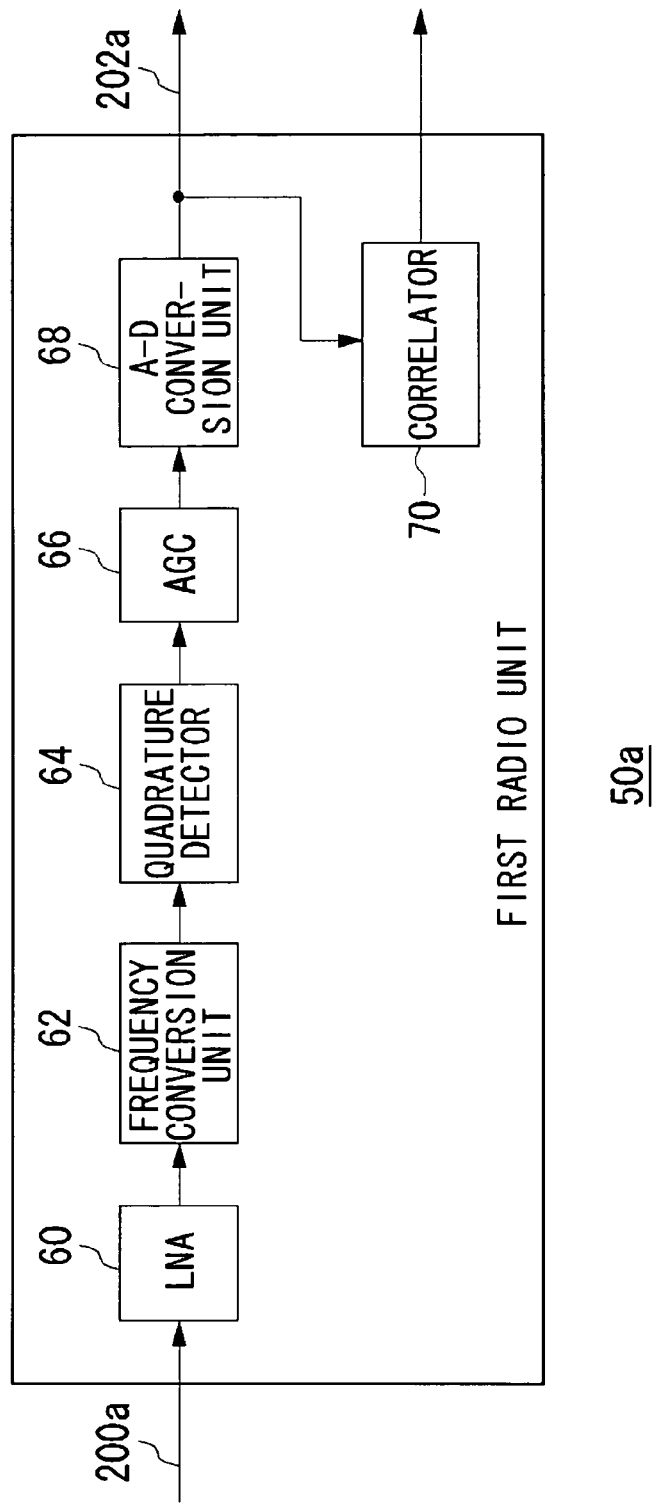
FIG. 6 illustrates a structure of the first radio unit shown in FIG. 5.

FIG. 6 illustrates a structure of a first radio unit 50a. The first radio unit 50a includes an LNA 60, a frequency conversion unit 62, a quadrature detector 64, an AGC 66, an A-D conversion unit 68, and a correlator 70.

The LNA 60 amplifies a first radio received signal 200a. The frequency conversion unit 62 carries out a frequency conversion between a radio frequency in the 5 GHz band and an intermediate frequency for a signal to be processed. The quadrature detector 64 performs a quadrature detection of an intermediate-frequency signal and generates a baseband analog signal. The AGC 66 controls gain automatically so as to turn the amplitude of a signal into an amplitude within the dynamic range of the A-D conversion unit 68. It is to be noted that, in the initial setting of the AGC 66, the STS in a received signal is used and control is performed in a manner such that the strength of the STS approaches a prescribed value. The A-D conversion unit 68 converts a baseband analog signal into a digital signal and outputs it as a first baseband received signal 202a.

In order to detect an STS from the first baseband received signal 202a, the correlator 70 performs a correlation processing on a first baseband received signal 202a and an STS stored in advance and outputs a correlation value. Although the details will be described later, STS is set for each of the transmitting antennas 14, so that the correlators 70 perform correlation processing for a plurality of STSs and output a plurality of correlation values. The correlation values are inputted to the control unit 58 shown in FIG. 5 via signal lines not shown. The control unit 58 determines the start of receiving a burst signal based on the plurality of correlation values inputted from the plurality of correlators 70 and sends the decision to the processing units 52, the demodulation units 54 and others. Also, in order to demodulate a plurality of signals, the control unit 58 determines the assignment of processing units 52 and demodulation units 54 for the respective signals and send the decision to the processing units 52 and the demodulation units 54.

Figure 7:
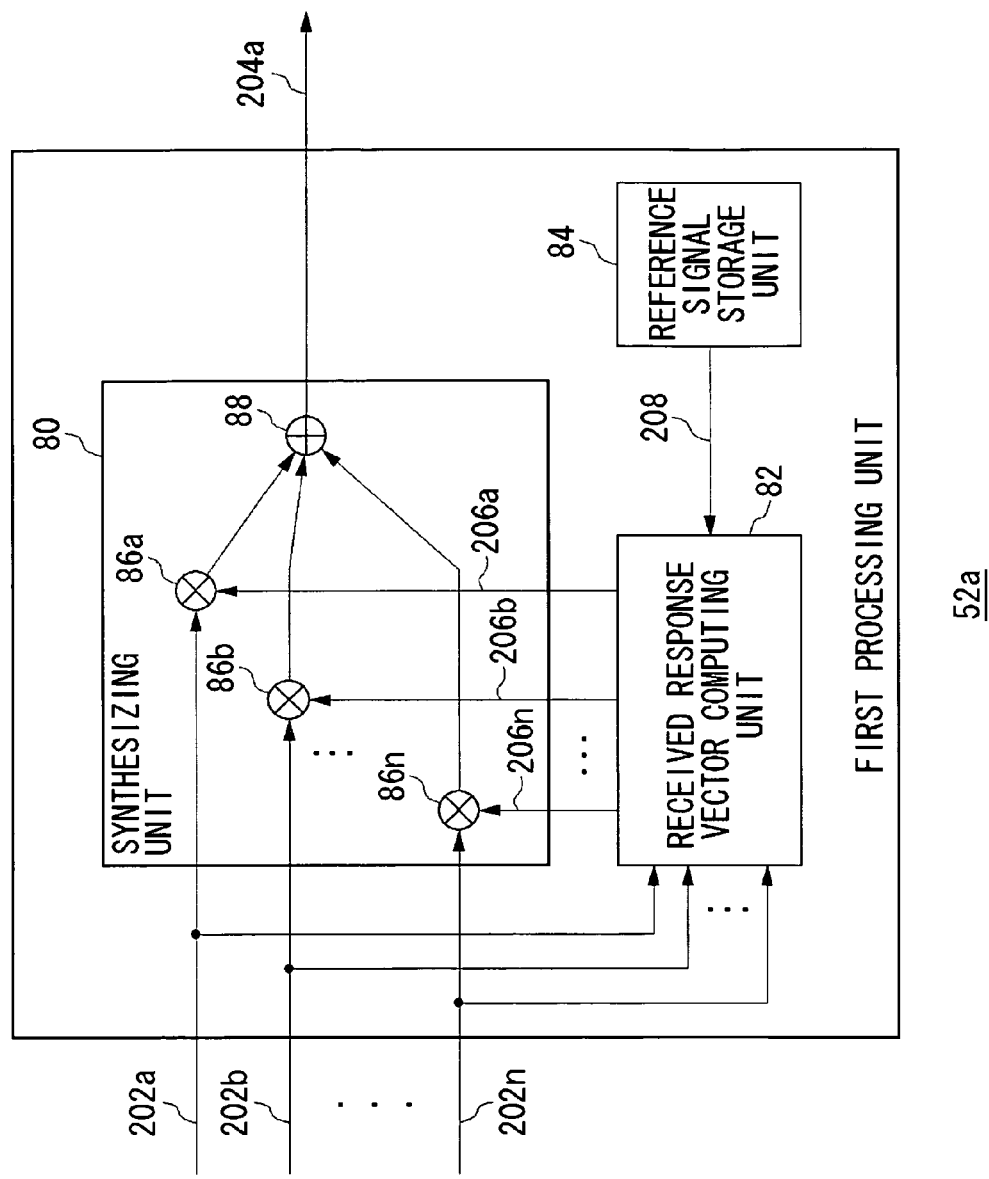
FIG. 7 illustrates a structure of the first processing unit shown in FIG. 5.

FIG. 7 illustrates a structure of a first processing unit 52a. The first processing unit 52a includes a synthesizing unit 80, a received response vector computing unit 82 and a reference signal storage unit 84. The synthesizing unit 80 includes a first multiplier 86a, a second multiplier 86b, . . . and an Nth multiplier 86n, which are generically referred to as multipliers 86, and an adder 88. Also, signals used include a first received weight signal 206a, a second received weight signal 206b, . . . and an Nth received weight signal 206n, which are generically referred to as received weight signals 206, and a reference signal 208.

The reference signal storage unit 84 stores LTSs.

The received response vector computing unit 82 computes received weight signals 206, as receiving response characteristics of received signals for transmitted signals, from baseband received signals 202 and reference signal 208. Although the method for computing the received weight signals 206 may be arbitrary, one example, as shown below, is based on a correlation processing. It is to be noted that the received weight signals 206 and the reference signal 208 are inputted not only from within the first processing unit 52a but also from the second processing unit 52b or the like via signal lines not shown. If the first baseband received signal 202a is denoted by $x_1(t)$, a second baseband received signal 202b by $x_2(t)$, the reference signal 208 corresponding to the first transmitting antenna 14a by $S_1(t)$ and the reference signal 208 corresponding to the second transmitting antenna 14b by $S_2(t)$, then $x_1(t)$ and $x_2(t)$ will be expressed by the following Equation (5):

$$x_1(t)=h_{11}S_1(t)+h_{21}S_2(t) \quad x_2(t)=h_{12}S_1(t)+h_{22}S_2(t) \tag{5}$$

The noise is ignored here. A first correlation matrix $R_1$, with E as an ensemble average, is expressed by the following Equation (6):

$$R_1 = \begin{bmatrix} E[x_1 S_1^*] & E[x_1 S_2^*] \\ E[x_2 S_1^*] & E[x_2 S_2^*] \end{bmatrix} \tag{6}$$

A second correlation matrix $R_2$ for computing the correlation among the reference signals 208 is given by the following Equation (7):

$$R_2 = \begin{bmatrix} E[S_1 S_1^*] & E[S_1 S_2^*] \\ E[S_2 S_1^*] & E[S_2 S_2^*] \end{bmatrix} \tag{7}$$

Finally, the first correlation matrix $R_1$ is multiplied by the inverse matrix of the second correlation matrix $R_2$ so as to obtain received response vectors, which is expressed by the following Equation (8):

$$\begin{bmatrix} h_{11} & h_{21} \\ h_{12} & h_{22} \end{bmatrix} = R_1 R_2^{-1} \tag{8}$$

The received weight signals are obtained based on received response vectors.

The multipliers 86 weight the baseband received signals 202 with the received weight signals 206 respectively, and the adder 88 adds up the outputs of the multipliers 86 so as to output the composite signal 204.

In terms of hardware, the above-described structure can be realized by a CPU, a memory and other LSIs of an arbitrary computer. In terms of software, it is realized by memory-loaded programs which have a reserved management function or the like, but drawn and described herein are function blocks that are realized in cooperation with those. Thus, it is understood by those skilled in the art that these function blocks can be realized in a variety of forms such as by hardware only, software only or the combination thereof.

FIGS. 8A to 8C show structures of burst formats according to the first embodiment. It is assumed here that the number of transmitting antennas in FIG. 4 is two. FIG. 8A represents a case where two burst signals are transmitted in such a manner as to overlap each other. As mentioned above, a first STS and a second STS are to be separate signal series. On the other hand, a first LTS, a second LTS, a first signal and a second signal are arbitrary signal series, whose explanation is omitted here. In FIG. 8B, of the two burst signals, the first STS and the second STS are transmitted at the same timing, then the first LTS and the first signal are transmitted at a separate timing from the second LTS and the second signal, and then the first data and the second data are transmitted at the same timing again. As mentioned above, the first STS and the second STS are to be separate signal series. On the other hand, the first LTS, the second LTS, the first signal and the second signal, which are transmitted at separate timings here, may be the same signal series, respectively. FIG. 8C illustrates a case where STS is added to one of the signals only. Otherwise, the structure is the same as FIG. 8B.

An STS suited to a MIMO system will be described below, using the same reference numerals as those used in the description of FIG. 3. The cross-correlation between $X_1(t)$ and $S_1(t)$ to be performed at a correlator 70 shown in FIG. 6 is expressed as:

$$\sum X_1(t) S_1^*(t) / sqrt\{\sum |X_1(t)|^2\} sqrt\{|S_1(t)|^2\} \tag{9}$$

$$= \sum \{(h_{11} S_1(t) + h_{21} S_2(t) + n_1(t)) S_1^*(t) / sqrt\{\sum |X_1(t)|^2\}\}$$

$$= \sum \{(h_{11} S_1(t) S_1^*(t) + h_{21} S_2(t) S_1^*(t) + S_1^*(t) n_1(t)) / sqrt\{\sum |X_1(t)|^2\}\}$$

$$= \{h_{11} \sum S_1(t) S_1^*(t) + h_{21} \sum S_1^*(t) S_2(t) +$$

$$\sum S_1^*(t) n_1(t) \} / sqrt\{|X_1(t)|^2\}$$

$$\approx (h_{11} + h_2 Xc) / sqrt\{|h_{11}|^2 + |h_{21}|^2 + \text{Re}\{h_{11} h_{21}^* Xc\}\}$$

Where $h_{11} = -h_{12} Xc$, the cross-correlation between $X_1(t)$ and $S_1(t)$ is "0". When $Xc$ is smaller, on the other hand, the equation $h_{11} = -h_{12} Xc$ does not generally hold. In other words, an STS that makes the correlation between $S_1(t)$ and $S_2(t)$ smaller is suited for a MIMO system. The cross-correlation meant here is one for the 12 subcarriers in which STSs are to be placed. There may be cases in such a relationship where the subcarrier numbers for which a plurality of STSs are placed differ. And such a case will be explained below.

Figure 9A:
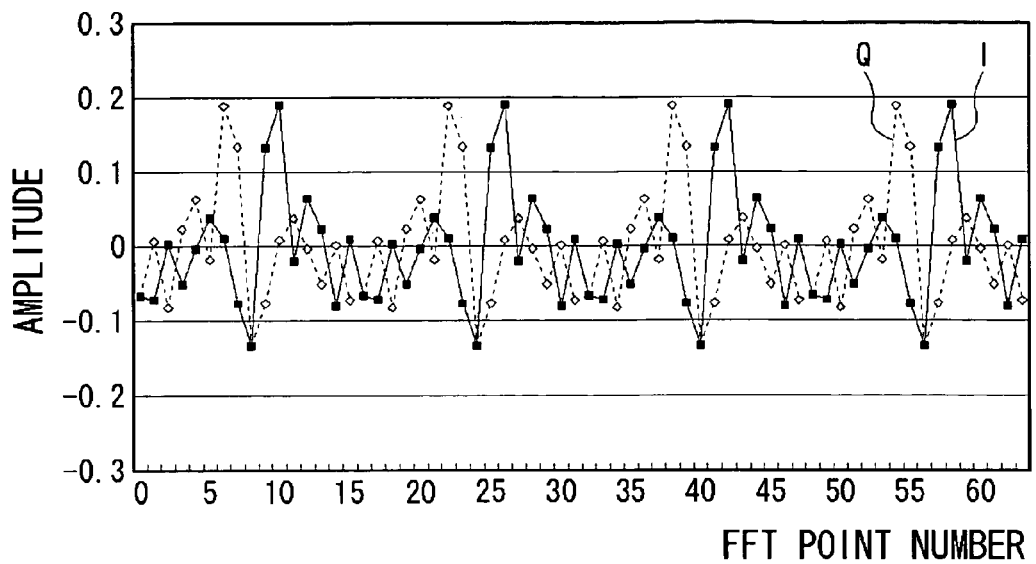
FIGS. 9A and 9B illustrate waveforms of known signals transmitted from the transmitting apparatus shown in FIG. 4.
Figure 9B:
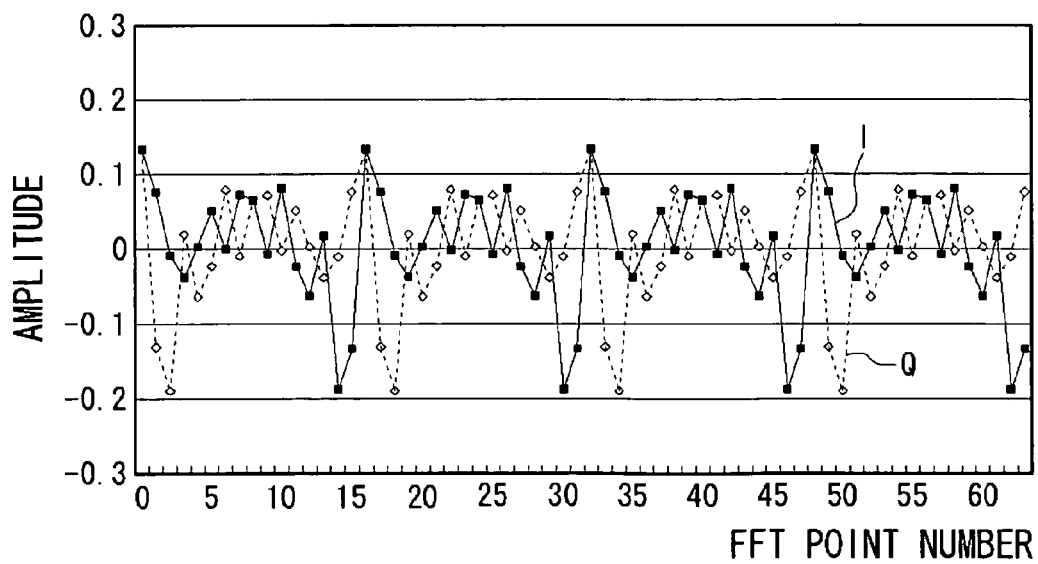

FIGS. 9A and 9B illustrate waveforms of known signals transmitted from a transmitting apparatus 10. It is assumed here that the number of transmitting antennas 14 is two. Whereas FIG. 9A shows the STSs to be transmitted from a first transmitting antenna 14a, FIG. 9B shows the STSs to be transmitted from a second transmitting antenna 14b. For both FIGS. 9A and 9B, the vertical axis represents "amplitude" and the horizontal axis "FFT point number". The in-phase (I) component and the quadrature (Q) component of the STS are shown in a distinguishable manner. The STSs illustrated in FIGS. 9A and 9B are expressed in the frequency domain as follows:

$$STS1_{-26,26} = sqrt(13/3)\{0, 0, -1-j, 0, 0, 0, 0, 0, 0, 0, 0, 0, \tag{10}$$
$$0, 0, 0, 0, 0, 0, 0, 0, 0, -1-j, 0, 0, 0, 0,$$
$$0, 0, 0, 0, 0, 0, -1-j, 0, 0, 0, 1+j, 0,$$
$$0, 0, -1-j, 0, 0, 0, 1+j, 0, 0, 0, 0, 0, 0\}$$

$$STS2_{-26,26} = sqrt(13/3)\{0, 0, 0, 0, 0, 0, 1+j, 0, 0, 0, 1+j,$$
$$0, 0, 0, 1+j, 0, 0, 0, 1+j, 0, 0, 0, 0, 0, 0,$$
$$0, 0, 0, 0, 0, 0, -1-j, 0, 0, 0, 0, 0, 0, 0,$$
$$0, 0, 0, 0, 0, 0, 0, 0, 0, 0, -1-j, 0, 0\}$$

In other words, a plurality of STSs are selected from among STSs defined in the IEEE802.11a standard. On account of these rules, the cross-correlation between the two STSs becomes zero (0). Moreover, the cross-correlation with the STSs of IEEE802.11a standard as expressed by Equation (1) will be smaller.

Figure 10A:
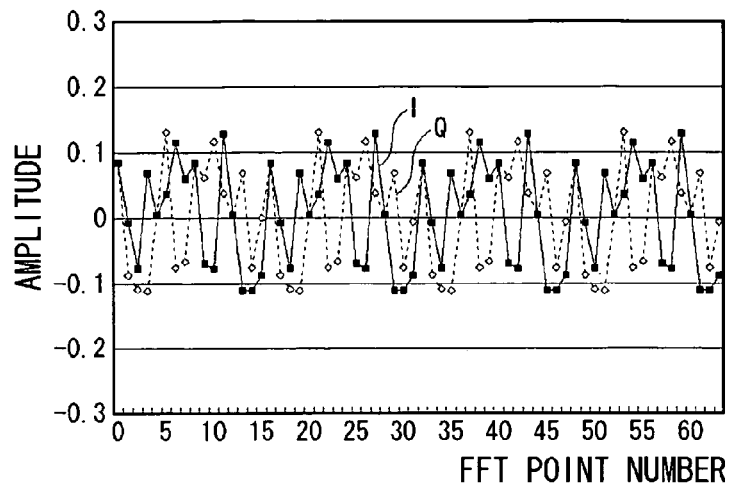
FIGS. 10A to 10C illustrate waveforms of known signals transmitted from the transmitting apparatus shown in FIG. 2.
Figure 10B:
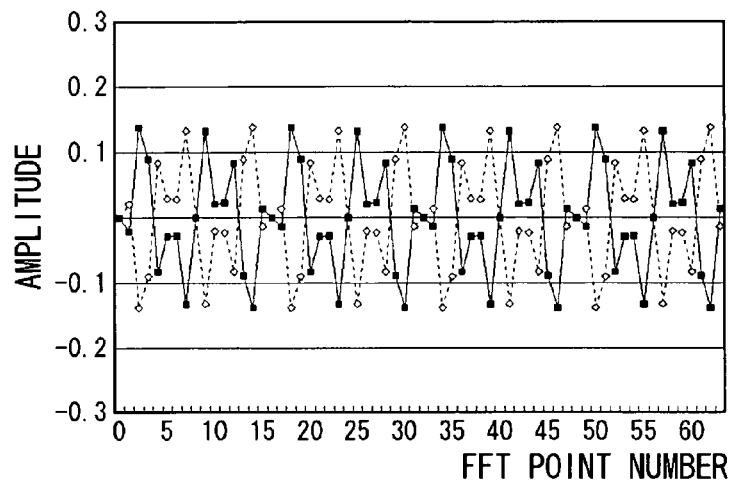
Figure 10C:
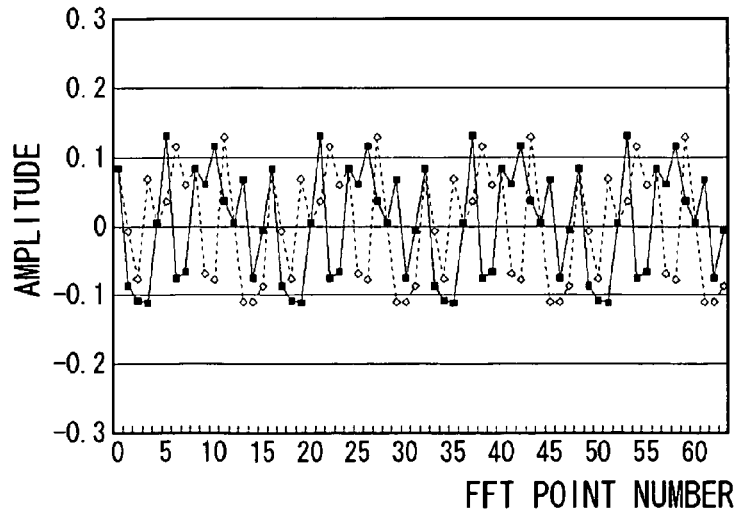

FIGS. 10A to 10C illustrate waveforms of known signals transmitted from a transmitting apparatus 10 of FIG. 2. FIGS. 10A to 10C are an extension of FIGS. 9A and 9B to three transmitting antennas 14. The STSs illustrated in FIGS. 10A to 10C are expressed in the frequency domain as follows:

$$STS1_{-26,26} = sqrt(13/2)\{0, 0, 1+j, 0, 0, 0, 0, 0, 0, 0, 0, 0, \quad (11)$$
$$0, 0, 1+j, 0, 0, 0, 0, 0, 0, 0, 0, 0, 0, 0, 0, 0,$$
$$0, -1-j, 0, 0, 0, 0, 0, 0, 0, 0, 0, 0, 0, 1+j,$$
$$0, 0, 0, 0, 0, 0, 0, 0, 0\}$$
$$STS2_{-26,26} = sqrt(13/2)\{0, 0, 0, 0, 0, 0, -1-j, 0, 0, 0, 0,$$
$$0, 0, 0, 0, 0, 0, 0, 1+j, 0, 0, 0, 0, 0, 0, 0, 0,$$
$$0, 0, 0, 0, 0, 0, -1-j, 0, 0, 0, 0, 0, 0, 0, 0,$$
$$0, 0, 0, 1+j, 0, 0, 0, 0, 0, 0,\}$$
$$STS3_{-26,26} = sqrt(13/2)\{0, 0, 0, 0, 0, 0, 0, 0, 0, 0, 1+j,$$
$$0, 0, 0, 0, 0, 0, 0, 0, 0, 0, 0, 0, 0, 0, -1-j,$$
$$0, 0, 0, 0, 0, 0, 0, 0, 0, 0, 1+j, 0, 0, 0, 0, 0,$$
$$0, 0, 0, 0, 0, 0, 1+j, 0, 0,\}$$

On account of these rules, the cross-correlation between the three STSs becomes zero (0). Moreover, the cross-correlation with the STSs of IEEE802.11a standard as expressed by Equation (1) will be smaller.

Figure 11:
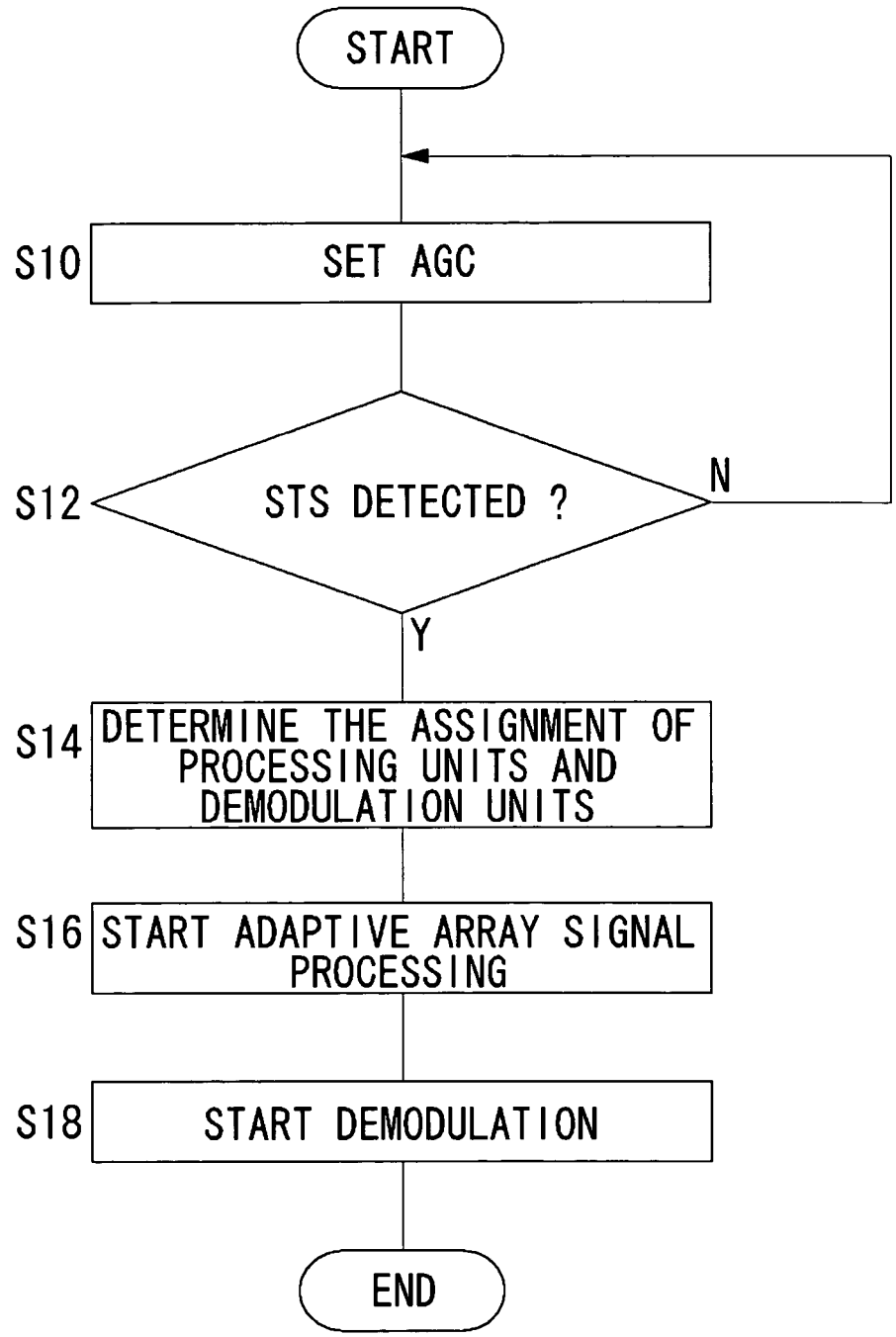
FIG. 11 is a flowchart showing a procedure of a receiving operation by the receiving apparatus of FIG. 5.

FIG. 11 is a flowchart showing a procedure of receiving operation by a receiving apparatus 12. The radio units 50 receive signals, and the AGCs 66 set gains based on STSs contained in the received signals (S10). If the control unit 58 can detect an STS as a result of correlation processing by the correlator 70 (Y of S12), the control unit 58 determines the assignment of processing units 52 and demodulation units 54 for the plurality of signals transmitted (S14). On the other hand, if the control unit 58 cannot detect an STS (N of S12), the procedure returns to step 10. The processing units 52 start adaptive array signal processing by deriving received weight signals 206 based on the LTSs contained in the received signals (S16). The demodulation units 54 start demodulation on the composite signals 204 outputted from the data combining unit 56 (S18).

According to the first embodiment of the present invention, a plurality of known signals are required to use mutually different subcarriers from among a plurality of predetermined subcarriers, so that the cross-correlation between the plurality of known signals can be made smaller. Also, because of this smallness of cross-correlation among a plurality of known signals, the detection accuracy of a plurality of known signals by a receiving apparatus can be improved. Moreover, the smallness of cross-correlation among a plurality of known signals can raise the accuracy with which the AGC is set by a receiving apparatus.

Second Embodiment

A second embodiment of the present invention, as with the first embodiment, relates to preamble signals to be applied to a MIMO system, and aims to reduce the interference between a plurality of preamble signals transmitted. In the first embodiment, the cross-correlation between a plurality of preamble signals is zero (0) as a result of ensuring disagreement between subcarriers to which respective preambles are assigned and using the same number of subcarriers to which respective preambles are assigned. With a transmitting apparatus according to the second embodiment, however, the number of subcarriers to which respective preambles are assigned is not the same; that is, more subcarriers are assigned to a preamble and fewer subcarriers are assigned to another preamble. As a result, the autocorrelation value varies from preamble to preamble.

A transmitting apparatus 10 and a receiving apparatus 12 according to the second embodiment are the same as the transmitting apparatus 10 of FIG. 4 and the receiving apparatus 12 of FIG. 5 according to the first embodiment, so that the description thereof is omitted here.

In the first embodiment, the number of subcarriers assigned to each of the STSs is the same. As a result, the cross-correlation becomes small and a higher setting accuracy of AGC is realized. The number of subcarriers per STS becomes smaller, so that the autocorrelation of the STS itself becomes smaller. On the other hand, timing detection by a receiving apparatus 12 and frequency offset estimation (not shown) are carried out based on the autocorrelation of STS, so that the higher the autocorrelation of STS, the higher the detection accuracy and estimation accuracy will generally be. That is, in one mode of the second embodiment, the autocorrelation characteristics of STS corresponding to one of the plurality of transmitting antennas 14 shown in FIG. 4 are set higher than those of STSs corresponding to the other transmitting antennas 14. Also, the number of subcarriers to be used for the STS corresponding to one of the plurality of transmitting antennas 14 is set larger than the number of subcarriers to be used for the STSs corresponding to the other transmitting antennas 14.

To be more specific, let us assume here that a transmitting apparatus 10 is provided with three transmitting antennas 14. When signals are to be transmitted by a first transmitting antenna 14a and a second transmitting antenna 14b only, six subcarriers are assigned to the STS corresponding to the first transmitting antenna 14a and six subcarriers are assigned to the STS corresponding to the second transmitting antenna 14b. On the other hand, when signals are to be transmitted by the three transmitting antennas 14, six subcarriers are assigned to the STS corresponding to the first transmitting antenna 14a, three subcarriers are assigned to the STS corresponding to the second transmitting antenna 14b, and three subcarriers are assigned to the STS corresponding to the third transmitting antenna 14c. Consequently, a receiving apparatus 12 as shown in FIG. 5 sets the AGCs based on the respective STSs. The receiving apparatus 12 performs timing detection and frequency offset estimation based on the STS with the largest number of subcarriers among the plurality of STSs.

In another mode of the second embodiment, subcarriers used by different STSs are partially overlapped. Compared with the embodiments so far described, the cross-correlation becomes larger, but the autocorrelation, too, becomes larger. That is, if the number of subcarriers used only for the STS corresponding to one of a plurality of transmitting antennas 14 is called a first value and that of subcarriers used only for the STSs corresponding to the other transmitting antennas 14 is called a second value, out of the plurality of subcarriers used for the STSs defined by the IEEE802.11a standard, then the plurality of STSs will be determined in a manner such that the first value is larger than the second value. For example, eight subcarriers are assigned to the STS corresponding to the first transmitting antenna 14*a*, six subcarriers are assigned to the STS corresponding to the second transmitting antenna 14*b*, and two subcarriers of them are overlapped with each other.

Moreover, when the number of transmitting antennas is three, the above-mentioned second value is assumed to be the number of subcarriers used only for the STS corresponding to one of the other transmitting antennas 14. In such a case, the cross-correlation characteristics between the second transmitting antenna 14*b* and the third transmitting antenna 14*c* in relation to the STS corresponding to the first transmitting antenna 14*a* are so set as to be lower than the cross-correlation characteristics between the STS corresponding to the second transmitting antenna 14*b* and the STS corresponding to the third transmitting antenna 14*c*. That is, while all the STSs corresponding to the three transmitting antennas 14 use six subcarriers each, one of them uses four subcarriers exclusively, another of them uses two subcarriers exclusively, and still another of them uses none of the subcarriers exclusively.

Furthermore, the subcarriers may be assigned so that the aforementioned second value is "0". That is, six subcarriers are assigned exclusively to the STS corresponding to the first transmitting antenna 14*a*, and the remaining six subcarriers are shared by the STSs corresponding respectively to the second transmitting antenna 14*b* and the third transmitting antenna 14*c*. In such a case, those STSs use such signal series as to make the cross-correlation smaller.

According to the second embodiment of the present invention, the number of subcarriers to be used by each of a plurality of known signals, from among predetermined subcarriers, is made to vary and differ within the plurality of known signals, so that the plurality of known signals can be so designed as to produce predetermined values for the autocorrelation or the cross-correlation. Moreover, the value of autocorrelation for predetermined known signals is made larger, so that the timing detection accuracy and the frequency offset estimation accuracy at a receiving apparatus can be improved.

Third Embodiment

A third embodiment of the present invention relates to a MIMO system as with the first embodiment. However, the third embodiment concerns correlation processing at a receiving apparatus. As described above, when a plurality of known signals are transmitted in parallel from a plurality of antennas of a transmitting apparatus, a receiving apparatus needs to have a plurality of correlators corresponding respectively to the plurality of known signals in order to detect the timing from the plurality of received known signals. Now the use of a plurality of correlators enlarges the scale of circuitry of the receiving apparatus. A MIMO system according to the third embodiment defines a predetermined relationship between a plurality of series of known signals in the time domain (hereinafter referred to as "time-domain known signals"). The transmitting apparatus transmits a plurality of time-domain known signals as defined above, and the receiving apparatus reduces the amount of correlation processing based on the relationship among the plurality of time-domain known signals. That is, the correlation processing, which is generally done by multiplication and addition, is performed in such a manner here that two correlation values are outputted by arranging the multiplication into a common use in the correlation processings on the two series of known signals and adding the results of multiplication in different combinations.

A transmitting apparatus 10 and a receiving apparatus 12 according to the third embodiment are the same as the transmitting apparatus 10 of FIG. 4 and the receiving apparatus 12 of FIG. 5 according to the first embodiment, so that the description thereof is omitted here.

Figure 12A:
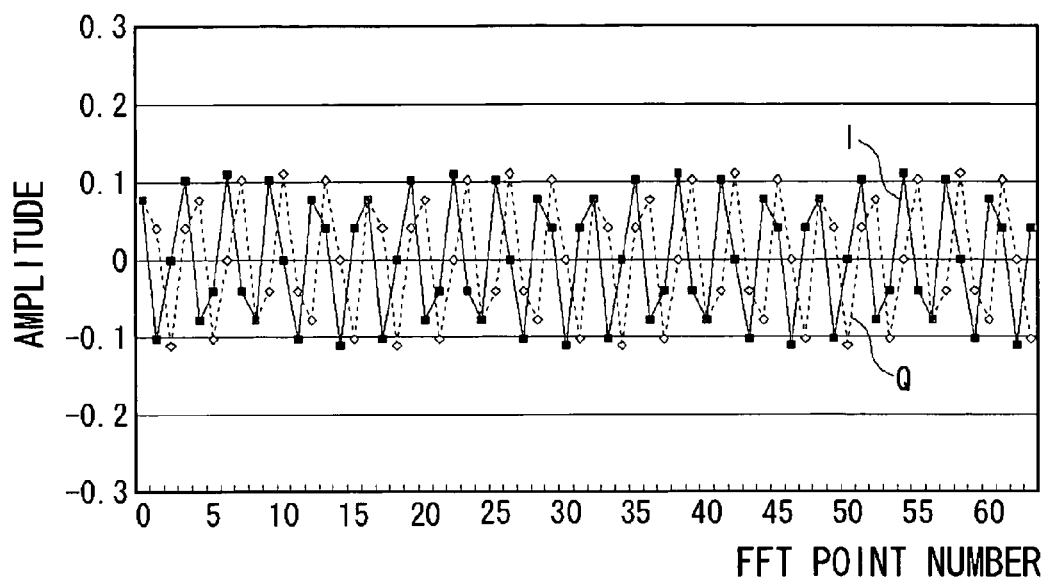
FIGS. 12A and 12B illustrate waveforms of known signals transmitted from a transmitting apparatus according to a third embodiment of the present invention.
Figure 12B:
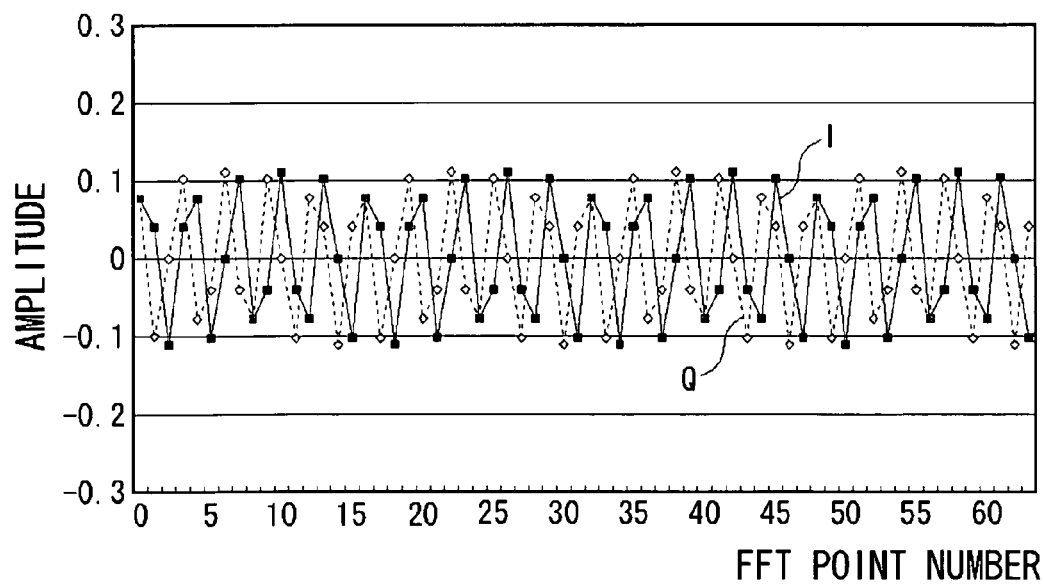

FIGS. 12A and 12B illustrate waveforms of known signals transmitted from a transmitting apparatus 10 according to the third embodiment. It is assumed here that the number of transmitting antennas is three and that the STS corresponding to a first transmitting antenna 14*a* is placed at subcarrier numbers "−24, −16, −12, −8, −4, 4, 8, 12, 16, 24", the STS corresponding to a second transmitting antenna 14*b* is placed at subcarrier number "20", and the STS corresponding to a third transmitting antenna 14*c* is placed at subcarrier number "−20". Whereas FIG. 12A shows a waveform of the STS corresponding to the second transmitting antenna 14*b*, FIG. 12B shows a waveform of the STS corresponding to the third transmitting antenna 14*c*. There is a relationship in which the values of the in-phase component of the waveform of the STS corresponding to the second transmitting antenna 14*b* is equal to the values of the quadrature component of the waveform of the STS corresponding to the third transmitting antenna 14*c* and the values of the quadrature component of the waveform of the STS corresponding to the second transmitting antenna 14*b* is equal to the values of the in-phase component of the waveform of the STS corresponding to the third transmitting antenna 14*c*.

Figure 13:
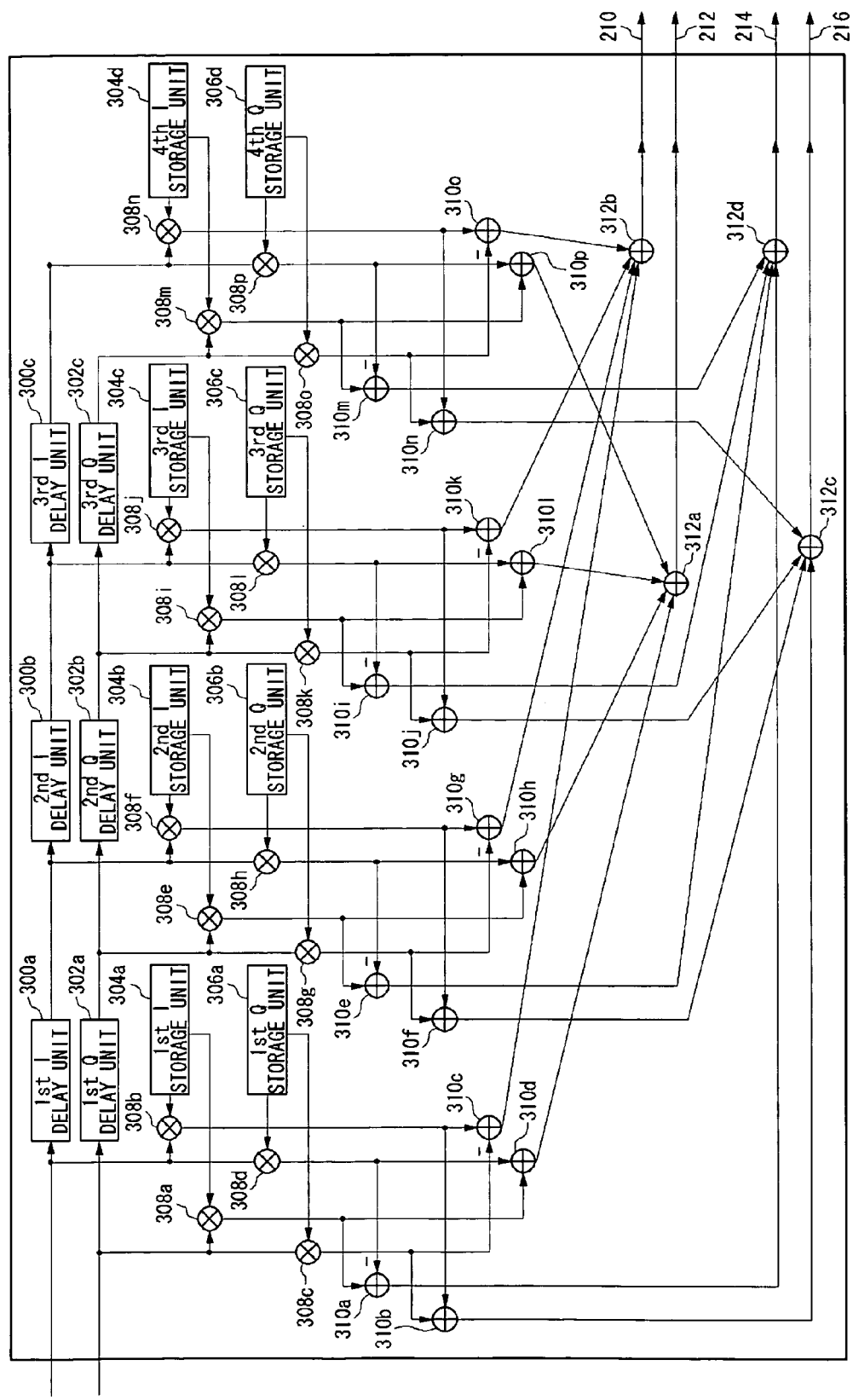
FIG. 13 illustrates a structure of a correlator according to a third embodiment of the present invention.

FIG. 13 illustrates a structure of a correlator 70 according to the third embodiment. The correlator 70 includes a first I delay unit 300*a*, a second I delay unit 300*b* and a third I delay unit 300*c*, which are generically referred to as I delay units 300, a first Q delay unit 302*a*, a second Q delay unit 302*b* and a third Q delay unit 302*c*, which are generically referred to as Q delay units 302, a first I storage unit 304*a*, a second I storage unit 304*b*, a third I storage unit 304*c* and a fourth I storage unit 304*d*, which are generically referred to as I storage units 304, a first Q storage unit 306*a*, a second Q storage unit 306*b*, a third Q storage unit 306*c* and a fourth Q storage unit 306*d*, which are generically referred to as Q storage units 306, a first multiplier 308*a*, a second multiplier 308*b*, a third multiplier 308*c*, a fourth multiplier 308*d*, a fifth multiplier 308*e*, a sixth multiplier 308*f*, a seventh multiplier 308*g*, an eighth multiplier 308*h*, a ninth multiplier 308*i*, a tenth multiplier 308*j*, an eleventh multiplier 308*k*, a twelfth multiplier 308*l*, a thirteenth multiplier 308*m*, a fourteenth multiplier 308*n*, a fifteenth multiplier 308*o* and a sixteenth multiplier 308*p*, which are generically referred to as multipliers 308, a first adder 310*a*, a second adder 310*b*, a third adder 310*c*, a fourth adder 310*d*, a fifth adder 310*e*, a sixth adder 310*f*, a seventh adder 310*g*, an eighth adder 310*h*, a ninth adder 310*i*, a tenth adder 310*j*, an eleventh adder 310*k*, a twelfth adder 310*l*, a thirteenth adder 310*m*, a fourteenth adder 310*n*, a fifteenth adder 310*o* and a sixteenth adder 310*p*, which are generically referred to as adders 310, and a first adder 312*a*, a second adder 312*b*, a third adder 312*c* and a fourth adder 312*d*, which are generically referred to as adders 312. The signals used include a first correlation in-phase value 210, a first correlation quadrature value 212, a second correlation in-phase value 214 and a second correlation quadrature value 216.

A first baseband received signal 202*a* outputted from an A-D conversion unit 68 shown in FIG. 6 is inputted to the correlator 70. In FIG. 6, the signal line for transmitting the first baseband received signal 202*a* is represented by a single straight line. In fact, however, the first baseband received signal 202*a* is a signal containing an in-phase component and a quadrature component. Also, in order to simplify the explanation and drawing here, there are only three each of the I delay unit 300 and the Q delay unit 302 and correlation processings are carried out based on four first baseband received signals 202a. However, it is assumed that in practice, correlation processings are performed on 16 baseband received signals 202a or a number other than 16 of the first baseband received signal 202a. Furthermore, the correlator 70 also performs correlation processing for the STS corresponding to a first transmitting antenna 14a as described earlier and is provided with a circuitry therefor, but the description thereof will be omitted here.

The I delay units 300 and the Q delay units 302 delay in succession the value of the in-phase component and the value of the quadrature component, respectively, of an inputted first baseband received signal 202a. The I storage units 304 and the Q storage units 306 store each component of the waveform of the STS corresponding to the first transmitting antenna 14a, namely, the STSs converted into the time domain (hereinafter referred to "time-domain STSs", which may be used in the same sense as the aforementioned "time-domain known signals"). The I storage units 304 and the Q storage units 306 store the in-phase component and the quadrature component, respectively, of the time-domain STS.

The multipliers 308 carry out multiplications of correlation processing. That is, the first multiplier 308a multiplies the value of the quadrature component of a first baseband received signal 202a by the value of the in-phase component of a time-domain STS; the second multiplier 308b multiplies the value of the in-phase component of the first baseband received signal 202a by the value of the in-phase component of the time-domain STS; the third multiplier 308c multiplies the value of the quadrature component of the first baseband received signal 202a by the value of the quadrature component of the time-domain STS; and the fourth multiplier 308d multiplies the value of the in-phase component of the first baseband received signal 202a by the value of the quadrature component of the time-domain STS. And the fifth multiplier 308e, the ninth multiplier 308i and the thirteenth multiplier 308m correspond to the first multiplier 308a; the sixth multiplier 308f, the tenth multiplier 308j and the fourteenth multiplier 308n correspond to the second multiplier 308b; the seventh multiplier 308g, the eleventh multiplier 308k and the fifteenth multiplier 308o correspond to the third multiplier 308c; and the eighth multiplier 308h, the twelfth multiplier 308l and the sixteenth multiplier 308p correspond to the fourth multiplier 308d. In other words, sharing is done for the multiplications of the two time-domain STSs.

The adders 310 add the results of the multiplications outputted from the multipliers 308, and the results of these additions are further added by the adders 312. As a result, correlation values for the two time-domain STSs are generated in such a form as to have the in-phase component and the quadrature component, respectively. The first adder 310a subtracts the result of multiplication by the fourth multiplier 308d from the result of multiplication by the first multiplier 308a; the second adder 310b adds the result of multiplication by the second multiplier 308b and the result of multiplication by the third multiplier 308c together; the third adder 310c adds the result of multiplication by the second multiplier 308b and the result of multiplication by the third multiplier 308c together; and the fourth adder 310d subtracts the result of multiplication by the fourth multiplier 308d from the result of multiplication by the first multiplier 308a. And the fifth adder 310e, the ninth adder 310i and the thirteenth adder 310m correspond to the first adder 310a; the sixth adder 310f, the tenth adder 310j and the fourteenth adder 310n correspond to the second adder 310b; the seventh adder 310g, the eleventh adder 310k and the fifteenth adder 310o correspond to the third adder 310c; and the eighth adder 310h, the twelfth adder 310l and the sixteenth adder 310p correspond to the fourth adder 310d.

The first adder 312a outputs a first correlation quadrature value 212 by computing the quadrature component of the correlation value for one of the time-domain STS; the second adder 312b outputs a first correlation in-phase value 210 by computing the in-phase component of the correlation value for one of the time-domain STS; the third adder 312c outputs a second correlation quadrature value 216 by computing the oquadrature component of the correlation value for the other of the time-domain STS; and the fourth adder 312d outputs a second correlation in-phase value 214 by computing the in-phase component of the correlation value for the other of the time-domain STS. Here, the first adder 312a adds up the results of addition by the fourth adder 310d, the eighth adder 310h, the twelfth adder 310l and the sixteenth adder 310p; the second adder 312b adds up the results of addition by the third adder 310c, the seventh adder 310g, the eleventh adder 310k and the fifteenth adder 310o; the third adder 312c adds up the results of addition by the second adder 310b, the sixth adder 310f, the tenth adder 310j and the fourteenth adder 310n; and the fourth adder 312d adds up the results of addition by the first adder 310a, the fifth adder 310e, the ninth adder 310i and the thirteenth adder 310m.

Figure 14A:
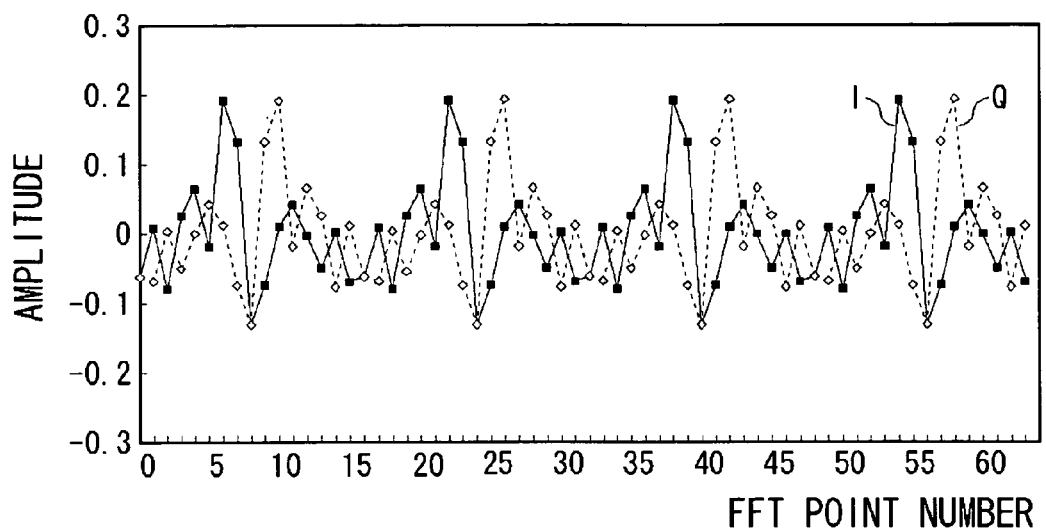
FIGS. 14A and 14B illustrate waveforms of known signals transmitted from a transmitting apparatus according to a third embodiment of the present invention.
Figure 14B:
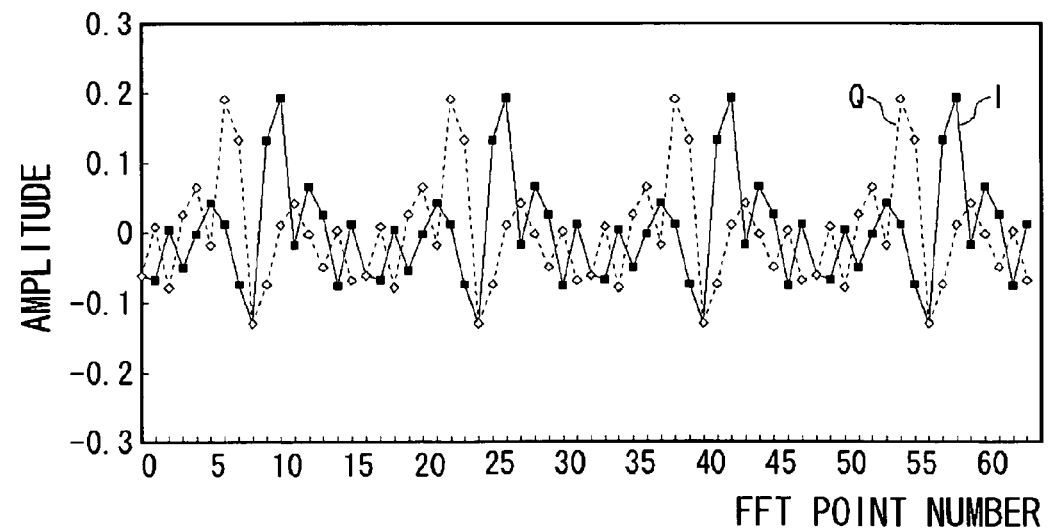

FIGS. 14A and 14B illustrate waveforms of known signals transmitted from a transmitting apparatus 10 according to the third embodiment. In FIGS. 14A and 14B, just as well as in FIGS. 12A and 12B, there is shown a relationship in which the values of the in-phase component of the time-domain STS corresponding to the second transmitting antenna 14b is equal to the values of the quadrature component of the time-domain STS corresponding to the third transmitting antenna 14c and the values of the quadrature component of the time-domain STS corresponding to the second transmitting antenna 14b is equal to the values of the in-phase component of the time-domain STS corresponding to the third transmitting antenna 14c. Accordingly, a correlator 70 as shown in FIG. 13 proves effective as a circuit for performing correlation processing for these signals.

According to the third embodiment of the present invention, the circuit can be reduced in scale because the delay units for delaying inputted signals, the storage units for storing reference signals and the multipliers to be used in correlation processing can be shared in the processing for a plurality of reference signals.

Fourth Embodiment

A fourth embodiment of the present invention, as with the third embodiment, relates to correlation processings at a receiving apparatus. Of a plurality time-domain known signals according to the fourth embodiment, the variable period of one of the waveforms is twice the variable period of the other. Moreover, the time-domain known signals of longer variable period only are stored. The correlation processing for the time-domain known signals not stored is executed after selecting a predetermined value from among the values of the stored time-domain known signals. Hence, part of the correlation processings for the two time-domain known signals can be shared.

A transmitting apparatus 10 and a receiving apparatus 12 according to the fourth embodiment are the same as the transmitting apparatus 10 of FIG. 4 and the receiving apparatus 12 of FIG. 5 according to the first embodiment, so that the description thereof is omitted here. According to the fourth embodiment, two time-domain STSs, of which the variable period of one time-domain STS is ½ of that of the other time-domain STS, are transmitted from two transmitting antennas 14. Let us call here the time-domain STS with longer variable period a "first time-domain STS" and the time-domain STS with shorter variable period a "second time-domain STS". Let us also assume here that the period of the second time-domain STS is ½ of the period of the first time-domain STS.

Figure 15:
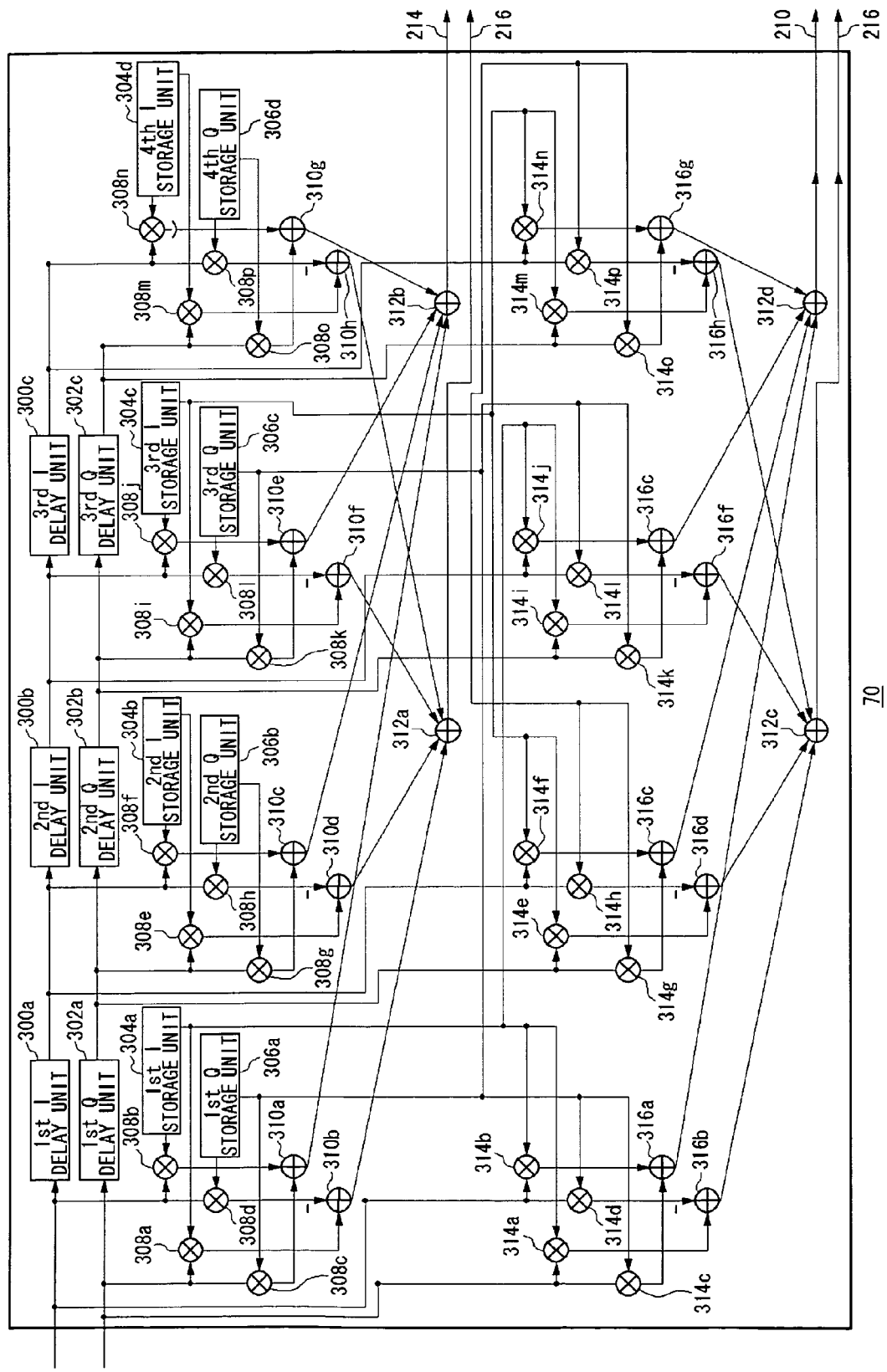
FIG. 15 illustrates a structure of a correlator according to a fourth embodiment of the present invention.

FIG. 15 illustrates a structure of a correlator 70 according to the fourth embodiment. Compared with the correlator 70 shown in FIG. 13, the correlator 70 shown in FIG. 15 further includes a first multiplier 314a, a second multiplier 314b, a third multiplier 314c, a fourth multiplier 314d, a fifth multiplier 314e, a sixth multiplier 314f, a seventh multiplier 314g, an eighth multiplier 314h, a ninth multiplier 314i, a tenth multiplier 314j, an eleventh multiplier 314k, a twelfth multiplier 314l, a thirteenth multiplier 314m, a fourteenth multiplier 314n, a fifteenth multiplier 314o and a sixteenth multiplier 314p, which are generically referred to as multipliers 314, and a first adder 316a, a second adder 316b, a third adder 316c, a fourth adder 316d, a fifth adder 316e, a sixth adder 316f, a seventh adder 316g and an eighth adder 316h, which are generically referred to as adders 316.

The I storage units 304 and the Q storage units 306 store first time-domain STS. Here, the processings up to the output of a second correlation in-phase value 214 and a second correlation quadrature value 216 are the same as the processings up to the output of a second correlation in-phase value 214 and a second correlation quadrature value 216 in FIG. 13, so that the description thereof is omitted here.

In the processings up to the output of a first correlation in-phase value 210 and a second correlation quadrature value 216, the multipliers 314 multiply the delayed first baseband received signals 202a by the values from the I storage units 304 and the values from the Q storage units 306. However, of the I storage units 304, the first I storage unit 304a and the third I storage unit 304c only are used. That is, the multipliers 314, which carry out multiplications using the I storage units 304, are arranged in a time series of the second multiplier 314b, the sixth multiplier 314f, the tenth multiplier 314j and the fourteenth multiplier 314n. The second multiplier 314b performs multiplication using the first I storage unit 304a, but the sixth multiplier 314f performs multiplication using the third I storage unit 304c instead of the second I storage unit 304b. In other words, values of the I storage units 304 are each selected as every other integer, that is, at intervals of "2", a reciprocal of "½", which is the ratio of the period of the second time-domain STS to that of the first time-domain STS. The same applies to the Q storage units 306.

According to the fourth embodiment of the present invention, the circuit can be reduced in scale because the delay units for delaying inputted signals and the storage units for storing reference signals can be shared in the processing for a plurality of reference signals.

Fifth Embodiment

A fifth embodiment of the present invention, as with the third embodiment, relates to correlation processings at a receiving apparatus. Of a plurality time-domain known signals according to the fifth embodiment, one has a waveform with which either of the in-phase component and the quadrature component is zero ("0") and in addition the amplitude is constant. And the other of the time-domain known signals has a waveform which is inverted from the quadrature component of the former. A receiving apparatus which receives these time-domain known signals can not only share part of the correlation processings for the two time-domain known signals but also has no need for multipications.

Figure 16:
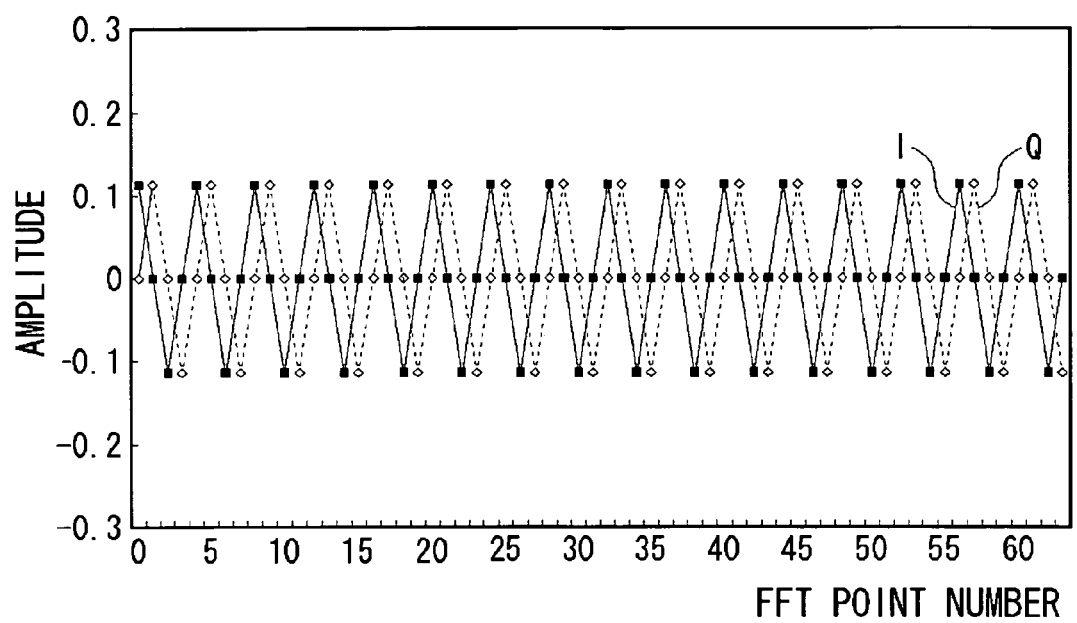
FIG. 16 illustrates a waveform of a known signal transmitted from a transmitting apparatus according to a fifth embodiment of the present invention.

FIG. 16 illustrates a waveform of a known signal transmitted from a transmitting apparatus 10 according to the fifth embodiment. It is assumed here that the number of transmitting antennas 14 is three and that the STS corresponding to a first transmitting antenna 14a is placed at subcarrier numbers "−24, −20, −12, −8, −4, 4, 8, 12, 20, 24", the STS corresponding to a second transmitting antenna 14b is placed at subcarrier number "−16", and the STS corresponding to a third transmitting antenna 14c is placed at subcarrier number "16". FIG. 16 shows a time-domain STS for the STS corresponding to the second transmitting antenna 14b. On the other hand, a time-domain STS for the STS corresponding to the third transmitting antenna 14c has a waveform which has inverted the quadrature component of FIG. 16.

Figure 17:
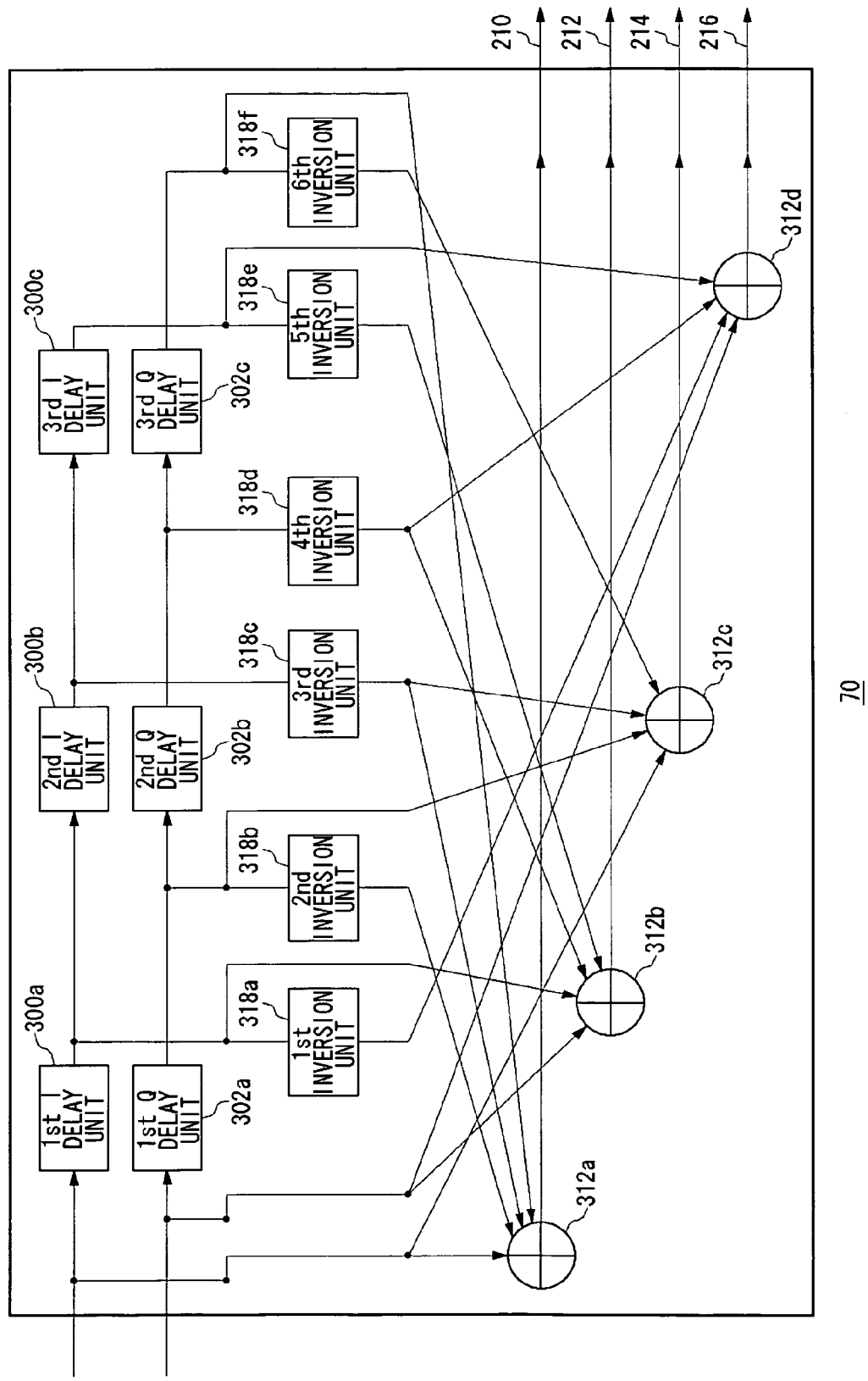
FIG. 17 illustrates a structure of a correlator according to a fifth embodiment of the present invention.

FIG. 17 illustrates a structure of a correlator 70 according to the fifth embodiment. Compared to the correlator 70 shown in FIG. 13, the correlator 70 shown in FIG. 17 further includes a first inversion unit 318a, a second inversion unit 318b, a third inversion unit 318c, a fourth inversion unit 318d, a fifth inversion unit 318e and a sixth inversion unit 318f, which are generically referred to as inversion units 318.

The inversion units 318 invert the values of inputted signals. That is, the inversion units 318 convert positive values to negative values and vice versa.

The adders 312 add up a first baseband received signal 202a, output signals from the I delay units 300 and output signals from the inversion units 318, and outputs a first correlation in-phase value 210, a first correlation quadrature value 212, a second correlation in-phase value 214 and a second correlation quadrature value 216, respectively.

According to the fifth embodiment of the present invention, the circuit can be reduced in scale because the delay units for delaying inputted signals can be shared in the processing for a plurality of reference signals and furthermore the multipliers can be eliminated in the correlation processing.

Sixth Embodiment

A sixth embodiment of the present invention, as with the other above-described embodiments, relates to a MIMO system. In a MIMO system, signals independent from each other are transmitted from a plurality of transmitting antennas, as described earlier. And, in the embodiments described heretofore, the number of transmitting antennas is fixed. However, there may be cases where the number of transmitting antennas is to be changed according to the volume of data to be transmitted and other factors. That is, the number of transmitting antennas is decreased when the volume of data to be transmitted is small and increased when the volume of data to be transmitted is large. When a transmitting apparatus changes the number of antennas for transmitting signals as appropriate, it is necessary for a receiving apparatus to recognize the changed number of transmitting antennas if it is to receive data with accuracy. However, if a transmitting apparatus is communicating the number of antennas transmitting data to a receiving apparatus by means of a predetermined control signal, then the control signal will have an effect of lowering the data transmission efficiency. Thus, it is preferred that a receiving apparatus can recognize the number of antennas transmitting data even without the control signal.

According to the sixth embodiment, a transmitting apparatus changes the pattern of STS with the number of antennas transmitting data, and a receiving apparatus recognizes the number of antennas transmitting data by detecting the changed pattern of STS. More specifically, a plurality of transmitting antennas are divided into one (hereinafter referred to as "main antenna") and the rest (hereinafter referred to as "sub-antennas"), and the pattern of STS transmitted from the main antenna is changed according to the number of transmitting antennas to be used. Also, to ensure the accurate receiving of any changed pattern of STS transmitted from the main antenna, the STS to be transmitted by the main antenna and the STSs to be transmitted by the sub-antennas use different subcarriers. That is, the respective STSs are so determined as to make the value of cross-correlation between them smaller.

A receiving apparatus according to the sixth embodiment, as described above, detects an STS pattern transmitted from the main antenna. This detection is accomplished by a correlation processing between a signal received and an STS pattern stored beforehand. For example, when the number of transmitting antennas is two and three, a correlator is necessary that can respond to both the STS patterns. In the sixth embodiment, the patterns of STSs transmitted from the main antenna when the number of transmitting antennas is two and three are so defined as to be in a relationship of inverted phases between each other as in the third embodiment. Therefore, if it is provided with a correlator as described in the third embodiment, the receiving apparatus can detect change in the pattern of STS sent from the main antenna. Moreover, it is not necessary to have correlators corresponding to the respective STS patterns.

A transmitting apparatus according to the sixth embodiment is the same type as the transmitting apparatus 10 of FIG. 4. The transmitting apparatus 10 is provided with a determination unit which is not shown. The determination unit determines the number of transmitting antennas 14 that are to transmit signals, out of N units of transmitting antennas 14, according to predetermined instructions. It is to be noted here that the predetermined instructions may be arbitrary. For example, they may be received from an application for transmitting data in a communication system 100 according to the type of application or the amount of data. Or a measurement unit (not shown), which measures the quality of the channel between a transmitting apparatus 10 and a receiving apparatus 12, may input the instructions according to the measurement results to the determination unit. Moreover, modulation units 22 and radio units 24, corresponding to the number of transmitting antennas 14 as determined by the transmitting antennas 14, operate to send signals.

A preamble adding unit 32, as described above, stores STSs and LTSs beforehand and adds STS and LTS at the head of a burst signal. Moreover, the preamble adding unit 32 selects a predetermined STS from among a plurality of STSs stored beforehand, according to the number of transmitting antennas determined by the determination unit. For example, a preamble adding unit 32 contained in a modulation unit 22 corresponding to a main antenna selects an STS corresponding to the main antenna. STSs corresponding to a main antenna are stored according to the number of transmitting antennas 14 that can be determined, and an STS corresponding to the number of transmitting antennas 14 that has been determined by a determination unit is selected. For example, where it is possible that "2" or "3" is determined as the number of transmitting antennas 14, the preamble adding unit 32 stores STSs corresponding to the "2" as the number of transmitting antennas 14 and STSs corresponding to the "3" as the number of transmitting antennas 14. And when the determination unit determines "2" as the number of transmitting antennas 14, the preamble adding unit 32 will select STS corresponding to the "2" and adds the selected STS to the burst signal. On the other hand, one or more preamble adding units 32 contained in one or more modulation units 22 corresponding to sub-antennas select STSs corresponding to the sub-antennas. Where there are a plurality of sub-antennas, the patterns of STSs corresponding thereto differ from each other so as to reduce mutual interference.

FIG. 18 is a table showing a relationship between the number of transmitting antennas 14 for transmitting data and the patterns of STSs transmitted by the transmitting antennas, according to the sixth embodiment. The table shows the numbers of transmitting antennas 14 vertically. The table shows the transmitting antennas 14 to be used horizontally and the STSs corresponding thereto in relation to the numbers of antennas 14. Specifically, when the number of transmitting antennas 14 is "1", an STS defined by the aforementioned IEEE802.11a standard (hereinafter referred to as "Legacy STS") is transmitted from the first transmitting antenna 14a. When the number of transmitting antennas 14 is "2", "STS1" is transmitted from the first transmitting antenna 14a and "STSa" is transmitted from the second transmitting antenna 14b. When the number of transmitting antennas 14 is "3", "STS1" is transmitted from the first transmitting antenna 14a, "STS2" is transmitted from the second transmitting antenna 14b and "STSb" is transmitted from the third transmitting antenna 14c. Here, the second transmitting antenna 14b when the number of transmitting antennas 14 is "2" and the third transmitting antenna 14c when the number of transmitting antennas 14 is "3" are the main antenna, and the rest are sub-antennas.

In relation to the description heretofore, the STS corresponding to the main antenna when the number of transmitting antennas 14 is "2" is "STSa", and the STS corresponding to the main antenna when the number of transmitting antennas 14 is "3" is "STSb". On the other hand, the STS corresponding to the sub-antenna when the number of transmitting antennas 14 is "2" is "STS1", and the STSs corresponding to the sub-antennas when the number of transmitting antennas 14 is "3" are "STS1" and "STS2". For the simplicity of explanation, "STSa" and "STSb" will be generically referred to as "STS for main antenna", and "STS1" and "STS2" will be generically referred to as "STS for sub-antennas". It is to be noted also that the number of transmitting antennas 14 for transmitting signals has thus far been described as "2" or "3", but it may be a number other than these.

It is to be noted that the relationship between these STSs and Legacy STS is so defined that the plurality of carriers to be used for the STSs for main antenna and the STSs for sub-antenna, respectively, correspond to any of the 12 subcarriers used for Legacy STS. In this case, the STSs for main antenna and the STSs for sub-antenna use six mutually different subcarriers of the 12 subcarriers for Legacy STS. As a result of this definition, the cross-correlation value between the STSs for main antenna and the STSs for sub-antenna is zero ("0"). It is assumed that the six subcarriers used by the STSs for main antenna are fixed and not dependent on the number of transmitting antennas 14 for transmitting data and the six subcarriers used by the STSs for sub-antennas are fixed and not dependent on the number of transmitting antennas 14 for transmitting data. Accordingly, where there are a plurality of sub-antennas and if, for instance, the number of transmitting antennas 14 is three, "STS1" and "STS2" will use the same six subcarriers.

The STSs for main antenna include "STSa" and "STSb", but because of pattern difference between STSa and STSb, they have a function of conveying the number of transmitting antennas 14 transmitting signals to a receiving apparatus 12. Hence, these STSs need to be different from each other to such an extent that the receiving apparatus 12 can identify the STSa and STSb from the signals it has received. In other words, when the number of transmitting antennas 14 transmitting signals differs, the STSs for main antenna are so defined as to become those of different main antenna, or more specifically defined by values that make the cross-correlation characteristics between STSa and STSb smaller. Specific values for these will be mentioned later.

On the other hand, the STSs for sub-antenna use the same subcarriers especially when there are a plurality of sub-antennas, so that "STS1" and "STS2" are defined with such patterns as will reduce interference between these STSs. The STSs for sub-antenna are defined by values that make the cross-correlation characteristics smaller. Thus, even when the number of transmitting antennas 14 used to transmit signals increases, the number of subcarriers used for the STSs for main antenna only remains fixed at "6", but the number of subcarriers used for one STS for sub-antenna only reduces to zero ("0").

Figure 19:
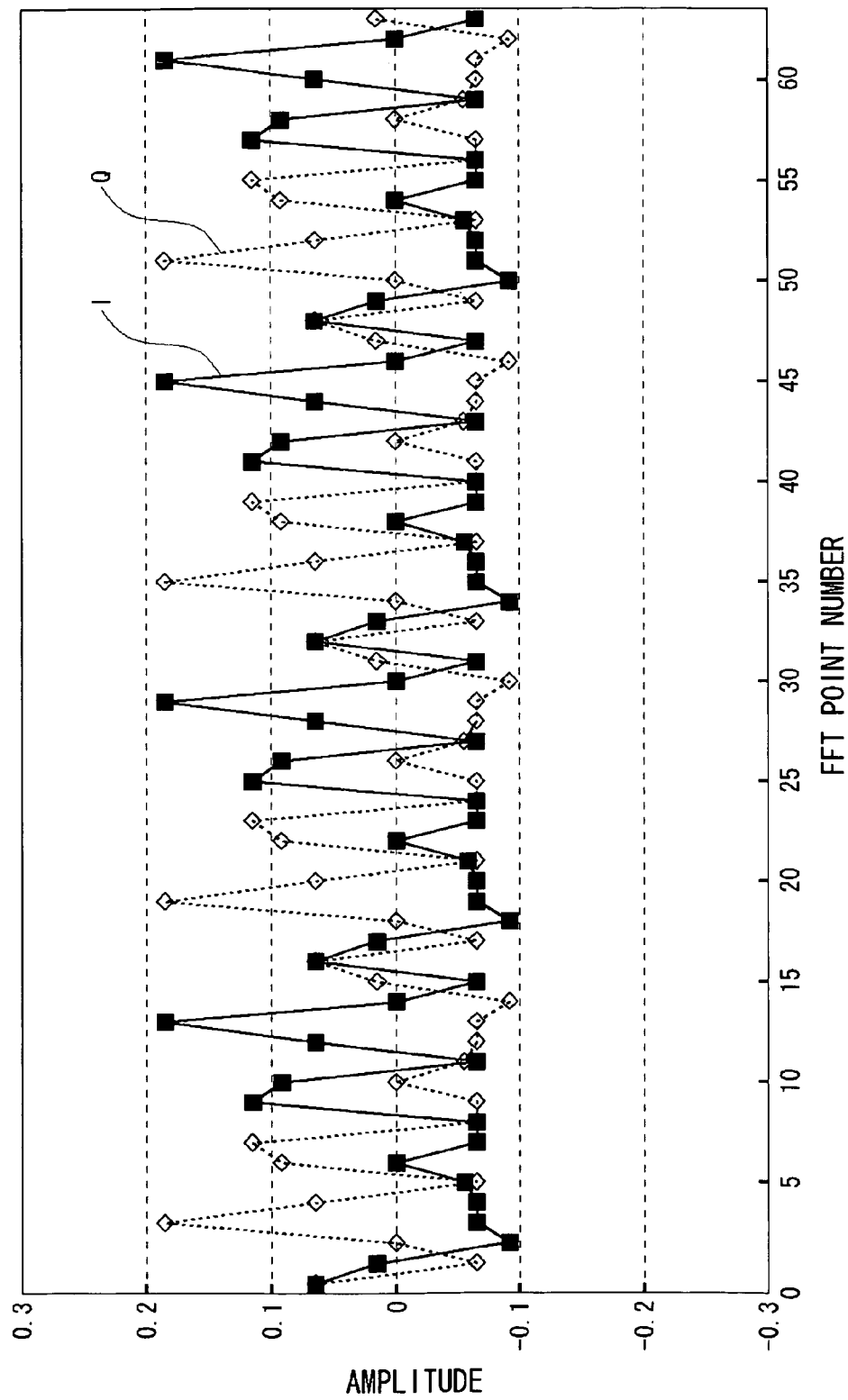
FIG. 19 illustrates a waveform of STSa shown in FIG. 18.
Figure 20:
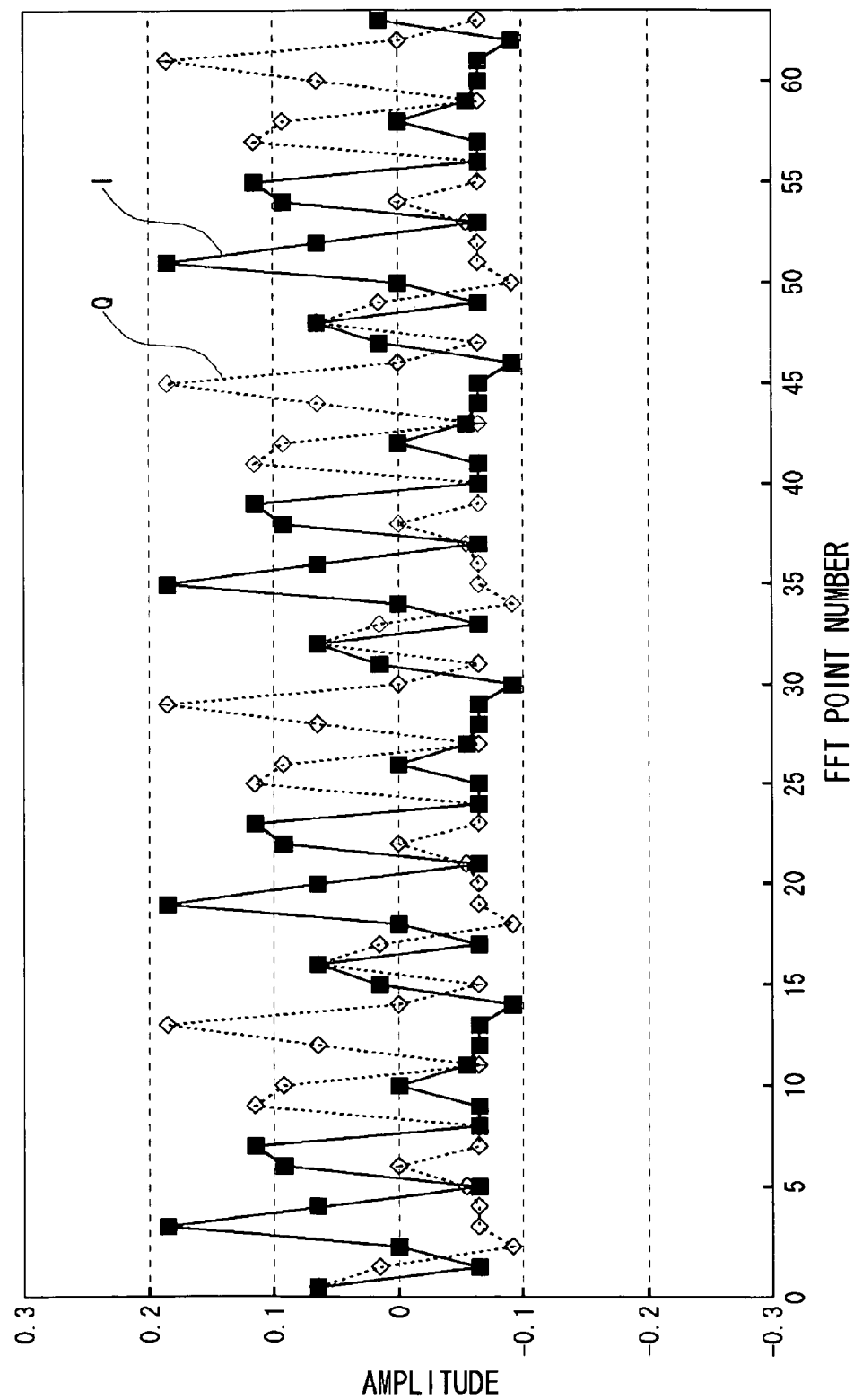
FIG. 20 illustrates a waveform of STSb shown in FIG. 18.

FIG. 19 illustrates a waveform of STSa, and FIG. 20 a waveform of STSb. These represent the values of STSs for main antenna in the time domain when the number of antennas transmitting signals is "2" and "3". The STSs for main antenna have both the in-phase component and quadrature component in the time domain and are so defined that for the two kinds of number of antennas to transmit signals, namely, "2" and "3", the value of the in-phase component of "STSa" is equal to the value of the quadrature component of "STSb" and the value of the quadrature component of "STSa" is equal to the value of the in-phase component of "STSb". On the other hand, "STSa" is expressed in the frequency domain as follows:

$$S_{-26,26} = sqrt\left(\frac{26}{6}\right)\{0, 0, 0, 0, 0, 0, 1+j, \quad (12)$$
$$0, 0, 0, 1+j, 0, 0, 0, 0, 0, 0, 0, 0, 0, 0,$$
$$0, -1-j, 0, 0, 0, 0, 0, 0, 0, 1+j, 0, 0,$$
$$0, 0, 0, 0, 0, 0, 0, 0, 0, -1-j, 0, 0, 0,$$
$$1+j, 0, 0, 0, 0, 0, 0\}$$

"STSb" is expressed in the frequency domain as follows:

$$S_{-26,26} = sqrt\left(\frac{26}{6}\right)\{0, 0, 0, 0, 0, 0, 1+j, \quad (13)$$
$$0, 0, 0, -1-j, 0, 0, 0, 0, 0, 0, 0, 0, 0, 0,$$
$$0, 1+j, 0, 0, 0, 0, 0, 0, 0, -1-j, 0, 0, 0,$$
$$0, 0, 0, 0, 0, 0, 0, 0, 1+j, 0, 0, 0, 1+j,$$
$$0, 0, 0, 0, 0, 0\}$$

Figure 21:
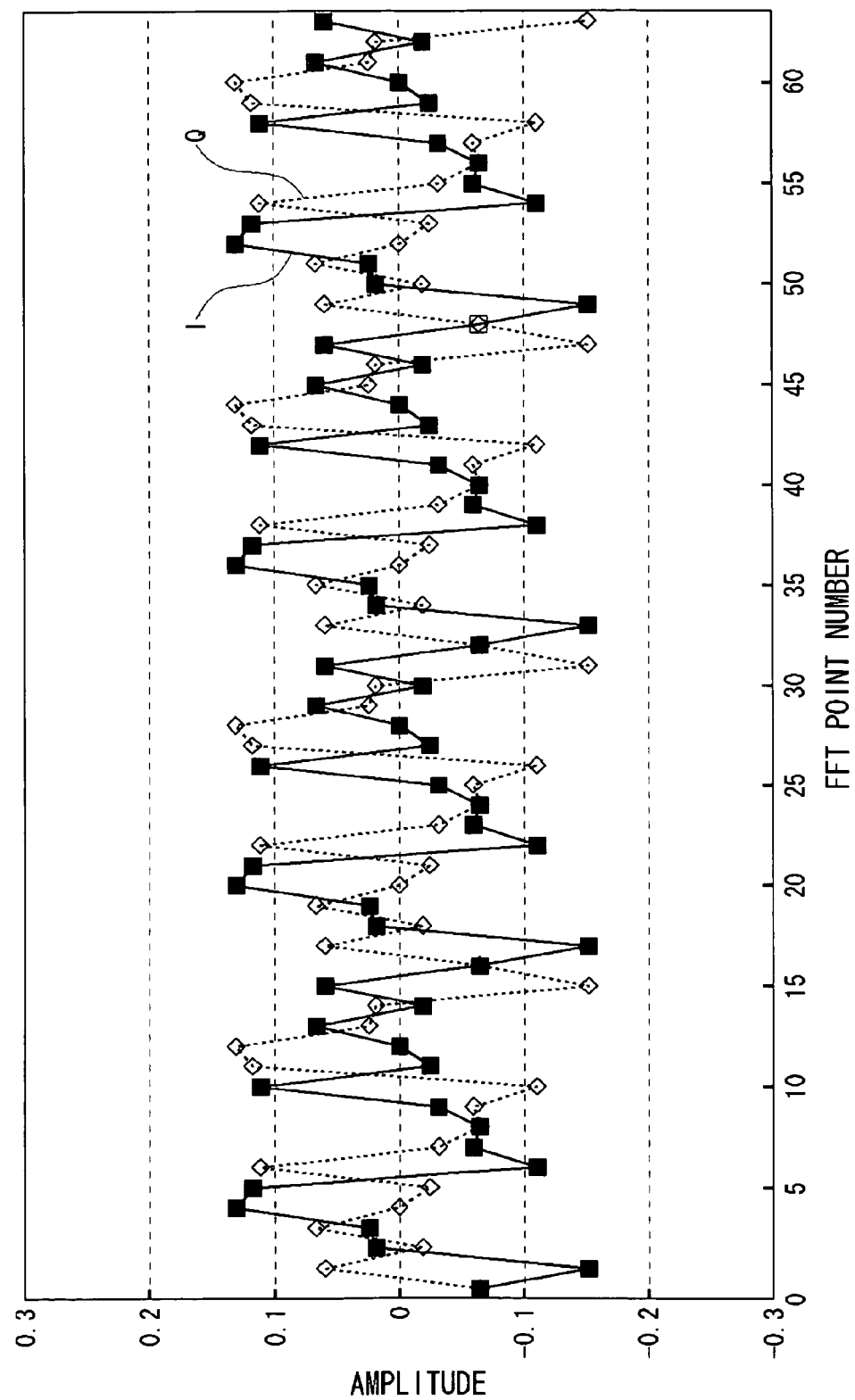
FIG. 21 illustrates a waveform of STS1 shown in FIG. 18.
Figure 22:
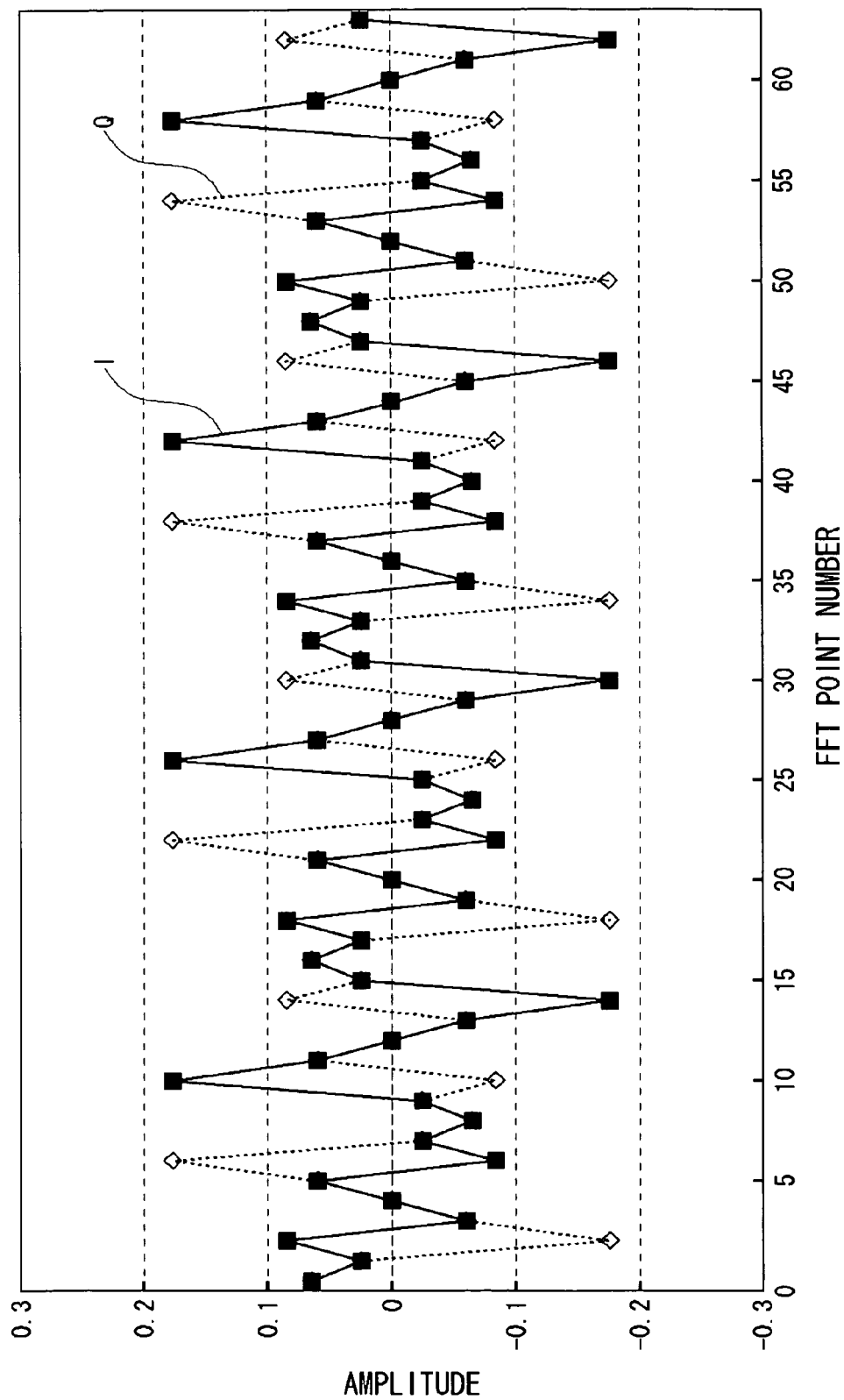
FIG. 22 illustrates a waveform of STS2 shown in FIG. 18.

FIG. 21 illustrates a waveform of STS1, and FIG. 22 a waveform of STS2. These represent the values of STSs for sub-antenna in the time domain. "STS1" is expressed in the frequency domain as follows:

$$S_{-26,26} = sqrt\left(\frac{26}{6}\right)\{0, 0, -1-j, 0, 0, 0, 0, 0, 0, \quad (14)$$
$$0, 0, 0, 0, 0, -1-j, 0, 0, 0, -1-j,$$
$$0, 0, 0, 0, 0, 0, 0, 0, 0, 0, 0, 0, 0, 0,$$

-continued
$$-1-j, 0, 0, 0, 1+j, 0, 0, 0, 0, 0, 0, 0,$$
$$0, 0, 0, 0, 1+j, 0, 0\}$$

"STS2" is expressed in the frequency domain as follows:

$$S_{-26,26} = sqrt\left(\frac{26}{6}\right)\{0, 0, -1-j, 0, 0, 0, 0, 0, 0, \quad (15)$$
$$0, 0, 0, 0, 0, 1+j, 0, 0, 0, 1+j, 0, 0, 0,$$
$$0, 0, 0, 0, 0, 0, 0, 0, 0, 0, 0, -1-j,$$
$$0, 0, 0, 1+j, 0, 0, 0, 0, 0, 0, 0, 0, 0, 0,$$
$$0, 1+j, 0, 0\}$$

A receiving apparatus 12, a first radio unit 50*a*, a first processing unit 52*a* and a correlator 70 according to the sixth embodiment are of the same type as a receiving apparatus 12 of FIG. 5, a first radio unit 50*a* of FIG. 6, a first processing unit 52*a* of FIG. 7 and a correlator 70 of FIG. 13.

The radio units 50 receive signals transmitted respectively from a plurality of transmitting antennas 14. The correlator 70 detects STSs from a signal received. The description thereof hereunder, however, covers specifically an operation of detecting STSs for main antenna. The correlator 70 stores the values of "STSa" in the I storage units 304 and the Q storage units 306. The correlator 70 carries out correlation between received signals and stored values by the multipliers 308 and the adders 310 and outputs the correlation values between the received signal and "STSa" as a first correlation in-phase value 210 and a first correlation quadrature value 212 and the correlation values between the received signal and "STSb" as a second correlation in-phase value 214 and a second correlation quadrature value 216.

An estimation unit, which is not shown here, inputs a first correlation in-phase value 210, a first correlation quadrature value 212, a second correlation in-phase value 214 and a second correlation quadrature value 216 and derives a magnitude calculated from the first correlation in-phase value 210 and the first correlation quadrature value 212 (hereinafter referred to as "first magnitude") and a magnitude calculated from the second correlation in-phase value 214 and the second correlation quadrature value 216 (hereinafter referred to as "second magnitude"). Furthermore, if the first magnitude is larger than the second magnitude, the estimation unit estimates the transmitted STS for main antenna to be "STSa" and determines that the number of transmitting antennas 14 transmitting signals is "2". On the other hand, if the first magnitude is not larger than the second magnitude, the estimation unit estimates the transmitted STS for main antenna to be "STSb" and determines that the number of transmitting antennas 14 transmitting signals is "3". And according to the number of transmitting antennas 14 thus determined, the receiving apparatus 12 performs settings for demodulation. That is, the receiving apparatus 12 will activate the first demodulation unit 54*a* and the second demodulation unit 54*b* if the number of transmitting antennas 14 is "2" or the first demodulation unit 54*a* through the third demodulation unit 54*c* if the number of transmitting antennas 14 is "3".

Figure 23:
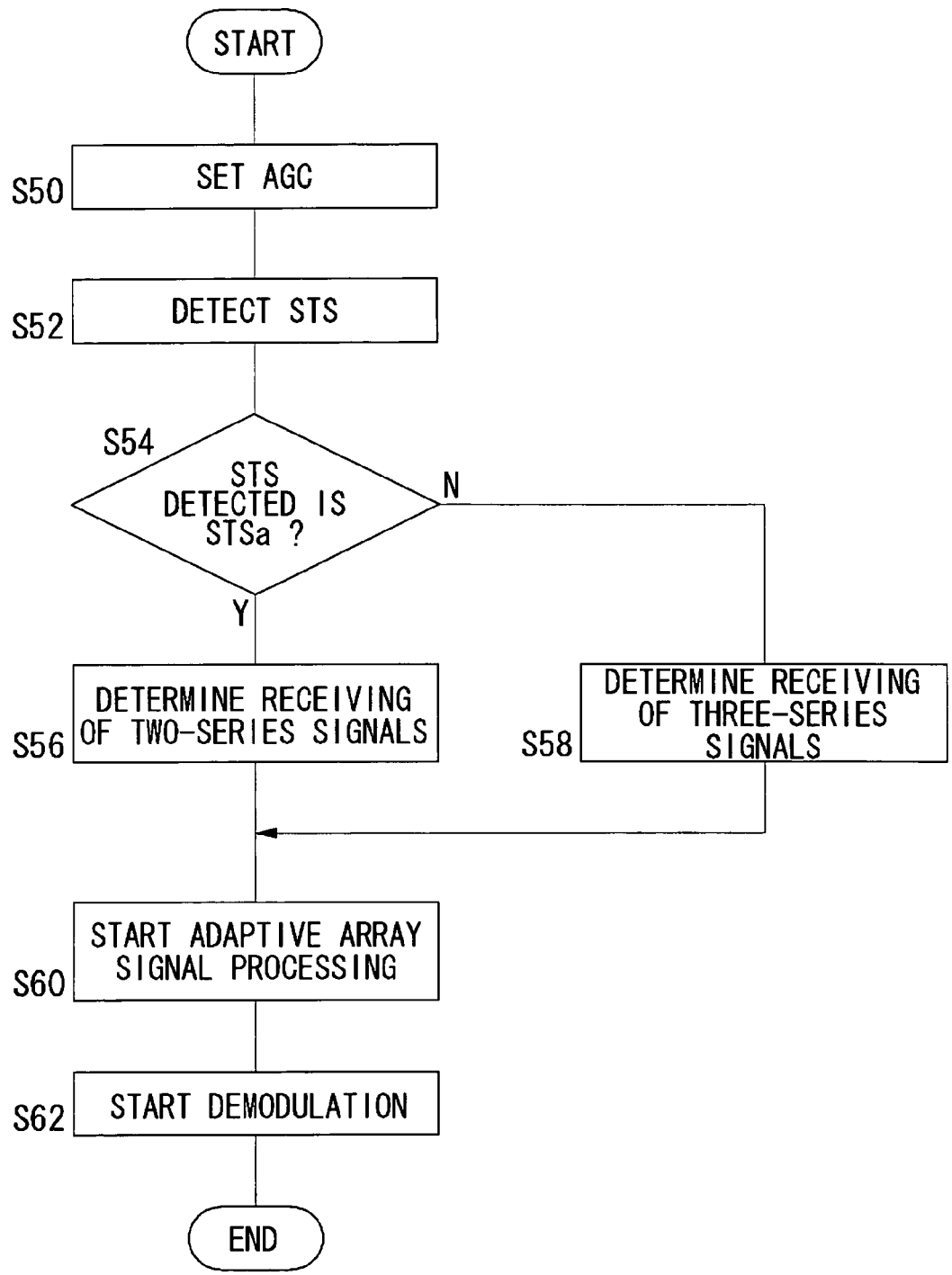
FIG. 23 is a flowchart showing a procedure of a receiving operation by a receiving apparatus according to a sixth embodiment of the present invention.

FIG. 23 is a flowchart showing a procedure of a receiving operation by a receiving apparatus 12. Radio units 50 receive signals, and AGC units 66 set AGCs based on the STSs contained in the received signals (S50). Correlators 70 perform correlation processing and thereby detects STSs (S52). And if the STS detected is "STSa" (Y of S54), an estimation unit will decide on the receiving of two-series signals (S56) and activate a first demodulation unit 54a and a second demodulation unit 54b. On the other hand, if the STS detected is not "STSa" but "STSb" (N of S54), the estimation unit will decide on the receiving of three-series signals (S58) and activate a first demodulation unit 54a through a third demodulation unit 54c. Processing units 52 start adaptive array signal processing by deriving received weight signals 206 based on the LTSs contained in the received signals (S60). Demodulation units 54 start demodulation on the composite signals 204 outputted from a data combining unit 56 (S62).

According to the sixth embodiment of the present invention, a receiving apparatus can recognize the number of antennas transmitting signals without being notified about the number of antennas transmitting the signals from a transmitting apparatus. Also, the circuit can be reduced in scale because the delay units for delaying inputted signals, the storage units for storing reference signals and the multipliers to be used in correlation processing can be shared in the processing for two STSs.

Seventh Embodiment

A seventh embodiment of the present invention, as with the sixth embodiment, relates to a technology for a MIMO system, in which a transmitting apparatus changes the pattern of STS with the number of antennas transmitting data and a receiving apparatus recognizes the number of antennas transmitting data by detecting the changed pattern of STS. Also, as with the sixth embodiment, the patterns of STSs transmitted from a main antenna are given a predetermined relationship according to the number of transmitting antennas transmitting data. The receiving apparatus detects a plurality of correlation values with a single correlator by making use of this relationship. In the sixth embodiment, the aforementioned predetermined relationship is so defined as to have mutually inverted phases, but in the seventh embodiment, the relationship is defined in a manner such that the absolute values of the respective components are exchanged and the signs are inverted.

FIG. 24 is a table showing a relationship between the number of transmitting antennas 14 for transmitting data and the patterns of STSs transmitted by the transmitting antennas, according to the seventh embodiment. As with FIG. 18, the table shows the numbers of transmitting antennas 14 vertically and the transmitting antennas 14 to be used horizontally and the STSs corresponding thereto in relation to the numbers of antennas 14. In FIG. 24, the STS transmitted from the third transmitting antenna 14c for the number "3" of transmitting antennas 14 transmitting signals, namely, the STS for main antenna, is "STSb'". Here, the "STSb'" is expressed in the frequency domain as follows:

$$S_{-26,26} = sqrt\left(\frac{26}{6}\right)\{0, 0, 0, 0, 0, 0, -1-j, 0,$$

$$0, 0, 1+j, 0, 0, 0, 0, 0, 0, 0, 0, 0, 0-1-j,$$

$$0, 0, 0, 0, 0, 0, 0, 1+j, 0, 0, 0, 0, 0, 0, 0, 0,$$

$$0, 0, -1-j, 0, 0, 0, -1-j, 0, 0, 0, 0, 0, 0\} \quad (16)$$

Otherwise, the seventh embodiment is the same as the sixth embodiment, so that the description thereof is omitted here.

Figure 25:
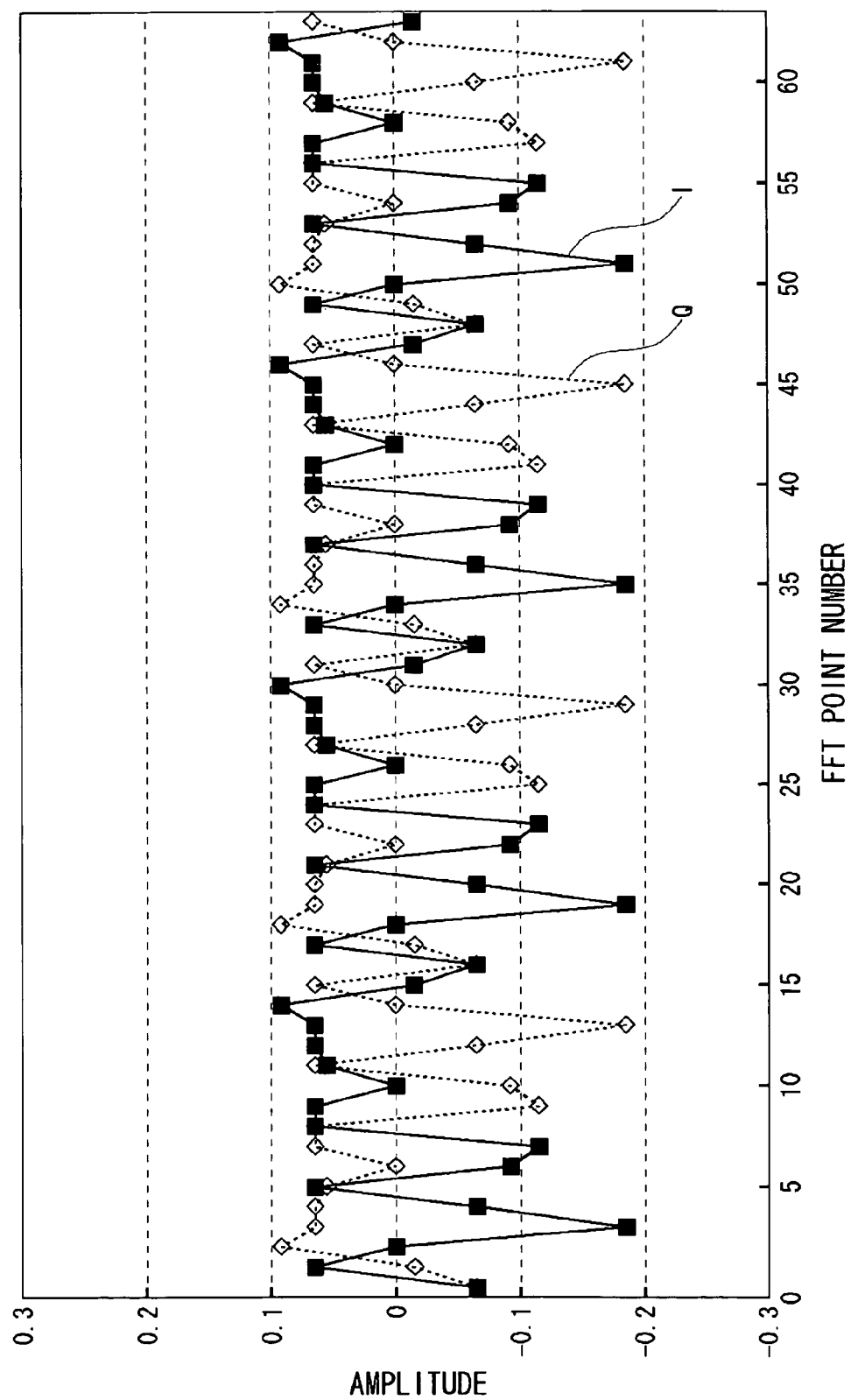
FIG. 25 illustrates a waveform of STSb' shown in FIG. 24.

FIG. 25 illustrates a waveform of STSb'. STSb' has inverted sign in relation to STSb. STSb' has the in-phase component and quadrature component in the time domain and is so defined that for the two kinds of number of antennas to transmit signals, namely, "2" and "3", the absolute value of the in-phase component of "STSa" is equal to the absolute value of the quadrature component of "STSb'", which has inverted sign, and the absolute value of the quadrature component of "STSa" is equal to the absolute value of the in-phase component of "STSb'", which has inverted sign.

Figure 26:
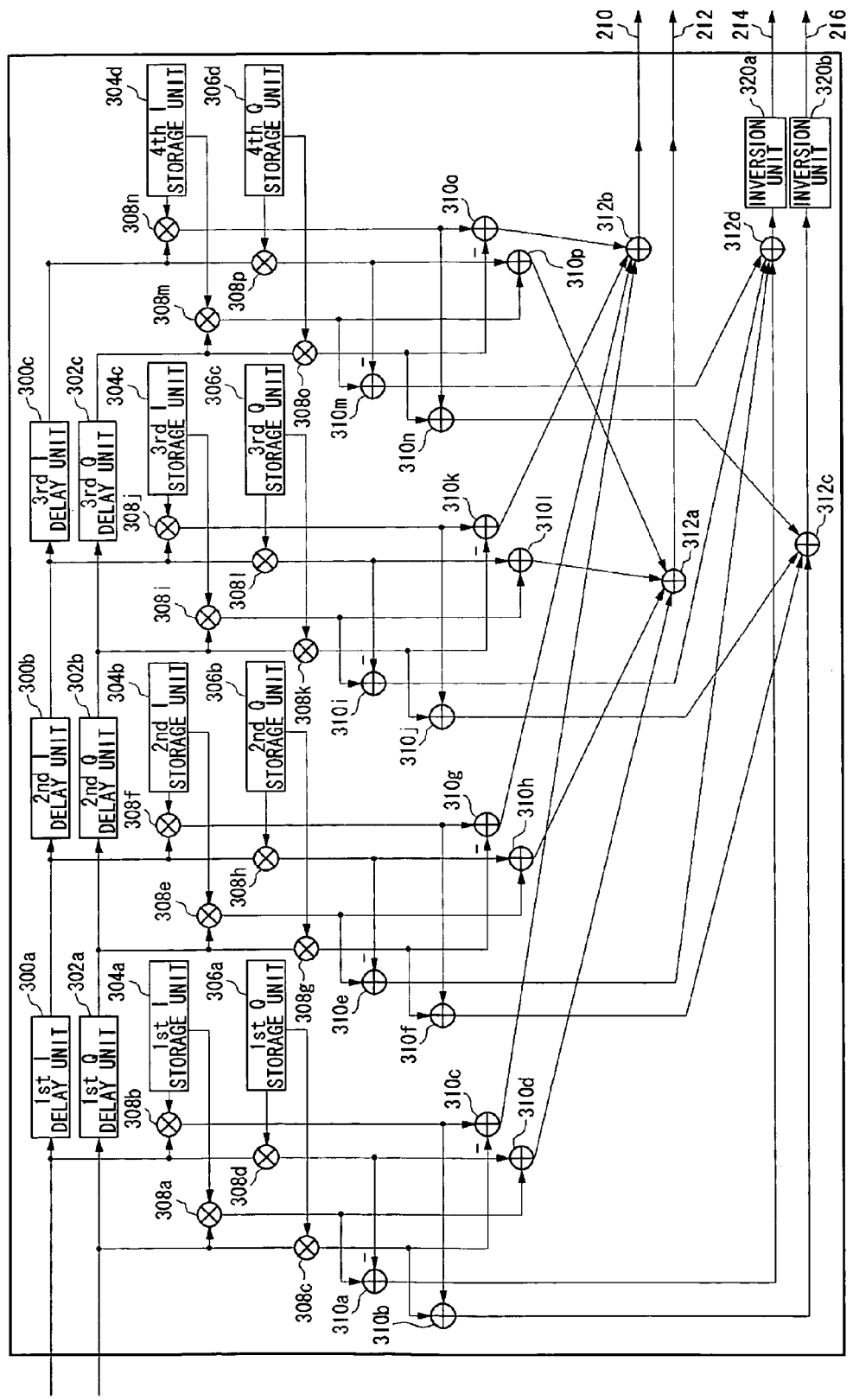
FIG. 26 illustrates a structure of a correlator according to a seventh embodiment of the present invention.

FIG. 26 illustrates a structure of a correlator 70 according to the seventh embodiment. Compared to the correlator 70 shown in FIG. 13, the correlator 70 shown in FIG. 26 further includes a first inversion unit 320a and a second inversion unit 320b, which are generically referred to as inversion units 320. The inversion units 320 invert the signs of the results of addition by a third adder 312c and a fourth adder 312d. In other words, the correlator 70 calculate the correlation values between STSb' having sign inverted from STSb and inputted signals. The operation other than this is the same as in FIG. 13, so that the description thereof is omitted here. By the operation as described above, multiplications between the values of the in-phase component and quadrature component, which a plurality of delayed signals have, and the values of the in-phase component and quadrature component, which a plurality of stored reference signals have, are shared and a plurality of multiplication results produced by the above-mentioned multiplications are added up in different combinations, so that the amount of processing can be reduced.

According to the seventh embodiment of the present invention, a receiving apparatus can recognize the number of antennas transmitting signals without being notified about the number of antennas transmitting the signals from a transmitting apparatus. Also, the circuit can be reduced in scale because the delay units for delaying inputted signals, the storage units for storing reference signals and the multipliers to be used in correlation processing can be shared in the processing for two STSs. Furthermore, this can be realized even with the patterns of STSs for main antenna different from those of the sixth embodiment.

Eighth Embodiment

An eighth embodiment of the present invention, as with the sixth or the seventh embodiment, relates to a technology for a MIMO system, in which a transmitting apparatus changes the pattern of STS with the number of antennas transmitting data and a receiving apparatus recognizes the number of antennas transmitting data by detecting the changed pattern of STS. In the sixth and seventh embodiments, the description was given of the changing of the number of transmitting antennas transmitting data, which is plural, such as "2" or "3". In this eighth embodiment, however, the description will cover cases where the number of transmitting antennas transmitting data is "1" to "3", including cases where the number of transmitting antennas is one. It is to be noted here that when the number of transmitting antennas is one, a wireless LAN conforming to the IEEE802.11a standard is assumed, so that the STS corresponding thereto is Legacy STS. The transmitting apparatus transmits Legacy STS, STSa and STSb from the main antenna according to the number of transmitting antennas transmitting data. As previously indicated, Legacy STS uses 12 subcarriers, and STSa and STSb use 6 subcarriers each.

On the other hand, the receiving apparatus, which has correlators corresponding respectively to Legacy STS, STSa and STSb, carries out correlation processings for the signals received by them and outputs their respective correlation values. Furthermore, the receiving apparatus compares the correlation values with one another and specifies the number of the transmitting antennas in response to the STS having the largest correlation value. The receiving apparatus according to the eighth embodiment does not store the values corresponding to the Legacy STS of 12 subcarriers by a correlator corresponding to Legacy STS, but selects 6 subcarriers used by STSa or STSb from the Legacy STS of 12 subcarriers and stores the values corresponding to the thus selected subcarriers.

Figure 27:
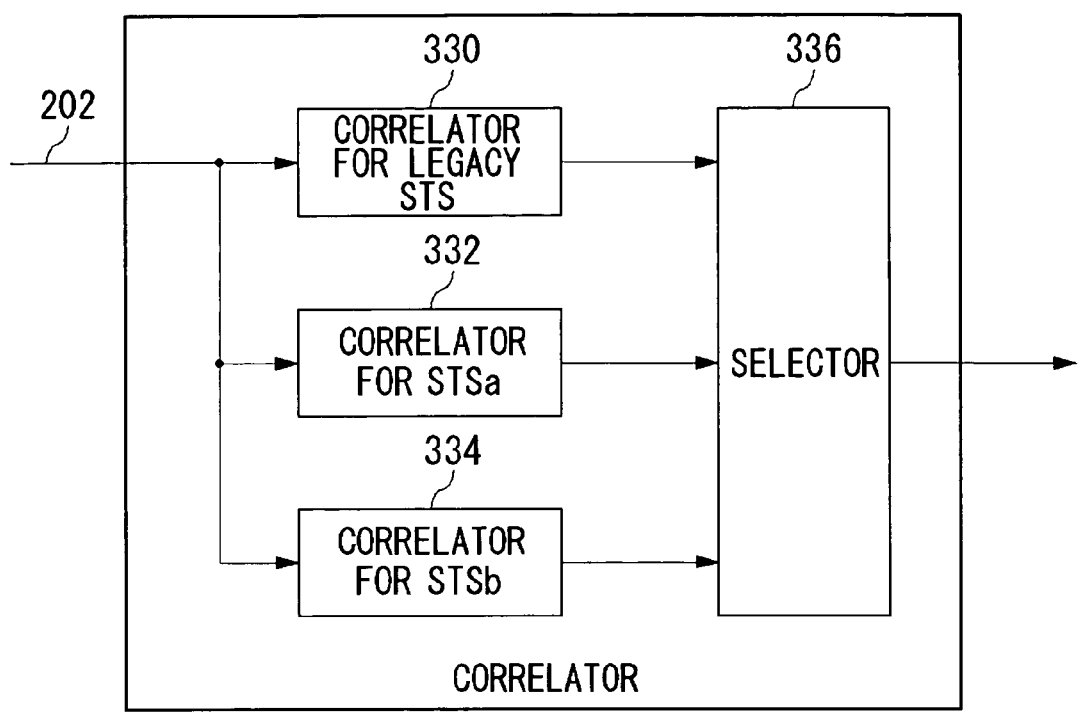
FIG. 27 illustrates a structure of a correlator according to an eighth embodiment of the present invention.

FIG. 27 illustrates a structure of a correlator 70 according to the eighth embodiment. The correlator 70 includes a correlator for Legacy STS 330, a correlator for STSa 332, a correlator for STSb 334 and a selector 336. Also, correlators corresponding to sub-antennas may be provided, but the description thereof is omitted herein.

The correlator for STSa 332, which stores in advance a plurality of signals where STSa has been converted to signals in the time domain, calculates the correlation value of a stored signal and a received signal (hereinafter referred to as "correlation value for 2 antennas"). The correlator for STSb 334, which stores in advance a plurality of signals where STSb has been converted to signals in the time domain, calculates the correlation value of a stored signal and a received signal (hereinafter referred to as "correlation value for 3 antennas"). Here, the correlator for STSa 332 and the correlator for STSb 334 have been described as having separate structures but they may be structured as a single correlator 70 as in the sixth embodiment.

The correlator for Legacy STS 330 stores in advance the signals, converted into the time domain, of subcarriers used for STSa or STSb only out of the above-described Legacy STS. The correlator for Legacy STS 330 calculates a correlation value between a stored signal and a received signal (hereinafter referred to as "correlation value for 1 antenna").

The selector 336 compares a correlation value for 2 antennas, a correlation value for 3 antennas and a correlation value for 1 antenna and selects a largest correlation value therefrom. An estimation unit, which is not shown here, determines the number of transmitting antennas 14 transmitting data corresponding to the selected correlation value.

According to the eighth embodiment of the present invention, when there is a plurality of antennas transmitting signals, the correlation values are calculated from signals corresponding only to the subcarriers to be used by STSs corresponding to the main antenna. Hence, the influence from the other subcarriers can be eliminated and the accuracy of correlation values for comparison can be raised. Moreover, this improved accuracy of correlation values for comparison raises the accuracy in the estimation of the number of transmitting antennas transmitting signals. Furthermore, a correlator as described above can also be used for timing detection and the like.

Ninth Embodiment

A ninth embodiment of the present invention, as with the first embodiment, relates to preamble signals to be used in a MIMO system. More specifically, this ninth embodiment concerns such placement of preamble signals as can raise the accuracy of gain control by AGC even in a frequency selective fading environment. When a MIMO system comes under the influence of a frequency selective fading, there will occur a plurality of both the large and the small attenuation part of received signals in the frequency band of the signals. For instance, the large and the small attenuation part of signals occur alternately at certain intervals over a range of low to high frequencies. In terms of multicarriers in a MIMO system, a larger attenuation of signals for a predetermined number of subcarriers and then a smaller attenuation of signals for a predetermined number of subcarriers occur, and this is repeated randomly over a range of low-frequency subcarriers to high-frequency subcarriers.

In a MIMO system, as mentioned earlier, it is preferable that the cross-correlations between STSs transmitted respectively from a plurality of antennas are small. However, even when the cross-correlations are small, there may be cases where the signal intensity becomes high for all the subcarriers corresponding to received STSs if the STSs transmitted from their respective antennas use nearly continuous subcarriers, that is, if there is only small frequency difference between the maximum frequency and the minimum frequency of the subcarriers used by one STS. On the contrary, there may also be cases where the signal intensity becomes low. And if a gain setting is done at an AGC unit under any of these circumstances, there is a concern that the value of gain may turn out inappropriate, thus lowering the quality of received signals, when data using a larger number of subcarriers than the STS is received. The reason is that a large number of subcarriers may involve cases where the signal intensity rises or drops.

The STSs corresponding respectively to a plurality of antennas according to the present embodiment use a predetermined number of discretely selected subcarriers. For example, they use subcarriers of every eight subcarrier numbers. This arrangement ensures that even when the number of subcarriers of an STS is smaller than the number of subcarriers of data, the STSs, which use the entire range of the signal band, are subjected to the influence of frequency selective fading not locally but entirely. Also, in consideration of cross-correlations, the STSs corresponding respectively to a plurality of antennas use mutually different subcarriers. Moreover, if the frequency difference between the maximum frequency and the minimum frequency of the subcarriers used by an STS is to be defined as the band width, it is so arranged that the band width is the same for all the plurality of STSs.

If the subcarriers used by a plurality of STSs are placed as described above, then a proper gain can be derived in a frequency selective fading environment even when the number of subcarriers used by an STS is smaller than the number of subcarriers used by data. It is to be noted that the above description of the placement of subcarriers partially overlaps with the description of the first embodiment and others.

A transmitting apparatus 10 and a receiving apparatus 12 according to the ninth embodiment are the same as the transmitting apparatus 10 of FIG. 4 and the receiving apparatus 12 of FIG. 5 according to the first embodiment, so that the description thereof is omitted here.

FIGS. 28A through 28D illustrate, in outline, known signals placed at the subcarriers according to the ninth embodiment. As with FIG. 1, FIGS. 28A through 28D show spectra of signals, the horizontal axis representing the subcarrier numbers and the vertical axis representing the signal strength. Also, the solid line represents the signals of subcarriers during transmission whereas the dotted line represents the transfer function of a channel. As illustrated, the transfer function of a channel is under the influence of frequency selective fading and therefore has parts with high signal strength as well as low signal strength. Here, the parts of the transfer function with high signal strength correspond to parts of the channel subject to smaller attenuation of signals, and the parts of the transfer function with low signal strength correspond to parts of the channel subject to larger attenuation of signals. Different from FIG. 1, the number of subcarriers is assumed here to be 20 to simplify the explanation. Also, the transmitting apparatus 10 is assumed to have two transmitting antennas 14, namely, a first transmitting antenna 14a and a second transmitting antenna 14b, and the STSs transmitted from the respective transmitting antennas are assumed to use four subcarriers each.

Figure 28A:
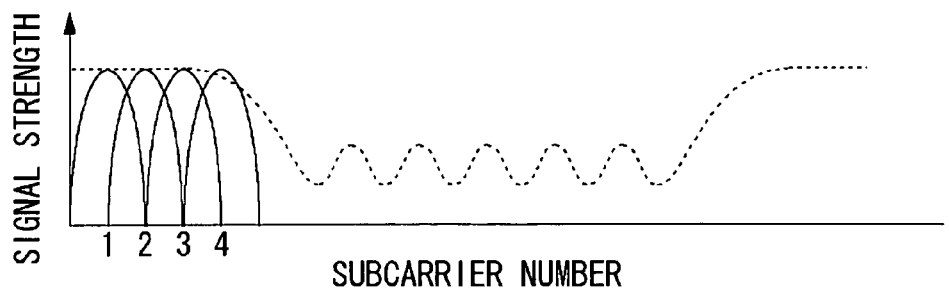
FIGS. 28A to 28D illustrate, in outline, known signals placed at subcarriers according to a ninth embodiment of the present invention.

FIG. 28A shows the placement of subcarriers of STS transmitted from the first transmitting antenna 14a, with which the placement of subcarriers according to the present embodiment is to be compared. Here, subcarriers of subcarrier numbers "1 to 4" are used. As is shown in FIG. 28A, the attenuation of signals in the channel for the STSs transmitted by the transmitting apparatus 10 is small, so that the signal strength of STSs received by the receiving apparatus 12 is relatively high.

Figure 28B:
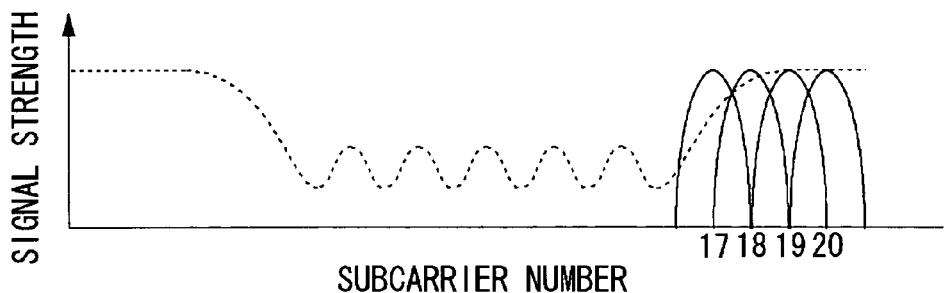

FIG. 28B shows the placement of subcarriers of STS transmitted from the second transmitting antenna 14b under the same conditions as in FIG. 28A. Here, subcarriers of subcarrier numbers "17 to 20" are used. Here, too, the receiving apparatus 12 receives STSs whose signal strength is relatively high as with the case of FIG. 28A. As a result, if the STSs are placed as shown in FIG. 28A and FIG. 28B, then the receiving apparatus 12 will set the gain of AGC 66 based on the STSs with relatively high signal strength, thus reducing the value of gain.

In the frequency domain corresponding to the subcarrier numbers "4 to 17", however, the attenuation of signals in the channel is large as is evident in FIGS. 28A through 28D. Consequently, the signal strength of data using subcarriers in this frequency domain is lower than that of the STSs. In other words, the value of gain set based on the STS becomes smaller than the value of gain appropriate for the transfer function, with the result that errors may sometimes occur in the received signals.

Figure 28C:
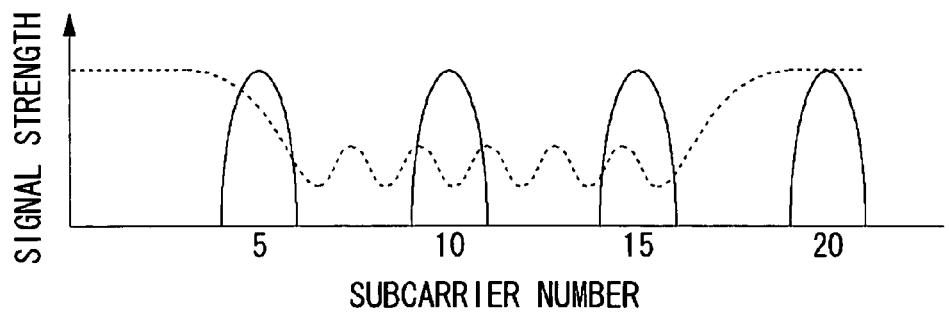

FIG. 28C shows the placement of subcarriers of STS transmitted from the first transmitting antenna 14a according to the present embodiment. As shown in FIG. 28C, the STS uses a predetermined number of subcarriers discretely selected from a plurality of subcarriers. That is, four subcarriers are used, which have been selected at intervals of five from 20 subcarriers. The subcarrier numbers corresponding thereto are "5", "10", "15" and "20". And the band width is a band corresponding to the number of subcarriers of 15.

Figure 28D:
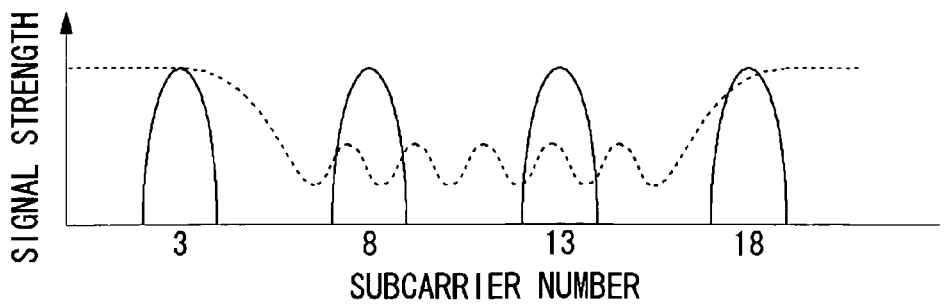

FIG. 28D shows the placement of subcarriers of STS transmitted from the second transmitting antenna 14b under the same conditions as in FIG. 28C. In FIG. 28D, as with the case in FIG. 28C, four subcarriers are used, which have been selected at intervals of five from 20 subcarriers. The subcarrier numbers corresponding thereto, however, are "3", "8", "13" and "18". That is, mutually different subcarriers are used by the STS transmitted by the first transmitting antenna 14a and the STS transmitted by the second transmitting antenna 14b. This is done to make the cross-correlation between these STSs smaller. And the band width is equal to the band width for the STS transmitted by the first transmitting antenna 14a.

In FIG. 28C, the signal strength for the subcarrier numbers "5" and "20" is high while the signal strength for the subcarrier numbers "10" and "15" is low. In FIG. 28D, the signal strength for the subcarrier numbers "3" and "18" is high while the signal strength for the subcarrier numbers "8" and "13" is low. The placement of subcarriers like this involves subcarriers whose signal strength becomes high or low, which reflects qualitatively the transfer function in a frequency selective fading environment. For this reason, the placement of subcarriers as in FIGS. 28C and 28D brings the value of gain closer to the value of gain appropriate for the transfer function. Hence, errors caused in the received signals will be reduced.

Based on specific parameters of an MINO system, the STSs may, for instance, be placed at the subcarriers as follows. The STSs transmitted from the first transmitting antenna 14a use the subcarriers of subcarrier numbers "−24", "−16", "−8", "4", "12" and "20" whereas the STSs transmitted from the second transmitting antenna 14b use the subcarriers of subcarrier numbers "−20", "−12", "−4", "8", "16" and "24". Separately from this, the placement may also be such as is expressed by Equation (10) of the first embodiment. It is to be noted that these STSs are stored in preamble adding units 32 as described earlier.

According to the ninth embodiment of the present invention, it is possible to provide preamble signals that improve the accuracy of gain estimation even in a frequency selective fading environment. The ninth embodiment can also make the cross-correlation between preamble signals smaller for a plurality of antennas. Furthermore, since the number of subcarriers used for preambles is small, the cycle of signals in the time domain can be made shorter. Thereby, the gain estimation therefor can be made faster. Moreover, the improved gain estimation can raise the quality of received signals.

Tenth Embodiment

A tenth embodiment according to the present invention relates to a transmitting apparatus in a MIMO system. The transmitting apparatuses according to the above first to ninth embodiments heretofore transmit independent signals from a plurality of respective transmitting antennas. And a plurality of STSs are respectively used to correspond to such the signals. For example, if the signals are to be transmitted from four antennas, respectively, then four kinds of signals will be transmitted. Also, four kinds of STSs are used to correspond respectively to the four kinds of signals. Hereinafter, each of the four kinds of signals will be called series signal, and so far correspond to four series kinds of signals. As a result, in the above first to ninth embodiments, the number of series signals is identical to the number of antennas.

In the tenth embodiment, the number of series signals and the number of transmitting antennas differ from each other. A case is herein considered where the number of series signals is smaller than the number of transmitting antenna. For example, let us assume herein that the number of series signals is "2" whereas the number of transmitting antennas is "4". In the tenth embodiment, a plurality of series signals are multiplied by a steering matrix, so that the plurality of series signals are dispersed in a plurality of transmitting antennas, respectively. A transmitting apparatus then transmits the dispersed signals from the plurality of antennas, respectively.

Figure 29:
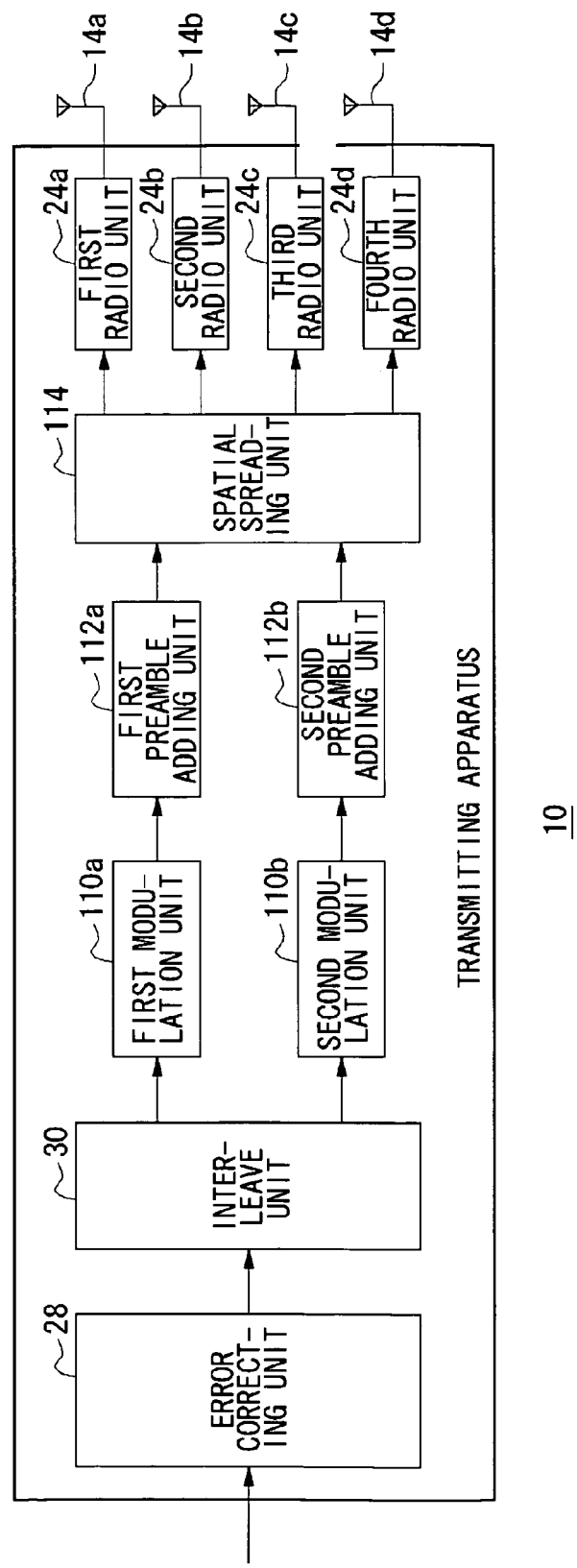
FIG. 29 illustrates a structure of a transmitting apparatus according to a tenth embodiment of the present invention.

FIG. 29 illustrates a structure of a transmitting apparatus according to a tenth embodiment of the present invention. A transmitting apparatus includes an error correcting unit 28, an interleave unit 30, a first modulation unit 110a and a second modulation unit 110b, which are generically referred to as modulation units 110, a first preamble adding unit 112a and a second preamble adding unit 112b, which are generically referred to as preamble adding units 112, a spatial spreading unit 114, a first radio unit 24a, a second radio unit 24b, a third radio unit 24c and a fourth radio unit 24d, which are generically referred to as radio units 24, and a first transmitting antenna 14a, a second transmitting antenna 14b, a third transmitting antenna 14c and a fourth transmitting antenna, which are generically referred to as transmitting antennas 14.

Similar to the error correcting unit 28 and the interleave unit 30 shown in FIG. 4, the error correcting unit 28 and the interleave unit 30 according to the tenth embodiment carry out convolutional coding and interleaving, respectively. In FIG. 4, the error correcting unit 28 and the interleave unit 30 perform a processing on the data separated by the data separating unit 20. In contrast thereto, a structure according to the tenth embodiment as shown in FIG. 29 is such that a processing is performed on signals before they are separated. It is to be noted, however, the structure employed in FIG. 4 may be that as shown in FIG. 29. Now, the interleave unit 30 shown in FIG. 29 separates data into a plurality of series and then outputs them. Here, the data are separated into two series. Data of the two series are now independent data from each other.

The modulation units 110 modulate data of two series, respectively. The preamble adding units 112 each add a preamble to the modulated data. Hence, the preamble adding units 112 store respectively a plurality of STSs, corresponding respectively to a plurality of series data, to be transmitted in a predetermined period. Here, STSs stored in the preamble adding units 112 are the same as those described in the above embodiments. That is, an STS corresponding to one of a plurality of series data uses carriers which differ at least partially from carriers used for an STS corresponding to another STS among the plurality of series data. Herein, a unit in which data and STS and the like are combined together will be called a "signal". It is to be noted that either of data and STS is called a signal and they are used as such without distinction therebetween. Two series data are finally outputted in parallel from the two preamble adding units 112. The burst format of signals outputted from the preamble adding units 112 may be defined as shown in FIGS. 8A to 8C.

The spatial spreading unit 114 inputs the two series signals and multiplies them by a steering matrix so as to generate signals corresponding to the number of transmitting antennas 14. That is, by this multiplication of series signals by the steering matrix the spatial spreading unit 114 generate signals whose count is greater than the number of a plurality of series signals and which correspond to the number of transmitting antennas. The spatial spreading unit 114 extends the degree of an inputted series signal up to "4". The number of inputted series signal is "2" and is represented here by "Nin". Hence, the inputted series signal is expressed by a vector "Nin×1". The number of transmitting antennas 14 is "4" and is represented here by "Nout". The spatial spreading unit 114 extends the degree of an inputted series signal from Nin to Nout. That is, a vector "Nin×1" is extended to a vector "Nout×1". In so doing, "0's" are inserted to components from (Nin+1)th row to Nout-th row.

A steering matrix S is expressed by the following Equation 17

$$S(l)=C(l)W \quad (17)$$

The steering matrix is a matrix of "Nout×Nout". Here, "l" indicates the subcarrier number, and the multiplication by the steering matrix is carried out for each subcarrier. C is expressed by the following Equation 18 and is used for CDD (Cyclic Delay Diversity).

$$C(l)=dia(1, \exp(-j2\pi l\delta/Nout), \ldots, \exp(-j2\pi l\delta(Nout-1)/Nout)) \quad (18)$$

where δ indicates a shift amount. W is an orthogonal matrix of "Nout×Nout". One example of the orthogonal matrices is Walsh matrix.

The number of radio units 24 provided is identical to the number of transmitting antennas 14. A structure of each of the radio units 24 here is such that it includes the radio unit 24 shown in FIG. 4 plus the IFFT unit 34, GI unit 36 and quadrature modulation unit 38 shown in FIG. 4. The spatial spreading unit 114 may be provided at a stage subsequent to an IFFT unit 34 (not shown). The radio units 24 output finally signals whose degree has been extended to the number of the transmitting antennas.

A plurality of STSs stored in the preamble adding units 112 may be defined in a manner similar to FIGS. 9A and 9B of the first embodiment. In other words, a plurality of STSs respectively use carries that mutually differ from one another. A plurality of STSs respectively use the a predetermined number of carriers discretely selected from a plurality of carriers. It is defined in a manner such that in the plurality of STSs the number of carriers to be used for the respective STSs are equal to one another. And a plurality of carriers used for a plurality of STSs are predefined among part of a plurality of carriers to be tramsmitted, and the plurality of STSs use at least one carrier selected from the plurality of predefined carriers. The details are similar to those in the first embodiment and are thus omitted here.

The STSs stored in the preamble adding units 112 may be defined in a manner similar to the second embodiment. That is, among the plurality of STSs, the autocorrelation characteristics of STS corresponding to one of a plurality of series signals is defined in such a manner as to be higher than the autocorrelation characteristics of STS corresponding to another series signal among the plurality of series signals. Among the plurality of STSs, the number of carriers to be used for STS corresponding to one of a plurality of series signals is defined in such a manner as to be larger than the number of carriers to be used for STS corresponding to another series signal among the plurality of series signals. The details are similar to those in the second embodiment and are thus omitted here.

The STSs stored in the preamble adding units 112 may also be defined in a manner similar to FIGS. 12A and 12B of the third embodiment. That is, a plurality of STSs are defined in a manner such that a value of in-phase component in a waveform of STS corresponding to one of a plurality of series signals is equal to a value of quadrature component in a waveform of STS corresponding to another of the plurality of series signals and a value of quadrature component in a waveform of STS corresponding to one of plurality of series signals is equal to a value of in-phase component in a waveform of STS corresponding to another of plurality of series signals. The details are similar to those in the third embodiment and are thus omitted here.

The STSs stored in the preamble adding units 112 may also be defined in a manner similar to FIGS. 28C and 28D of the ninth embodiment. That is, a plurality of STSs are respectively defined in such a manner that a difference in frequency between a carrier having the highest frequency and a carrier having the lowest frequency is mutually equal among a predetermined number of discretely selected carriers. The plurality of STSs respectively use mutually different carriers. The details are similar to those in the ninth embodiment and are thus omitted here.

According to the tenth embodiment, a plurality of STSs are required to use mutually different subcarriers from among a plurality of predetermined subcarriers, so that the cross-correlation between the plurality of STSs can be made smaller. Also, because of this smallness of cross-correlation among a plurality of STSs, the detection accuracy of a plurality of STSs by a receiving apparatus can be improved. Moreover, the smallness of cross-correlation among a plurality of STSs can raise the accuracy with which the AGC is set by a receiving apparatus. Moreover, when a plurality of series signals are transmitted from a plurality off transmitting antennas, the number of the plurality of transmitting antennas is larger than the number of the plurality of series signals, so that the strength of signals transmitted form one transmitting antenna can be reduced. Moreover, since the strength of signals transmitted from one transmitting antenna is reduced, so that the distortion, caused by a power amplifier, in the signals to be transmitted can be made smaller. Moreover, an open-loop transmit diversity scheme can be carried out.

The present invention has been described based on the embodiments which are only exemplary. It is understood by those skilled in the art that there exist other various modifications to the combination of each component and process described above and that such modifications are encompassed by the scope of the present invention.

In the first to the tenth embodiment, the signals to be considered as reference signals are STSs defined in IEEE802.11a standard. However, they are not limited thereto and, for example, other signals may serve the purpose. That is, they may be known signal that are placed and transmitted in a plurality of subcarriers and transmitted.

In the ninth embodiment, the mutually different subcarriers are used as a plurality of STSs stored in a transmitting apparatus 10. However, they are not limited thereto and, for example, subcarriers that partially or entirely overlapped may be used. In such a case, it is preferable that the pattern of STS with which cross-correlation among a plurality of STSs becomes low be used. This is because in such the case there is a possibility where the cross-correlation among the plurality of STSs becomes high. According to this modified example, the advantageous effect as in the second embodiment is obtained. That is, it suffices if the band width is wide to some extent.

In the ninth embodiment, the plurality of STSs stored in the transmitting apparatus 10 are so defined that the band widths are equal. However, they are not limited thereto and, for example, they may be set to band widths whose values differ for one another. According to this modified example, the present invention can be applied to a case when the number of transmitting antennas is larger. That is, it suffices if the band width is wide to some extent.

In the seventh embodiment, the transmitting apparatus 10 changes the pattern of STS according to the number of transmitting antennas to be used and the receiving apparatus 12 recognizes the number of transmitting antennas in use by detecting the changed pattern of STS. The patterns of STSs transmitted from a main antenna are given a predetermined relationship according to the number of transmitting antennas 14 transmitting data. In particular, the predetermined relationship is defined in a relationship such that the absolute values of the respective components are exchanged and the sings are inverted. It is, however, not limited thereto and, for instance, a predetermined relationship may be defined respectively for a plurality of transmitting antennas 14. That is, the predetermined relationship that a plurality of STSs stored in the preamble adding unit 32 have is such that the absolute value of in-phase component in a waveform of STS corresponding to one of the plurality of transmitting antennas 14 is equal to the absolute value of quadrature component in a waveform of STS corresponding to another of the plurality of transmitting antennas 14 and the sign thereof is inverted.

Moreover, it may be defined such that the absolute value of quadrature component in a waveform of STS corresponding to one of the plurality of transmitting antennas 14 is equal to the absolute value of in-phase component in a waveform of STS corresponding to another of the plurality of transmitting antennas 14 and the sign thereof is inverted. If this is applied to the third embodiment, the waveform of STS corresponding to one of the plurality of transmitting antennas 14 corresponds to the waveform of STS corresponding to the second transmitting antenna 14b, and the waveform of STS corresponding to another of the plurality of transmitting antennas 14 corresponds to the waveform of STS corresponding to the third transmitting antenna 14c.

Moreover, the above modified examples may be applied to the tenth embodiment. That is, STSs stored in the preamble adding unit 112 may be defined in a manner such that the absolute value of in-phase component in a waveform of STS corresponding to one of a plurality of series signals is equal to the absolute value of quadrature component in a waveform of STS corresponding to another of the plurality of series signals and the sign thereof is inverted. Moreover, they may be defined in a manner such that the absolute value of quadrature component in a waveform of STS corresponding to one of the plurality of series signals is equal to the absolute value of in-phase component in a waveform of STS corresponding to another of the plurality of series signals and the sign thereof is inverted. According to this modified example, the correlation among STSs corresponding to a plurality of transmitting antennas 14 can be made small.

The features and characteristics of the present invention described in the above third to seventh embodiments may be defined by the following items 3-1 to 7-6.

Item 3-1

A correlator, comprising:

an input unit which sequentially inputs signals in which a plurality of series are combined wherein the plurality of series are defined beforehand in a form such that a plurality of reference signals among the series are respectively changed for the series in which the plurality of reference signals are arranged on time axis;

a delay unit which continuously delays the inputted signals;

a plurality of storage units which store respectively a plurality of reference signals corresponding one of the plurality of series; and a correlation processing unit which performs correlation processing based on values of the plurality of delayed signals and values of the plurality of stored reference signals and which outputs respectively a plurality of values of correlation between the inputted signals and the plurality of series, wherein a plurality of series contained in the signals inputted to the input unit have a predetermined relationship, and wherein the correlation processing unit performs the correlation processing by combination of multiplication and addition according to the predetermined relationship.

Item 3-2

A correlator as described in Item 3-1, wherein the signals inputted to the input unit and the plurality of reference signals have in-phase components and quadrature components, and the predetermined relationship that the plurality of series have is such that a value of in-phase component of a reference signal contained in one of the plurality of series is equal to a value of quadrature component of a reference signal contained in the other thereof whereas a value of quadarature component of the reference signal contained in one of the plurality of series is equal to a value of in-phase component of the reference signal contained in the other thereof, and wherein the correlation processing unit puts to a common use the multiplication between values of in-phase components and values of quadrature components that the plurality of delayed signals have and values of in-phase components and values of quadrature components that the plurality of stored reference signals have, and sums up in different combinations a plurality of multiplication results generated by the multiplication.

Item 3-3

A correlator as described in Item 3-2, wherein if a result of multiplication of a value of in-phase component that the signal has and a value of in-phase component that the reference signal has is denoted as a first value, a result of multiplication of a value of quadrature component that the signal has and a value of quadrature component that the reference signal has is a second value, a result of multiplication of a value of in-phase component that the signal has and a value of quadrature component that the reference signal has is a third value and a result of multiplication of a value of quadrature component that the signal has and a value of in-phase component that the reference signal has is a fourth value, then the correlation processing unit performs the correlation processing in a manner such that the sum of the first value and the second value and a difference between the fourth value and the third value are calculated for one of the two series whereas the sum of the third value and the fourth value and a difference between the second value and the first value are calculated for the other of the two series.

Item 6-1

A correlator as described in Item 3-2 or Item 3-3, further comprising a determination unit which determines the number of antennas that are to transmit signals, based on the plurality of values of correlation, wherein signals to be inputted to the input unit are transmitted from a plurality of transmitting antennas whose number is being varied, and if one of the plurality of antennas is called a main antenna and the remaining antennas are called sub-antennas, then there is a relationship where, according to the number of antennas that transmit signals, a series that is to be transmitted from the main antenna is such that a value of in-phase component of a reference signal contained in a series corresponding to a predetermined number of antennas that transmit signals is equal to a value of quadrature component of a reference signal contained in a series corresponding to another number of antennas and a value of quadrature component of the reference signal contained in a series corresponding to the predetermined antenna is equal to a value of in-phase component of the reference signal contained in a series corresponding to the another of the number of antennas, and wherein the storage unit stores, among series to be transmitted from the main antenna, a plurality of reference signals contained in a series corresponding to a predetermined number of antennas that transmit signals.

Item 7-1

A correlator as described in Item 3-1, wherein the signals inputted to the input unit and the plurality of reference signals have in-phase components and quadrature components, and the predetermined relationship that the plurality of series have is such that an absolute value of in-phase component of a reference signal contained in one of the plurality of series is equal to an absolute value of quadrature component of a reference signal contained in the other thereof and the sign thereof is inverted whereas an absolute value of quadrature component of the reference signal contained in one of the plurality of series is equal to an absolute value of in-phase component of the reference signal contained in the other thereof and the sign thereof is inverted, and wherein the correlation processing unit puts to a common use the multiplication between values of in-phase components and values of quadrature components that the plurality of delayed signals have and values of in-phase components and values of quadrature components that the plurality of stored reference signals have, and sums up in different combinations a plurality of multiplication results generated by the multiplication.

Item 7-2

A correlator as described in Item 7-1, wherein if a result of multiplication of a value of in-phase component that the signal has and a value of in-phase component that the reference signal has is denoted as a first value, a result of multiplication of a value of quadrature component that the signal has and a value of quadrature component that the reference signal has is a second value, a result of multiplication of a value of in-phase component that the signal has and a value of quadrature component that the reference signal has is a third value and a result of multiplication of a value of quadrature component that the signal has and a value of in-phase component that the reference signal has is a fourth value, then the correlation processing unit performs the correlation processing in a manner such that the sum of the first value and the second value and a difference between the fourth value and the third value are calculated for one of the two series whereas the sum of the third value and the fourth value and then inverting the sign of resulting summation and a difference between the second value and the first value and then inverting the sign of resulting difference are calculated for the other of the two series.

Item 7-3

A correlator as described in Item 7-1 or Item 7-2, further comprising a determination unit which determines the number of antennas that are to transmit signals, based on the plurality of values of correlation, wherein signals to be inputted to the input unit are transmitted from a plurality of transmitting antennas whose number is being varied, and if one of the plurality of antennas is called a main antenna and the remaining antennas are called sub-antennas, then there is a relationship where, according to the number of antennas that transmit signals, a series that is to be transmitted from the main antenna is such that an absolute value of in-phase component of a reference signal contained in a series corresponding to a predetermined number of antennas that transmit signals is equal to an absolute value of quadrature component of a reference signal contained in a series corresponding to another number of antennas and the sign thereof is inverted whereas an absolute value of quadrature component of the reference signal contained in a series corresponding to the predetermined antenna is equal to an absolute value of in-phase component of the reference signal contained in a series corresponding to the another of the number of antennas and the sign thereof is inverted, and wherein the storage unit stores, among series to be transmitted from the main antenna, a plurality of reference signals contained in a series corresponding to a predetermined number of antennas that transmit signals.

Item 4-1

A correlator as described in Item 3-1, wherein the plurality of series contained in the signals inputted to the input unit are defined in a manner such that each value thereof varies in a predetermined cycle, and the predetermined relationship is defined in a manner such that if one of the plurality of series is assigned as a reference, then a cycle of the series assigned as the reference is an integral multiple of a cycle of series other than the series assigned as the reference, wherein the plurality of storage units store respectively a plurality of reference signals corresponding to the series assigned as the reference, and wherein the correlation processing unit selects part of the plurality of stored reference signals for the series other than the series assigned as the reference, based on a difference between the cycle of series assigned as the reference and the cycle of series other than the series assigned as the reference, and carries out multiplication between the thus partially selected reference signal and the plurality of delayed input signals.

Item 5-1

A correlator Item 3-1, wherein the input signals inputted to the input unit and the plurality of reference signals have in-phase components and quadrature components, and the predetermined relationship that the plurality of series have is such that only one of in-phase component and quadrature component of the reference signal has a predetermined value, wherein the storage unit respectively stores information by which to invert the sign of the delayed signals in such a form as to correspond to the plurality of reference signals, and wherein as the correlation processing the correlation processing unit adds up a signal which has been inverted based on the information and the delayed signal.

Item 3-4

A receiving apparatus, comprising:

an input unit which sequentially inputs signals in which a plurality of series are combined wherein the plurality of series are defined beforehand in a form such that a plurality of reference signals among the series are respectively changed for the series in which the plurality of reference signals are arranged on time axis;

a delay unit which continuously delays the inputted signals;

a plurality of storage units which store respectively a plurality of reference signals corresponding one of the plurality of series;

a correlation processing unit which performs correlation processing based on values of the plurality of delayed signals and values of the plurality of stored reference signals and which outputs respectively a plurality of values of correlation between the inputted signals and the plurality of series; and a control unit which detects timing of the inputted signals based on the plurality of values of correlation, wherein a plurality of series contained in the signals inputted to the input unit have a predetermined relationship, and wherein the correlation processing unit performs the correlation processing by combination of multiplication and addition according to the predetermined relationship.

Item 3-5

A receiving apparatus as described in Item 3-4, wherein the signals inputted to the input unit and the plurality of reference signals have in-phase components and quadrature components, and the predetermined relationship that the plurality of series have is such that a value of in-phase component of a reference signal contained in one of the plurality of series is equal to a value of quadrature component of a reference signal contained in the other thereof whereas a value of quadarature component of the reference signal contained in one of the plurality of series is equal to a value of in-phase component of the reference signal contained in the other thereof, and wherein the correlation processing unit puts to a common use the multiplication between values of in-phase components and values of quadrature components that the plurality of delayed signals have and values of in-phase components and values of quadrature components that the plurality of stored reference signals have, and sums up in different combinations a plurality of multiplication results generated by the multiplication.

Item 3-6

A receiving apparatus as described in Item 3-5, wherein if a result of multiplication of a value of in-phase component that the signal has and a value of in-phase component that the reference signal has is denoted as a first value, a result of multiplication of a value of quadrature component that the signal has and a value of quadrature component that-the reference signal has is a second value, a result of multiplication of a value of in-phase component that the signal has and a value of quadrature component that the reference signal has is a third value and a result of multiplication of a value of quadrature component that the signal has and a value of in-phase component that the reference signal has is a fourth value, then the correlation processing unit performs the correlation processing in a manner such that the sum of the first value and the second value and a difference between the fourth value and the third value are calculated for one of the two series whereas the sum of the third value and the fourth value and a difference between the second value and the first value are calculated for the other of the two series.

Item 6-2

A receiving apparatus as described in Item 3-5 or Item 3-6, further comprising a determination unit which determines the number of antennas that are to transmit signals, based on the plurality of values of correlation, wherein signals to be inputted to the input unit are transmitted from a plurality of transmitting antennas whose number is being varied, and if one of the plurality of antennas is called a main antenna and the remaining antennas are called sub-antennas, then there is a relationship where, according to the number of antennas that transmit signals, a series that is to be transmitted from the main antenna is such that a value of in-phase component of a reference signal contained in a series corresponding to a predetermined number of antennas that transmit signals is equal to a value of quadrature component of a reference signal contained in a series corresponding to another number of antennas and a value of quadrature component of the reference signal contained in a series corresponding to the predetermined antenna is equal to a value of in-phase component of the reference signal contained in a series corresponding to the another of the number of antennas, and wherein the storage unit stores, among series to be transmitted from the main antenna, a plurality of reference signals contained in a series corresponding to a predetermined number of antennas that transmit signals.

Item 7-4

A receiving apparatus as described in Item 3-4, wherein the signals inputted to the input unit and the plurality of reference signals have in-phase components and quadrature components, and the predetermined relationship that the plurality of series have is such that an absolute value of in-phase component of a reference signal contained in one of the plurality of series is equal to an absolute value of quadrature component of a reference signal contained in the other thereof and the sign thereof is inverted whereas an absolute value of quadarature component of the reference signal contained in one of the plurality of series is equal to an absolute value of in-phase component of the reference signal contained in the other thereof and the sign thereof is inverted, and wherein the correlation processing unit puts to a common use the multiplication between values of in-phase components and values of quadrature components that the plurality of delayed signals have and values of in-phase components and values of quadrature components that the plurality of stored reference signals have, and sums up in different combinations a plurality of multiplication results generated by the multiplication.

Item 7-5

A receiving apparatus as described in Item 7-4, wherein if a result of multiplication of a value of in-phase component that the signal has and a value of in-phase component that the reference signal has is denoted as a first value, a result of multiplication of a value of quadrature component that the signal has and a value of quadrature component that the reference signal has is a second value, a result of multiplication of a value of in-phase component that the signal has and a value of quadrature component that the reference signal has is a third value and a result of multiplication of a value of quadrature component that the signal has and a value of in-phase component that the reference signal has is a fourth value, then the correlation processing unit performs the correlation processing in a manner such that the sum of the first value and the second value and a difference between the fourth value and the third value are calculated for one of the two series whereas the sum of the third value and the fourth value and then inverting the sign of resulting summation and a difference between the second value and the first value and then inverting the sign of resulting difference are calculated for the other of the two series.

Item 7-6

A receiving apparatus as described in Item 7-4 or Item 7-5, further comprising a determination unit which determines the number of antennas that are to transmit signals, based on the plurality of values of correlation, wherein signals to be inputted to the input unit are transmitted from a plurality of transmitting antennas whose number is being varied, and if one of the plurality of antennas is called a main antenna and the remaining antennas are called sub-antennas, then there is a relationship where, according to the number of antennas that transmit signals, a series that is to be transmitted from the main antenna is such that an absolute value of in-phase component of a reference signal contained in a series corresponding to a predetermined number of antennas that transmit signals is equal to an absolute value of quadrature component of a reference signal contained in a series corresponding to another number of antennas and the sign thereof is inverted whereas an absolute value of quadrature component of the reference signal contained in a series corresponding to the predetermined antenna is equal to an absolute value of in-phase component of the reference signal contained in a series corresponding to the another of the number of antennas and the sign thereof is inverted, and wherein the storage unit stores, among series to be transmitted from the main antenna, a plurality of reference signals contained in a series corresponding to a predetermined number of antennas that transmit signals.

Although the present invention has been described by way of exemplary embodiments, it should be understood that many changes and substitutions may further be made by those skilled in the art without departing from the scope of the present invention which is defined by the appended claims.

What is claimed is:

1. A transmitting apparatus comprising:
a plurality of antennas;
a transmitter which transmits signals using a plurality of carriers via the plurality of antennas; and
a storage unit which stores respectively a plurality of known signals that correspond respectively to the plurality of antennas and are to be transmitted from said transmitter in a predetermined period,
wherein among the plurality of known signals stored by said storage unit a known signal corresponding to one of the plurality of antennas uses carriers which differ at least partially from carriers used for a known signal corresponding to another antenna among the plurality of antennas, and
wherein, among the plurality of known signals stored by said storage unit, an autocorrelation characteristic of a known signal corresponding to one of the plurality of antennas is defined in such a manner as to be higher than that of a known signal corresponding to another antenna among the plurality of antennas.

2. A transmitting apparatus according to claim 1, wherein the number of the plurality of antennas is three or more, and
wherein, among the plurality of known signals stored by said storage unit, cross-correlation characteristics between a known signal corresponding to one of the plurality of antennas and the remaining respective known signals corresponding to other antennas among the plurality of antennas are defined in such a manner as to be lower than those among the remaining respective known signals corresponding to the other antennas.

3. A transmitting apparatus, comprising
a plurality of antennas;
a transmitter which transmits signals using a plurality of carriers via the plurality of antennas; and
a storage unit which stores respectively a plurality of known signals that correspond respectively to the plurality of antennas and are to be transmitted from said transmitter in a predetermined period,
wherein among the plurality of known signals stored by said storage unit a known signal corresponding to one of the plurality of antennas uses carriers which differ at least partially from carriers used for a known signal corresponding to another antenna among the plurality of antennas, and
wherein if among a plurality of carries to be transmitted from said transmitter the number of carriers to be used only for a known signal corresponding to one of the plurality of antennas is a first value and the number of carriers to be used only for a known signal corresponding to another antenna among the plurality of antennas is a second value, then the plurality of known signals stored by said storage unit are defined in a manner such that the first value is greater than the second value.

4. A transmitting apparatus according to claim 3, wherein the number of the plurality of antennas is three or more, and wherein for the plurality of known signal stored by said storage unit the second value is the number of carriers that have been used only for the known signal corresponding to one of the other antennas.

5. A transmitting apparatus according to claim 4, wherein for the plurality of known signals stored by said storage unit the second value is zero.

6. A transmitting apparatus, comprising
a plurality of antennas;
a transmitter which transmits signals using a plurality of carriers via the plurality of antennas; and
a storage unit which stores respectively a plurality of known signals that correspond respectively to the plurality of antennas and are to be transmitted from said transmitter in a predetermined period, wherein among the plurality of known signals stored by said storage unit a known signal corresponding to one of the plurality of antennas uses carriers which differ at least partially from carriers used for a known signal corresponding to another antenna among the plurality of antennas, and wherein, among the plurality of known signals stored by said storage unit, the number of carriers to be used for a known signal corresponding to one of the plurality of antennas is greater than the number of carriers to be used for a known signal corresponding to another antenna of the plurality of antennas.

7. A transmitting apparatus, comprising a plurality of antennas;

a transmitter which transmits signals using a plurality of carriers via the plurality of antennas; and a storage unit which stores respectively a plurality of known signals that correspond respectively to the plurality of antennas and are to be transmitted from said transmitter in a predetermined period, wherein among the plurality of known signals stored by said storage unit a known signal corresponding to one of the plurality of antennas uses carriers which differ at least partially from carriers used for a known signal corresponding to another antenna among the plurality of antennas, and, wherein the plurality of known signals stored by said storage unit are defined in a manner such that a value of in-phase component in a waveform of known signal corresponding to one of the plurality of antennas is equal to a value of quadrature component in a waveform of known signal corresponding to another of the plurality of antennas and a value of quadrature component in a waveform of known signal corresponding to one of the plurality of antennas is equal to a value of in-phase component in a waveform of known signal corresponding to another of the plurality of antennas.

8. A transmitting apparatus, comprising a plurality of antennas;

a transmitter which transmits signals using a plurality of carriers via the plurality of antennas; and a storage unit which stores respectively a plurality of known signals that correspond respectively to the plurality of antennas and are to be transmitted from said transmitter in a predetermined period, wherein among the plurality of known signals stored by said storage unit a known signal corresponding to one of the plurality of antennas uses carriers which differ at least partially from carriers used for a known signal corresponding to another antenna among the plurality of antennas, and wherein among the plurality of known signals stored by said storage unit a known signal is defined in a manner such that an absolute value of in-phase component in a waveform of known signal corresponding to one of the plurality of antennas is equal to an absolute value of quadrature component in a waveform of known signal corresponding to another of the plurality of antennas and the sign thereof is inverted whereas an absolute value of quadrature component in a waveform of known signal corresponding to one of the plurality of antennas is equal to an absolute value of in-phase component in a waveform of known signal corresponding to another of the plurality of antennas and the sign thereof.

9. A transmitting apparatus, comprising:

an output unit which outputs a plurality of streams; and a storage unit which stores respectively a plurality of known signals that are contained in a predetermined period among a plurality of known signals that correspond respectively to the plurality of streams, wherein each of the plurality of streams outputted from said output unit uses a plurality of carriers, and wherein among the plurality of known signals stored by said storage unit a known signal corresponding to one of the plurality of streams uses carriers which differ at least partially from carriers used for a known signal corresponding to another streams among the plurality of streams, and wherein among the plurality of known signals stored by said storage unit, an autocorrelation characteristic of a known signal corresponding to one of the plurality of streams is defined in such a manner as to be higher than that of a known signal corresponding to another stream among the plurality of streams.

10. A transmitting apparatus, comprising:

an output unit which outputs a plurality of streams; and a storage unit which stores respectively a plurality of known signals that are contained in a predetermined period among a plurality of known signals that correspond respectively to the plurality of streams, wherein each of the plurality of streams outputted from said output unit uses a plurality of carriers, and wherein among the plurality of known signals stored by said storage unit a known signal corresponding to one of the plurality of streams uses carriers which differ at least partially from carriers used for a known signal corresponding to another stream among the plurality of streams, and wherein among the plurality of known signals stored by said storage unit, the number of carriers to be used for a known signal corresponding to one of the plurality of streams is greater than the number of carriers to be used for a known signal corresponding to another stream of the plurality of streams.

11. A transmitting apparatus comprising:

an output unit which outputs a plurality of streams; and a storage unit which stores respectively a plurality of known signals that are contained in a predetermined period among a plurality of known signals that correspond respectively to the plurality of streams, wherein each of the plurality of streams outputted from said output unit uses a plurality of carriers, and wherein among the plurality of known signals stored by said storage unit a known signal corresponding to one of the plurality of streams uses carriers which differ at least partially from carriers used for a known signal corresponding to another stream among the plurality of streams, and wherein the plurality of known signals stored by said storage unit are defined in a manner such that a value of in-phase component in a waveform of known signal corresponding to one of the plurality of streams is equal to a value of quadrature component in a waveform of known signal corresponding to another of the plurality of streams and a value of quadrature component in a waveform of known signal corresponding to one of the plurality of streams is equal to a value of in-phase component in a waveform of known signal corresponding to another of the plurality of series streams.

12. A transmitting apparatus, comprising an output unit which outputs a plurality of streams; and a storage unit which stores respectively a plurality of known signals that are contained in a predetermined period among a plurality of known signals that correspond respectively to the plurality of streams, wherein each of the plurality of streams outputted from said output unit uses a plurality of carriers, and wherein among the plurality of known signals stored by said storage unit a known signal corresponding to one of the plurality of streams uses carriers which differ at least partially from carriers used for a known signal corresponding to another stream among the plurality of streams, and wherein the plurality of known signals stored by said storage unit are defined in a manner such that an absolute value of in-phase component in a waveform of known signal corresponding to one of the plurality of streams is equal to an absolute value of quadrature component in a waveform of known signal corresponding to another of the plurality of streams and the sign thereof is inverted whereas an absolute value of quadrature component in a waveform of known signal corresponding to one of the plurality of streams is equal to an absolute value of in-phase component in a waveform of known signal corresponding to another of the plurality of streams and the sign thereof is inverted.

13. A transmitting apparatus, comprising:

a plurality of antennas;

a transmitter which transmits signals using a plurality of carriers via the plurality of antennas; and a storage unit which stores respectively a plurality of known signals that correspond respectively to the plurality of antennas and are to be transmitted from said transmitter in a predetermined period, wherein among the plurality of known signals stored by said storage unit, an autocorrelation characteristic of a known signal corresponding to one of the plurality of antennas is defined in such a manner as to be higher than a cross-correlation characteristic between a known signal corresponding to another antenna among the plurality of antennas and the known signal corresponding to one of the plurality of antennas.

14. A transmitting apparatus according to claim 13, wherein the number of the plurality of antennas is two, and wherein for the plurality of known signal stored by said storage unit the cross-correlation characteristic is zero.

15. A transmitting apparatus, comprising:

an output unit which outputs a plurality of streams; and a storage unit which stores respectively a plurality of known signals that are contained in a predetermined period among a plurality of known signals that correspond respectively to the plurality of streams, wherein among the plurality of known signals stored by said storage unit, an autocorrelation characteristic of a known signal corresponding to one of the plurality of streams is defined in such a manner as to be higher than a cross-correlation characteristic between a known signal corresponding to another stream among the plurality of antennas and the known signal corresponding to one of the plurality of streams.

16. A transmitting apparatus according to claim 15, wherein the number of the plurality of streams is two, and wherein for the plurality of known signal stored by said storage unit the cross-correlation characteristic is zero.

17. A transmitting apparatus, comprising:

a plurality of antennas;

a transmitter which transmits signals using a plurality of carriers via the plurality of antennas; and a storage unit which stores respectively a plurality of known signals that correspond respectively to the plurality of antennas and are to be transmitted from said transmitter in a predetermined period, wherein among the plurality of known signals stored by said storage unit, carriers used by a known signal corresponding to one of the plurality of antennas are partially overlapped with carriers used by a known signal corresponding to another antenna of the plurality of antennas.

* * * * *

UNITED STATES PATENT AND TRADEMARK OFFICE
CERTIFICATE OF CORRECTION

PATENT NO.       : 7,526,258 B2                                    Page 1 of 1
APPLICATION NO.  : 11/044014
DATED            : April 28, 2009
INVENTOR(S)      : Seigo Nakao et al.

It is certified that error appears in the above-identified patent and that said Letters Patent is hereby corrected as shown below:

Column 56, Lines 18-19 (Claim 15), change from "plurality of antennas" to -- plurality of streams --.

Signed and Sealed this
Twenty-first Day of February, 2012

David J. Kappos
*Director of the United States Patent and Trademark Office*